United States Patent [19]
Oono et al.

[11] Patent Number: 6,082,515
[45] Date of Patent: Jul. 4, 2000

[54] COUPLING STRUCTURE OF DRIVING FORCE TRANSMITTING MEMBERS

[75] Inventors: Michinobu Oono, Osaka; Hiranaga Yamamoto, Nara; Kiyoshi Sasoh, Yamatokoriyama, all of Japan

[73] Assignee: Sharp Kabushiki Kaisha, Osaka, Japan

[21] Appl. No.: 09/239,800

[22] Filed: Jan. 29, 1999

[30] Foreign Application Priority Data

Jan. 30, 1998 [JP] Japan .................. 10-019750

[51] Int. Cl.⁷ ..................................... F16D 11/14
[52] U.S. Cl. ................ 192/69.71; 192/108; 403/3
[58] Field of Search .............. 192/69.6, 69.61, 192/69.62, 69.71, 69.82, 108; 403/3, 4, 335, 337; 74/439

[56] References Cited

U.S. PATENT DOCUMENTS

| | | | |
|---|---|---|---|
| 344,611 | 6/1886 | Applegate | 192/108 X |
| 1,361,797 | 12/1920 | Norton | 192/69.82 X |
| 2,830,834 | 4/1958 | Wildhaber . | |
| 3,005,497 | 10/1961 | Klonoski . | |
| 3,318,169 | 5/1967 | Tronslien | 74/439 X |
| 5,785,571 | 7/1998 | Camp | 403/3 X |

FOREIGN PATENT DOCUMENTS

| | | |
|---|---|---|
| 0188616 | 7/1986 | European Pat. Off. . |
| 507602 | 9/1920 | France . |
| 1931300 | 1/1970 | Germany . |
| 3406801A1 | 8/1984 | Germany . |
| 9205772 | 8/1992 | Germany . |
| 4-246025 | 2/1992 | Japan . |
| 9712161 | 4/1997 | WIPO . |

Primary Examiner—Rodney H. Bonck

[57] ABSTRACT

An object of the invention is to provide a coupling structure of driving force transmitting members, wherein the variety of complex-type driving force transmitting parts to be combined by using a plurality of driving force transmitting members can be increased as many as possible. Respective gear members are provided with concave coupling portions on one sides in the axial line direction and convex coupling portions on the other sides in the axial line direction. The respective convex coupling portions are fitted into the respective concave coupling portions, whereby the gear members are coupled to integrally rotate. Thus, it is possible to selectively combine a plurality of gear members and construct many kinds of complex-type gear members.

17 Claims, 48 Drawing Sheets

FIG. 7A  FIG. 7B  FIG. 7C

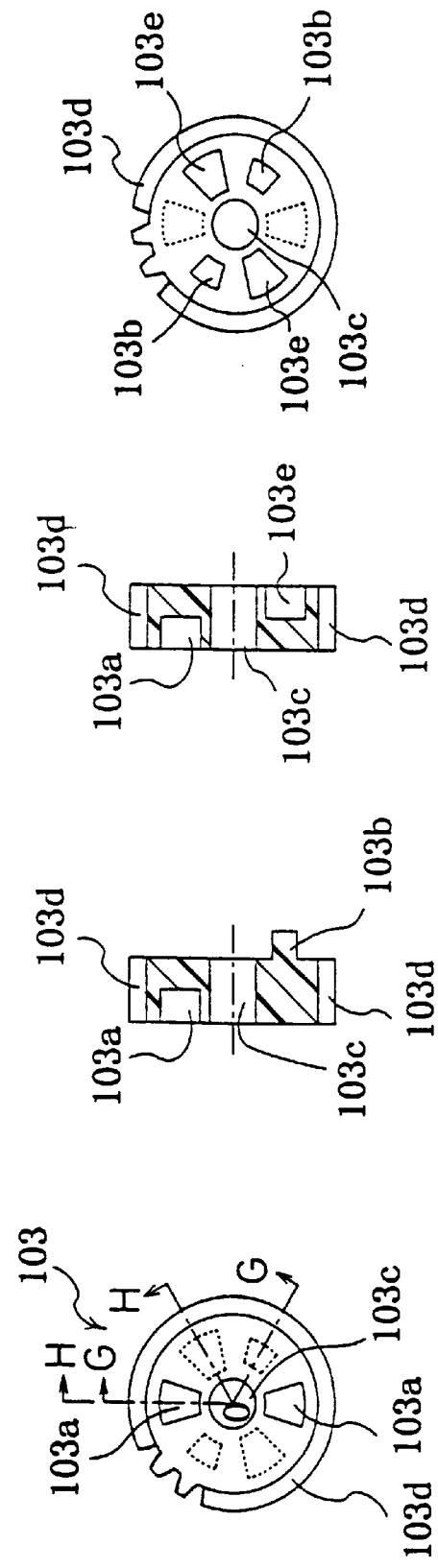

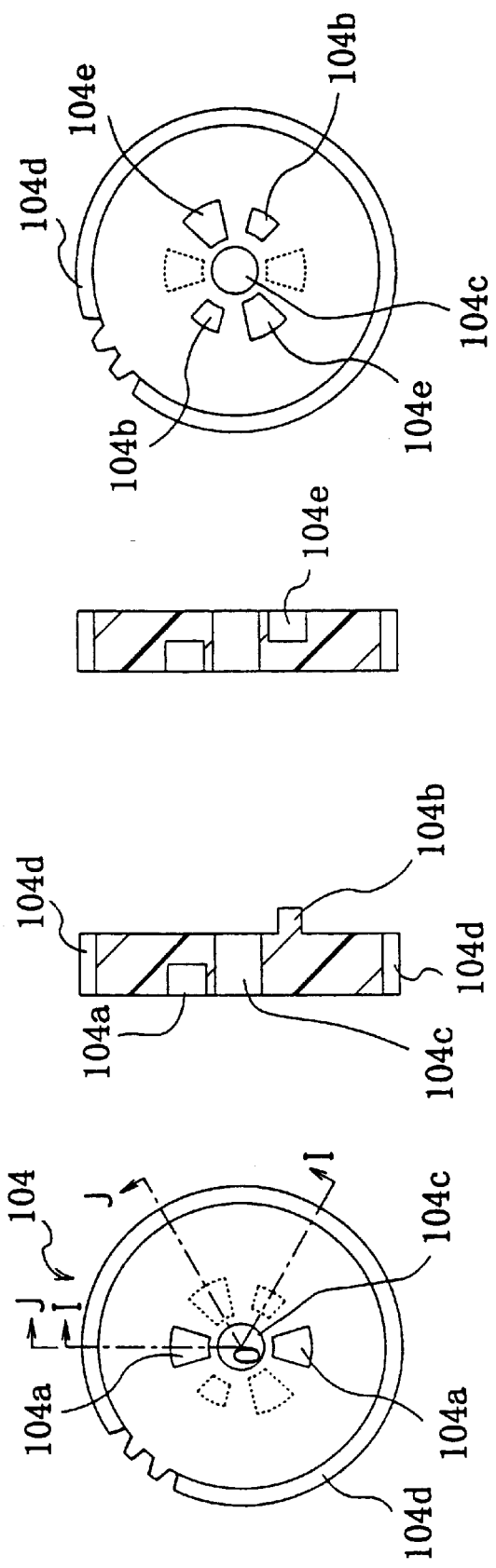

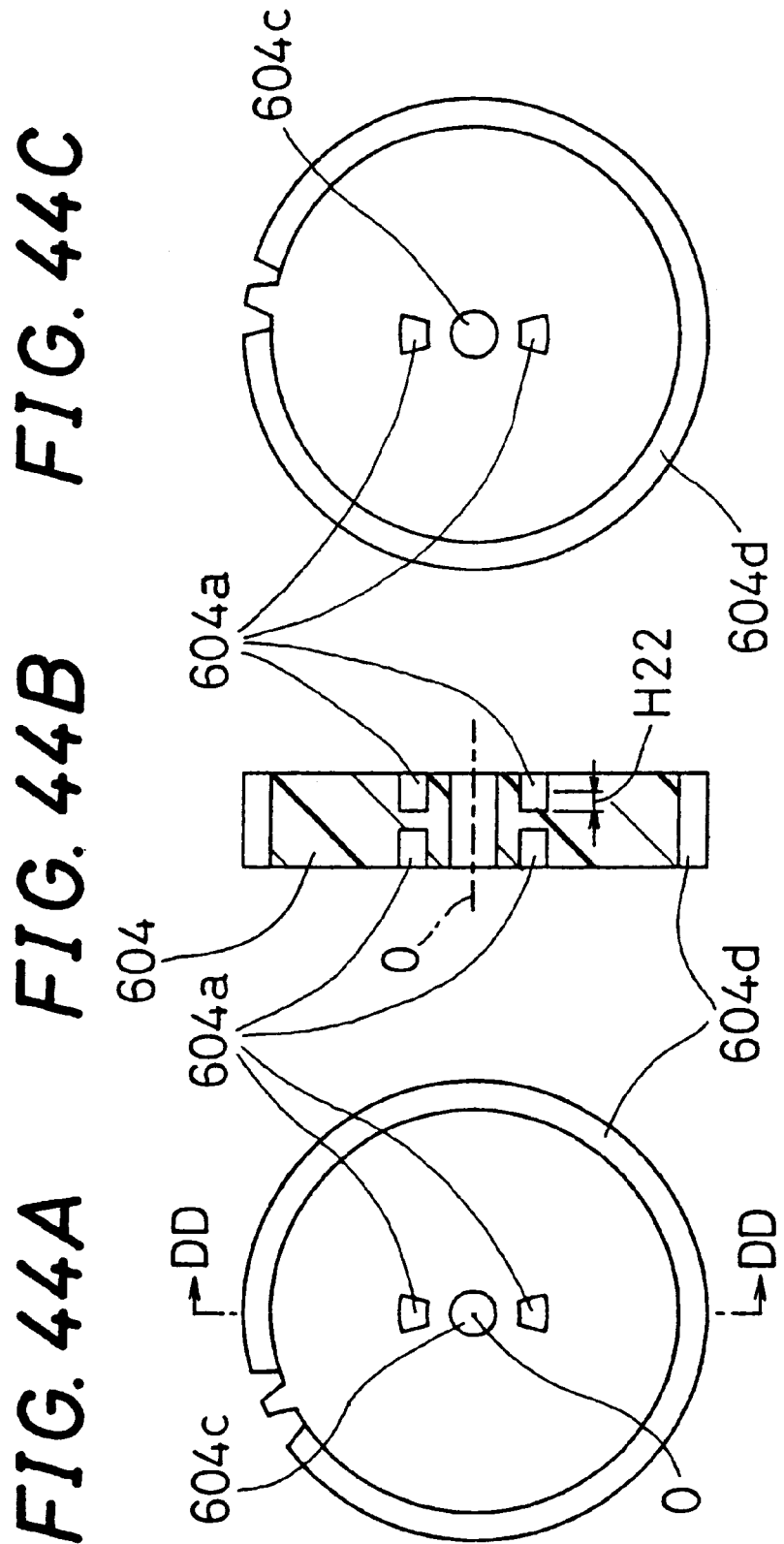

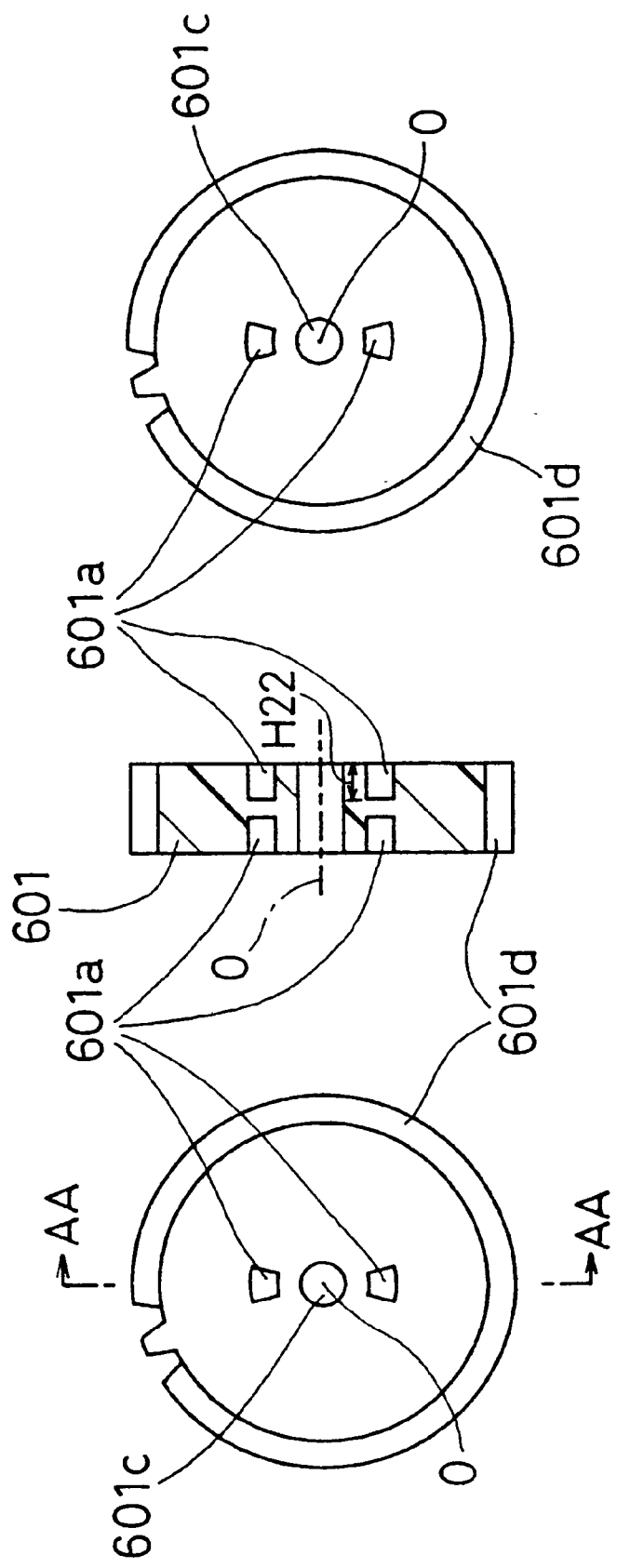

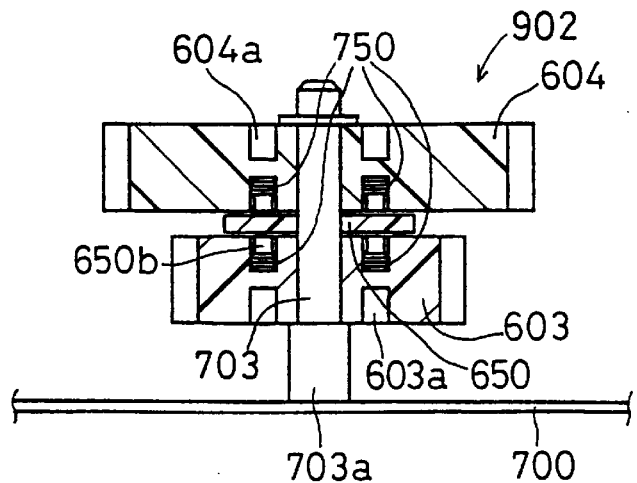
FIG. 49
FIG. 50A
FIG. 50B
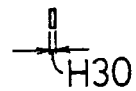
FIG. 51
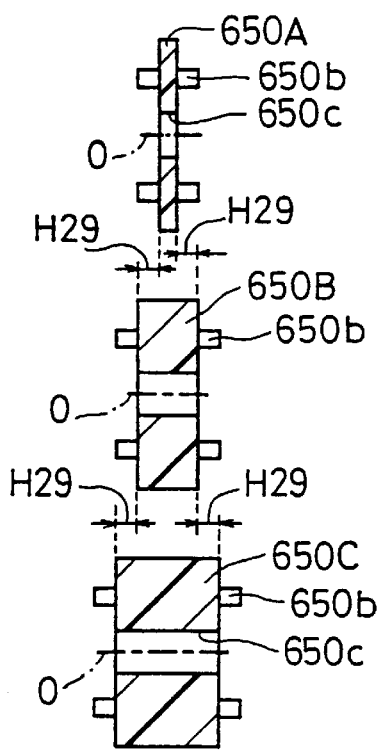

FIG. 58
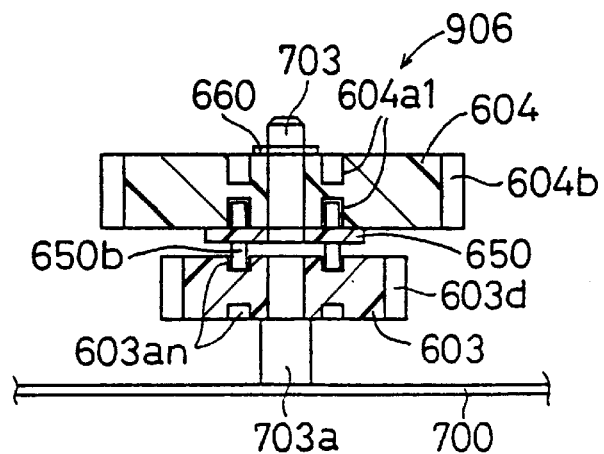
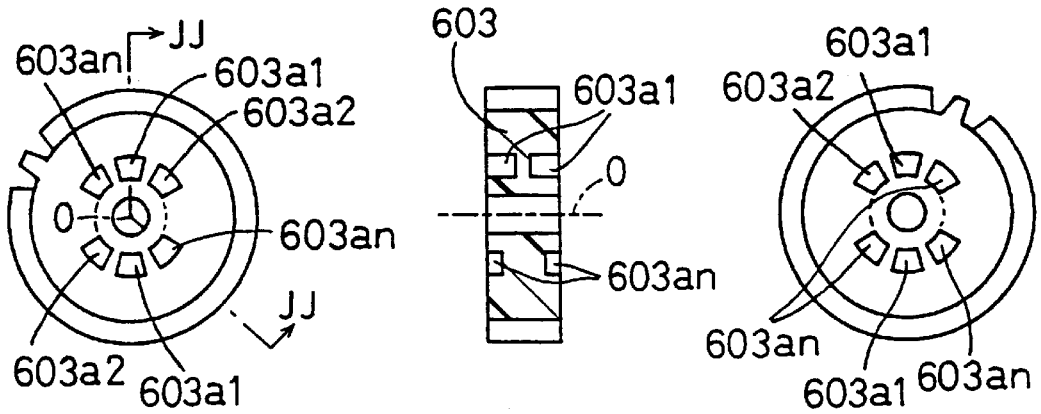
FIG. 59A    FIG. 59B    FIG. 59C

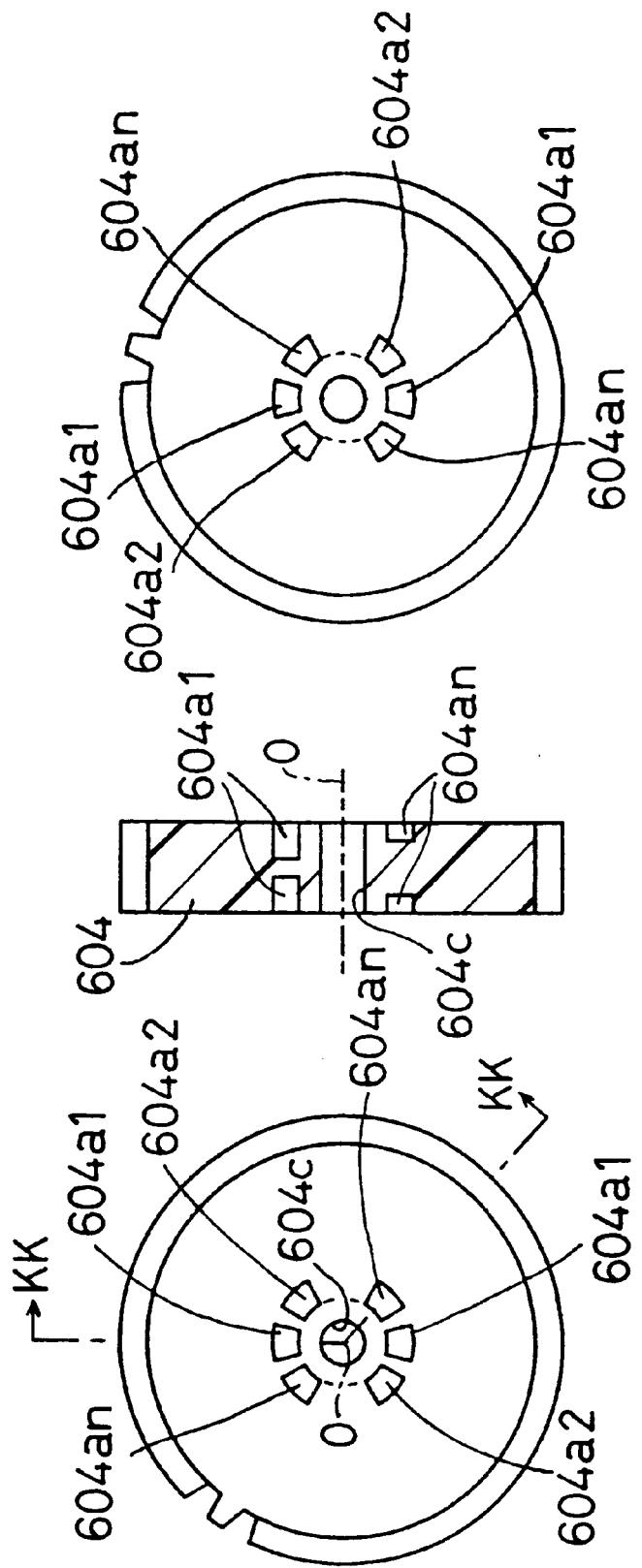

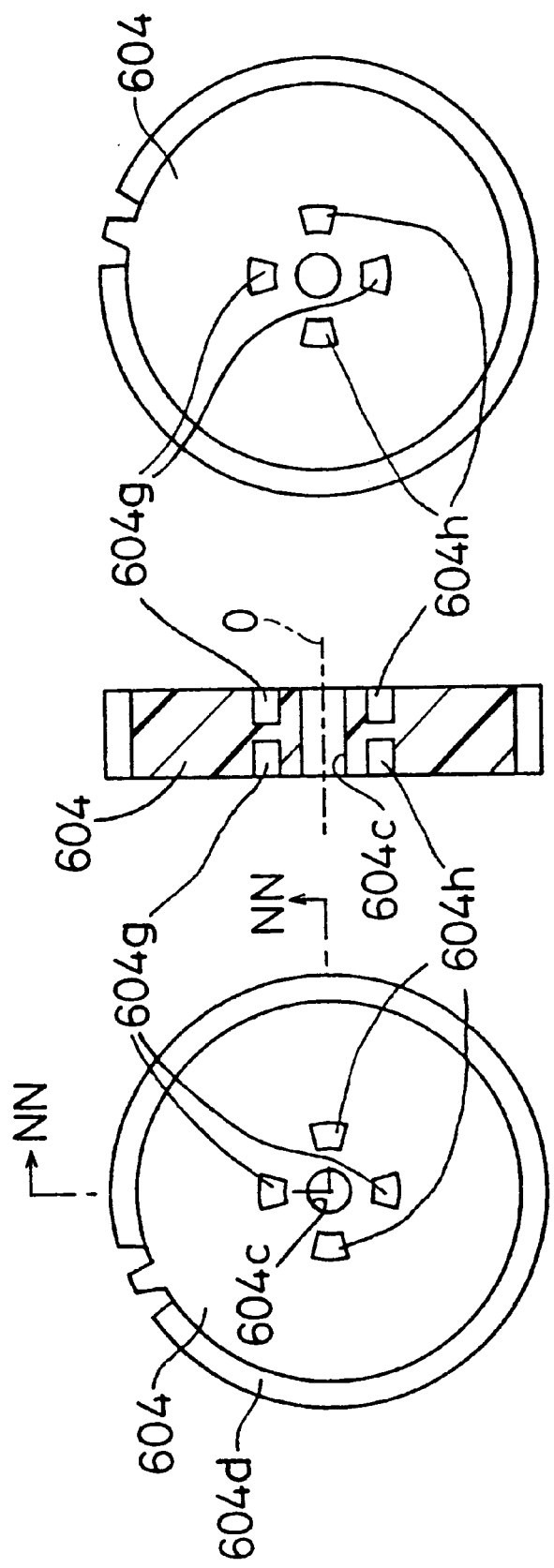

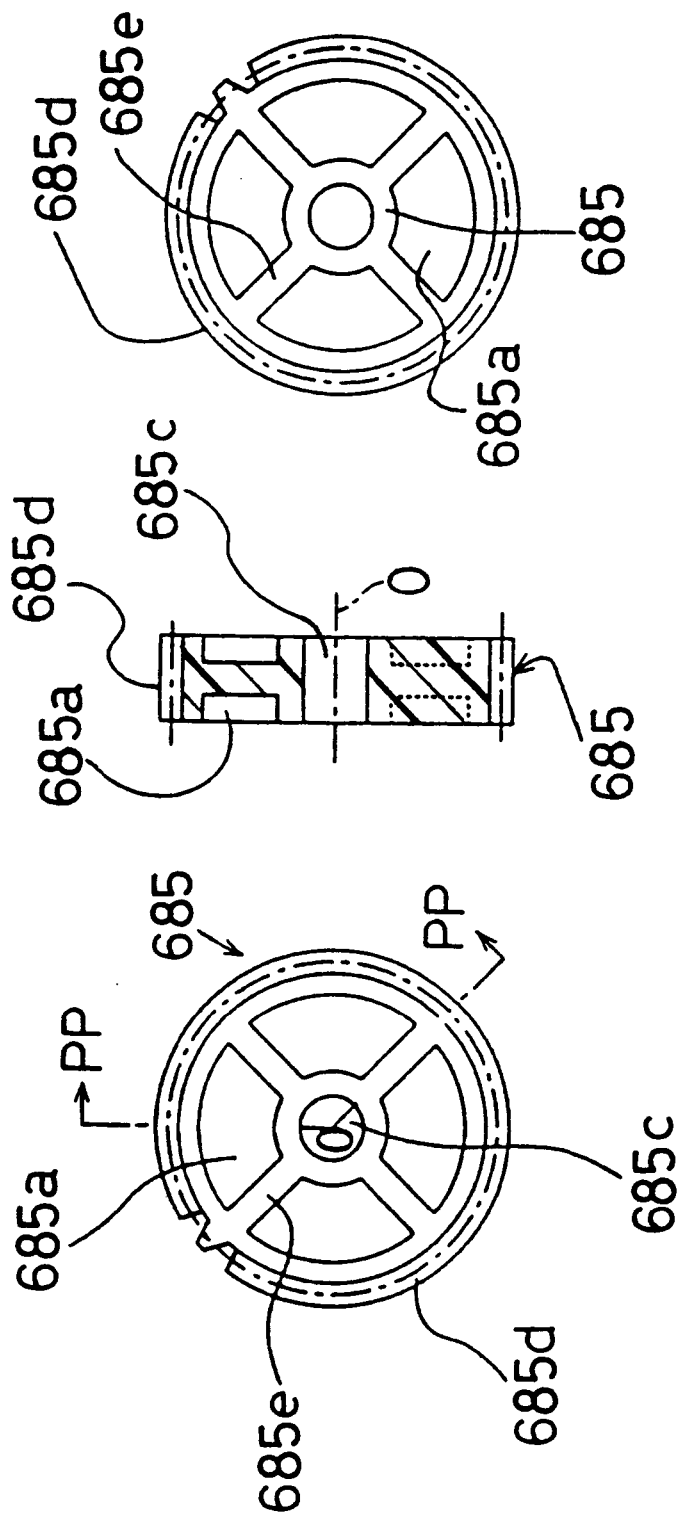

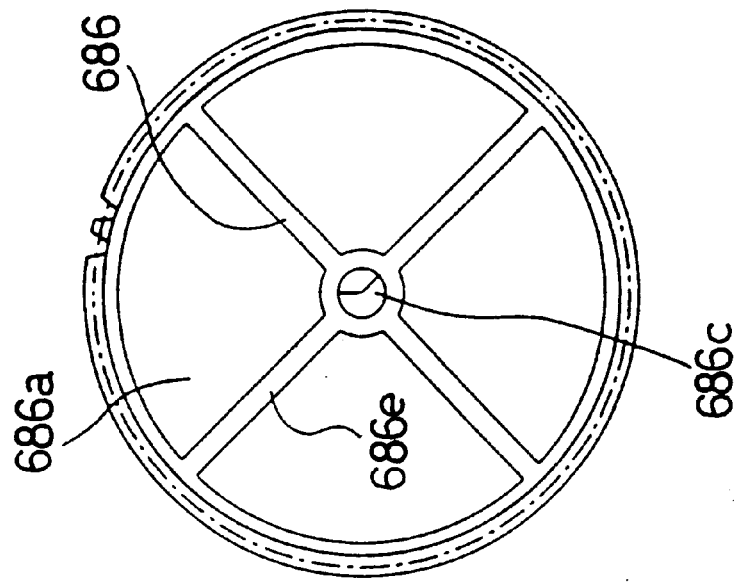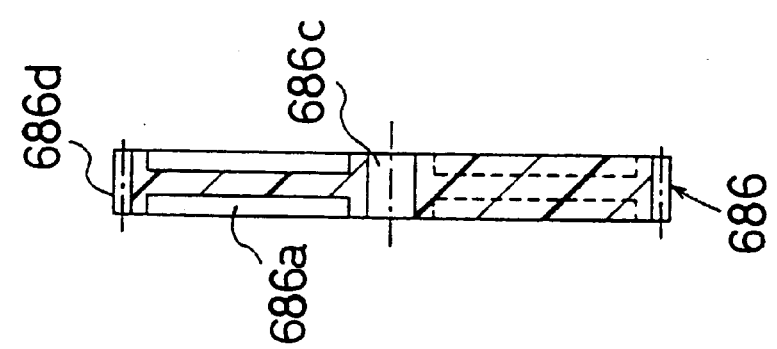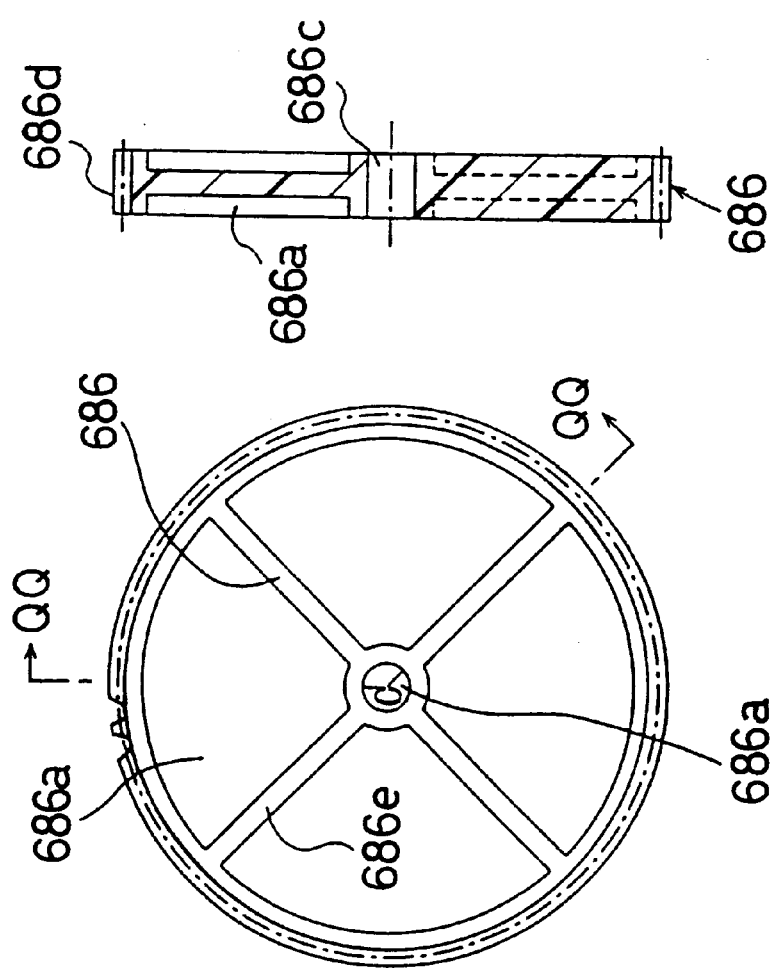

FIG. 72A  FIG. 72B  FIG. 72C
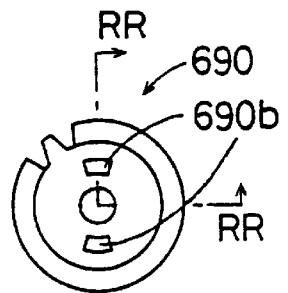 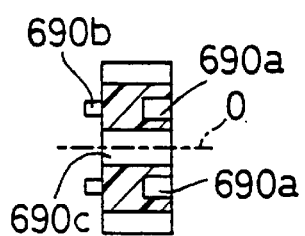 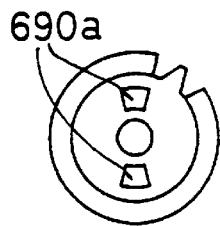
FIG. 73A  FIG. 73B  FIG. 73C
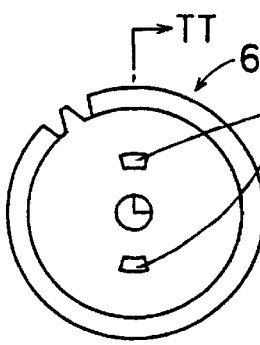 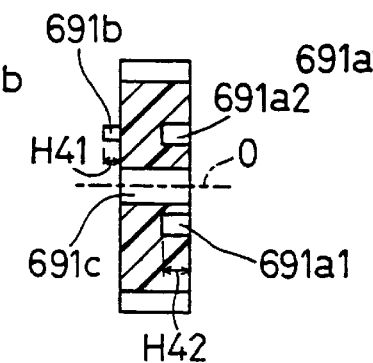 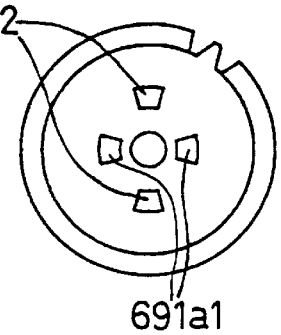

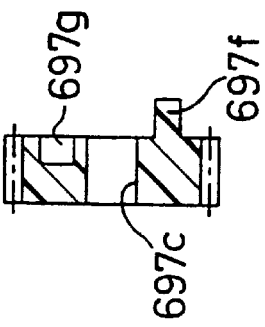
FIG. 82D
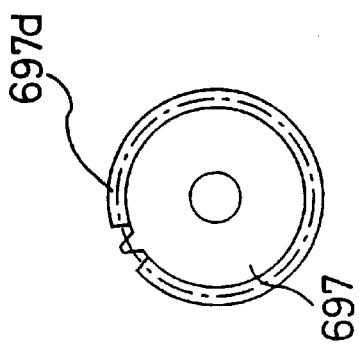
FIG. 82C
FIG. 82B
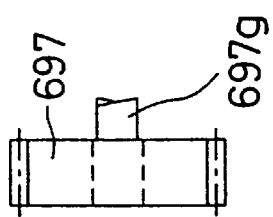
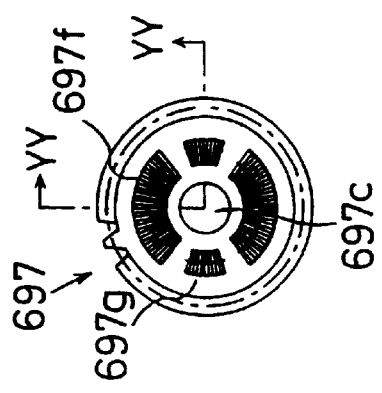
FIG. 82A

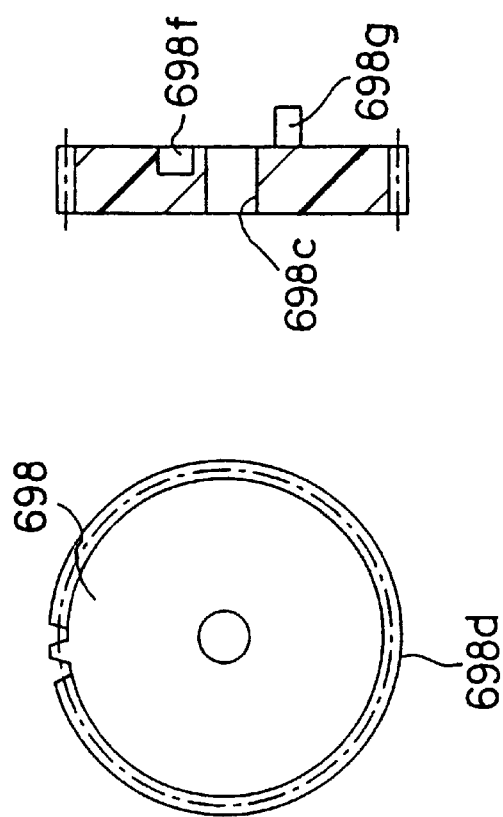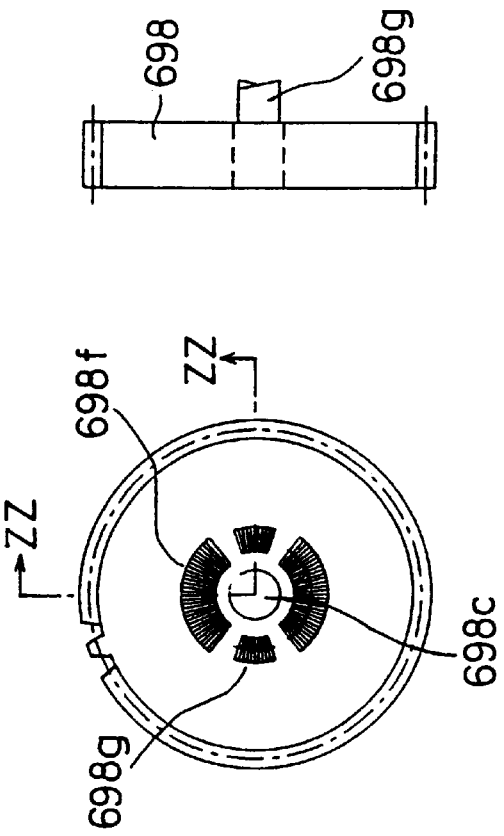

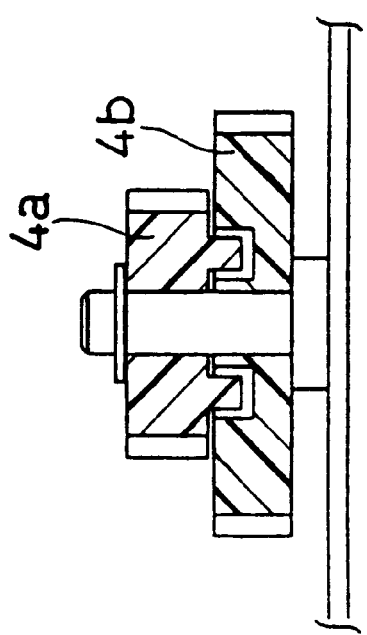
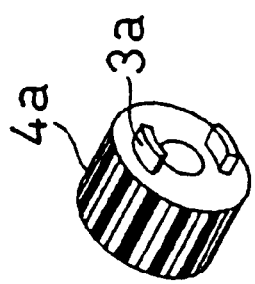
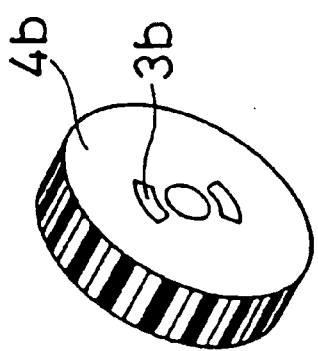

COUPLING STRUCTURE OF DRIVING FORCE TRANSMITTING MEMBERS

BACKGROUND OF THE INVENTION

1. Field of the Invention

The present invention relates to a driving force transmitting device which is disposed in various kinds of appliances typified by such an apparatus for processing picture image information as: a copying machine for printing and outputting picture image information obtained by scanning a picture image of an original document; a printer for printing and outputting picture image information sent from a partner; a facsimile machine for sending picture image information obtained by scanning a picture image of an original document; and a scanner for capturing picture image information by scanning a picture image of an original document. In specific, the invention relates to a coupling structure of driving force transmitting members such as a gear member and a pulley member for transmitting a driving force.

2. Description of the Related Art

With regard to such an apparatus for processing picture image information as a copying machine for printing and outputting picture image information obtained by scanning a picture image of an original document, a printer for printing and outputting picture image information sent from a printer, a facsimile machine for sending picture image information obtained by scanning a picture image of an original document, and a scanner for capturing picture image information by scanning a picture image of an original document, new models have been developed one after another in order to provide an apparatus which is easy to handle for the user, endowed with a more convenient function, and more inexpensive.

In such a situation, a driving force transmitting mechanism which transmits a force for driving various kinds of appliances and members which are incorporated in an apparatus for processing picture image information, from a power source to the appliances and members, was developed and has been improved in accordance with the development of new models, accompanying which various kinds of driving force transmitting parts for transmitting a driving force by rotating have been manufactured. These driving force transmitting parts are classified into one which is formed by a piece of driving force transmitting member such as a gear member having one gear portion and a pulley member having one pulley portion, and one which is formed into one piece by selectively combining a plurality of gear portions and pulley portions. Hereafter, the part formed into one piece by selectively combining gear portions, pulley portions and the like will be referred to as a complex-type driving force transmitting part.

However, since a lot of driving force transmitting parts are used in an apparatus for processing picture image information, there exist a lot of driving force transmitting parts which are similar to each other, and in driving force transmitting parts which are newly manufactured as new models are developed, there exist a lot of driving force transmitting parts which are similar to driving force transmitting parts which have been adopted in existing models. A driving force transmitting part having a gear portion will be taken as an example to explain the variety of the driving force transmitting parts. Main factors for classifying the driving force transmitting parts are the number of teeth, a module, the width of a tooth, and a material. On the basis of these main factors, the driving force transmitting parts are placed at a suitable position in a driving force transmitting device. Moreover, other than these main factors, various factors such as the diameter of an axis, the number of ribs, and the shape of the rib exist as ones which are related to the variety of the driving force transmitting parts.

In an apparatus for processing picture image information, the more kinds of driving force transmitting parts are used, the more kinds of molds for molding the driving force transmitting parts are needed because the driving force transmitting parts except some special ones are generally molded by a resin in a mold, with the result that the productivity of the apparatus for processing picture image information is worsened and the manufacturing cost is affected and increased. As opposed to this, such an idea can be conceived that in the course of developing an apparatus for processing picture image information, the same kind of driving force transmitting parts are used where possible so as to be capable of using the driving force transmitting parts in common even in different models including the existing models, whereby the variety of the driving force transmitting parts is reduced to cut off the cost for molds, and the manufacturing cost of the apparatus for processing picture image information and the price of the apparatus for processing picture image information are prevented from rising.

As mentioned above, however, in the driving force transmitting parts, there exist complex-type driving force transmitting parts $1a$, $1b$, $1c$ as shown in FIGS. 86A–86C. These complex-type driving force transmitting parts $1a$, $1b$, $1c$, in which two gear portions $2a$, $2b$; $2c$, $2d$; $2e$, $2f$ having the same axial line and adjacent to each other in the axial line direction are formed into one piece, respectively, are constructed so as to transmit a driving force through between the gear portions $2a$, $2b$, between the gear portions $2c$, $2d$, and between the gear portions $2e$, $2f$. Not only the part made by forming two gear portions into one piece, but also a part made by forming a gear portion and a pulley portion into one piece and a part made by forming two pulley portions into one piece are included in the complex-type driving force transmitting parts.

Although such a complex-type driving force transmitting part is necessary for design of a driving force transmitting mechanism of an apparatus for processing picture image information, it can be used in common at very few positions as compared with the driving force transmitting part which is formed by a single piece without combining driving force transmitting members, and it is difficult to use it in common. Moreover, since the complex-type driving force transmitting part has a complicated shape as compared with the driving force transmitting part formed by a single piece without combining driving force transmitting members, the cost for molds is expensive. Furthermore, an idea to reduce the variety of these complex-type driving force transmitting parts is difficult to realize, and hence such an idea has not been conceived currently.

Apart from such a problem, Japanese Unexamined Patent Publication JP-A 4-246025 (1992) discloses a structure that one gear member and two pulley members serving as a plurality of driving force transmitting members which are rotatable about the same axial line and formed into different pieces, are coupled so as to transmit a driving force by rotating. The respective pulley members and the gear member are placed in a manner that the gear member is sandwiched by the pulley members, and are constructed so that a rotation force of the gear member can be transmitted to the respective pulley members which are adjacent to each other in the axial line direction of the gear, by engaging projections formed on the respective pulley members with nails formed on the gear member within through holes formed on the respective pulley members.

Based on such a technique as disclosed by JP-A 4-246025, as shown in FIGS. 87A–87C, it can be considered to couple a gear member 4a having convex coupling portions 3a and a gear member 4b having concave coupling portions 3b by making the convex coupling portions 3a to be fitted into the concave coupling portions 3b so as to rotate and transmit a driving force, thereby fabricating a complex-type driving force transmitting part 5. According to this idea, however, there are two problems as described below.

Firstly, in the case of using the same kind of driving force transmitting members, i.e., gear members, when gear members having the same main factors as mentioned above are combined to form a complex-type driving force transmitting part, two patterns of gear members including a gear member having a convex coupling portion and a gear member having a concave coupling portion are required in spite of using one kind of gear members. Secondly, when plural kinds of gear members are combined to form a complex-type driving force transmitting part, in order to enable to fabricate all kinds of complex-type driving force transmitting parts which can be combined, it is necessary to prepare two patterns of gear members for each kind, as well as when the same kind of gear members are assembled.

These problems are opposed to questing commonality of driving force transmitting parts and reducing the number of molds, and the technique as shown in FIGS. 87A–87C cannot accomplish the above-said object of enhancing the productivity of an apparatus for processing picture image information and reducing the manufacturing cost.

SUMMARY OF THE INVENTION

Therefore, it is an object of the invention to provide a coupling structure of driving force transmitting members, capable of increasing variation of complex-type driving force transmitting part which can be assembled from a plurality of driving force transmitting members, as many as possible.

The invention provides a coupling structure of driving force transmitting members, comprising;

a plurality of driving force transmitting members each having at least one of a concave coupling portion and a convex coupling portion formed on one side in a direction of an axial line thereof, wherein at least one of the plurality of driving force transmitting members further has the other of a concave coupling portion and a convex coupling portion on another side in the direction of the axial line thereof, and the plurality of driving force transmitting members are selectively used with the at least one driving force transmitting member having the convex and concave coupling portions and coupled by the concave and convex coupling portions so as to transmit a driving force by rotating about the axial line and to be detachable in the direction of the axial line.

According to the invention, the driving force transmitting members for transmitting a driving force by rotating are provided with at least one of the concave coupling portion and the convex coupling portion, and coupled by the concave coupling portion or the convex coupling portion so as to transmit a driving force by rotating about the axial line and to be detachable in the axial line direction. When the respective driving force transmitting members are coupled, the respective driving force transmitting members may be coupled by making the convex coupling portion of one driving force transmitting member to be directly fitted into the concave coupling portion of the other driving force transmitting member, or may be coupled by interposing another member between the respective driving force transmitting members, and making the convex coupling portion of the driving force transmitting member to be fitted into the concave coupling portion of the other member or making the convex coupling portion of the other member to be fitted into the concave coupling portion of the driving force transmitting member.

At least one of the respective driving force transmitting members to be coupled by the concave coupling portion and the convex coupling portion in this fashion has a concave coupling portion on one side in the axial line direction and a convex coupling portion on the other side in the axial line direction. Accordingly, the other driving force transmitting member and the other member can be coupled with the driving force transmitting member having the respective coupling portions individually on each side when having either the concave coupling portion or the convex coupling portion. By thus disposing the driving force transmitting member having the respective coupling portions individually on each side, it is possible to increase the variety of complex-type driving force transmitting parts which can be fabricated by a selective combination of a plurality of driving force transmitting members. Therefore, it is possible to decrease the variety of driving force transmitting members which are necessary to fabricate a required kind of complex-type driving force transmitting part, and decrease the variety of molds. Moreover, as compared with molding the same part as a complex-type driving force transmitting part by using one mold, the shape of the mold is simple. Thus, since it is possible to decrease the variety of molds and simplify the shape thereof, the productivity of a complex-type driving force transmitting part is enhanced and the manufacturing cost is reduced. Needless to say, the driving force transmitting member can be used independently.

In the invention, the rotation includes an angular displacement of less than 360°.

In the invention it is preferable that each of the driving force transmitting members is supported so as to be rotatable by a rotation supporting member which is pierced thereinto, and the coupling structure comprises a displacement preventing member which is detachably attached to the rotation supporting member, for preventing the driving force transmitting members from being displaced with respect to the rotation supporting member in a direction of an axial line thereof, and a spacer member having a thickness more than a projection height of the convex coupling portion, which spacer member is attached to the side of the driving force transmitting member where the convex coupling portion is formed, the at least one of the driving force transmitting members is coupled with another driving force transmitting member on the side where the concave coupling portion is formed; and the spacer member is placed on the side of the at least one driving force transmitting member, where the convex coupling portion is formed, and the displacement preventing member is attached to a portion of the rotation supporting member, which portion is projected from the spacer member.

According to the invention, the respective driving force transmitting members are rotatably supported by the rotation supporting member pierced thereinto, and are prevented from being displaced with respect to the rotation supporting member and falling off from the rotation supporting member, by the displacement preventing member attached to the rotation supporting member. In the driving force transmitting members having a convex coupling portion, a spacer member can be placed on the side thereof where the convex coupling portion is formed. Since this spacer member has a thickness larger than a projection height of the convex coupling portion, the convex coupling portion is not projected from the spacer member in a state where the spacer member is placed on the driving force transmitting member.

Consequently, the at least one of the driving force transmitting members is coupled with another driving force transmitting member, on the side where the concave coupling portion is formed, and in the case where the side where the convex coupling portion is formed is free, the spacer member is placed on the free side where the convex coupling portion is formed, in order to prevent the driving force transmitting member from being displaced with respect to the rotation supporting member, whereby an area can be ensured for placing the displacement preventing member and for an operation of attaching/detaching the member, regardless of a position of the convex coupling portion such that the convex coupling portion is formed in the vicinity of the rotation supporting member, without obstructed by the convex coupling portion, in the axial line direction and the radial direction.

Therefore, even when the convex coupling portion is formed in the vicinity of the rotation supporting member in a state where the rotation supporting member is pierced into the respective driving force transmitting members, the area for placing the displacement preventing member can be ensured by using the spacer member, and there is no need to use a special member as the displacement preventing member. In other words, as well as it is possible to prevent the respective driving force transmitting members from being displaced with respect to the rotation supporting member by disposing the same displacement preventing members on the sides where the convex coupling portions are formed and on the sides where the concave coupling portions are formed, it is possible to simplify the operation of attaching/detaching the displacement preventing member, and it is possible to quicken and simplify an operation of coupling the driving force transmitting members to fabricate a complex-type driving force transmitting part and an operation of disassembling the complex-type driving force transmitting part. As the displacement preventing member, it is possible to use, for example, a commercially available member such as an E ring and a C ring, which is easy to obtain.

In the invention it is preferable that each of the driving force transmitting members is supported so as to be rotatable by a rotation supporting member which is pierced thereinto, and the coupling structure comprises a displacement preventing member which is detachably attached to the rotation supporting member, for preventing the driving force transmitting members from being displaced with respect to the rotation supporting member, the driving force transmitting member having the convex coupling portion is provided with an area for attaching/detaching the displacement preventing member onto and from the rotation supporting member, which area is formed more inward in a radial direction than the convex coupling portion, the at least one of the driving force transmitting members is coupled with another driving force transmitting member on the side where the concave coupling portion is formed, and in the area of the at least one driving force transmitting member, formed more inward in the radial direction than the convex coupling portion, the displacement preventing member is attached to a portion of the rotation supporting member, the portion being projected from the said at least one driving force transmitting member.

According to the invention, each of the driving force transmitting members are supported so as to be rotatable by the rotation supporting member pierced thereinto, and prevented from being displaced with respect to the rotation supporting member and falling off from the rotation supporting member, by the displacement preventing member attached to the rotation supporting member. In a case where each of the driving force transmitting members has a convex coupling portion, an area is ensured for placing the displacement preventing member and for an operation of attaching/detaching the member, on the side of this driving force transmitting member, where the convex coupling portion is formed.

Therefore, there is no need to use a special member as the displacement preventing member which is attached to the rotation supporting member in order to prevent the driving force transmitting members from being displaced with respect to the rotation supporting member. In other words, as well as it is possible to prevent the respective driving force transmitting members from being displaced with respect to the rotation supporting member by disposing the same displacement preventing members on the sides where the convex coupling portions are formed and on the sides where the concave coupling portions are formed, it is possible to simplify the operation of attaching/detaching the displacement preventing member, and it is possible to quicken and simplify an operation of coupling the driving force transmitting members to fabricate a complex-type driving force transmitting part and an operation of disassembling the complex-type driving force transmitting part. As the displacement preventing member, it is possible to use, for example, a commercially available member such as an E ring and a C ring, which is easy to obtain. Further, the projection amount of the rotation supporting member can be decreased.

In the invention it is preferable that the driving force transmitting member having a convex coupling portion has, in addition to the convex coupling portion, a concave coupling portion formed on the side where the convex coupling portion is formed.

According to the invention, the driving force transmitting member having a convex coupling portion has a concave coupling portion on a side where the convex coupling portion is formed, so that when the respective driving force transmitting members have the convex coupling portions, it is possible to couple the driving force transmitting members in a status that the sides on which the convex coupling portions are formed face each other. Consequently, driving force transmitting members having the convex coupling portions only on one sides, can be coupled in a state where the convex coupling portions are not free. Therefore, it is possible to shorten the length in the axial direction, of a complex-type driving force transmitting part fabricated by coupling the driving force transmitting members.

In particular, when the respective driving force transmitting members are prevented from being displaced with respect to the rotation supporting member, by piercing the rotation supporting member into the respective driving force transmitting members and attaching the displacement preventing member to the rotation supporting member, an area is ensured for placing the displacement preventing member on a free side of each of the driving force transmitting members. There is no need to use a special member as the displacement preventing member which is attached to the rotation supporting member, in order to prevent the respective driving force transmitting members from being displaced with respect to the rotation supporting member and prevent the respective driving force transmitting members from falling off from the rotation supporting member. As well as it is possible to use the same displacement preventing members on the sides where the convex coupling portions are formed and on the sides where the concave coupling portions are formed, it is possible to simplify the operation of attaching/detaching the displacement preventing member, and it is possible to quicken and simplify an operation of coupling the driving force transmitting members to fabricate a complex-type driving force transmitting part and an operation of disassembling the complex-type driving force transmitting part. As the displacement preventing member, it is possible to use, for example, a commercially available member such as an E ring and a C ring, which is easy to obtain. Further, the projection amount of the rotation supporting member can be decreased.

In the invention it is preferable that the coupling structure comprises a space setting member interposed between the respective driving force transmitting members, for setting a space between the respective driving force transmitting members in accordance with a thickness of the space setting member.

According to the invention, since the space setting member is interposed between the respective driving force transmitting members, it is possible to set the space between the respective driving force transmitting members in accordance with the thickness of the space setting member. Further, as compared with a configuration of forming a portion for setting a space between the respective driving force transmitting members when they are coupled, into one piece with the driving force transmitting member, it is possible to limit the increase of the variety of driving force transmitting members.

In the invention it is preferable that the space setting member is provided selectively with a concave coupling portion or a convex coupling portion, on both sides in a direction of an axial line thereof; and the respective driving force transmitting members and the space setting member are coupled by the concave coupling portions or the convex coupling portions of the driving force transmitting members and the space setting member, so as to transmit a driving force by rotating about the axial line and to be detachable in the axial line direction.

According to the invention, the space setting member is provided selectively with a concave coupling portion or a convex coupling portion, on both sides in the axial line direction, and the respective driving force transmitting members and the space setting member are coupled by the concave coupling portions or the convex coupling portions of the respective driving force transmitting members and the space setting member, so as to transmit a rotating force about the axial line and so as to be attachable/detachable in the axial line direction. As a result, even when the respective driving force transmitting members need to be spaced as largely as it is impossible to make the convex coupling portions of the respective driving force transmitting members to be fitted into the concave coupling portions, the respective driving force transmitting members can be coupled via the space setting member so as to transmit a driving force by rotating.

In the invention it is preferable that the space setting member has concave coupling portions on both sides in a direction of an axial line.

According to the invention, since the space setting member has concave coupling portions on both sides in the axial line direction, the respective driving force transmitting members can be coupled with the space setting member in a status that the convex coupling portions thereof are fitted into the concave coupling portions of the space setting member. As a result, it is possible to shorten the length in the axial direction, of a complex-type driving force transmitting part which is fabricated by coupling the driving force transmitting members. In particular, in the case of using the rotation supporting member, it is possible to decrease the projection amount thereof.

In the invention it is preferable that one or more space setting members are selectively used and interposed between the respective driving force transmitting members.

According to the invention, one or more space setting members are selectively used and interposed between the respective driving force transmitting members. Consequently, by using a few kinds of, and in the case of the least, one kind of space setting members, it is possible to couple the driving force transmitting members in a state where the spaces between the respective driving force transmitting members are set to be different from each other.

In the invention it is preferable that each of the driving force transmitting members has a fitting hole which pierces therethrough in the direction of the axial line thereof; and a plurality of ring-shaped axial diameter setting members which can be fit to the fitting holes of the driving force transmitting members and provided with piercing holes having different inner diameters, are selectively used and fitted to the respective fitting holes, and the rotation supporting member is pierced into the piecing holes of the axial diameter setting members, whereby the respective driving force transmitting members are rotatably supported.

According to the invention, the respective driving force transmitting members have fitting holes which pierce therethrough in the axial line direction, and axial diameter setting members can be fit into the respective fitting holes of the respective driving force transmitting members. The axial diameter setting members are ring-shaped. A plurality of axial diameter setting members having different inner diameter are selectively used and fitted into the fitting holes of the respective driving force transmitting members, and the rotation supporting axis is pierced into the piecing holes of the axial diameter setting members, whereby the respective driving force transmitting members are supported so as to be rotatable. As a result, in the case of rotatably supporting the respective driving force transmitting members by rotation supporting members having different outer diameters, there is no need to prepare the driving force transmitting members corresponding to the outer diameters of the rotation supporting members, so that only one kind of driving force transmitting members are required even when the outer diameters of the rotation supporting members are different.

The invention provides a coupling structure of driving force transmitting members, comprising;

a plurality of driving force transmitting members each having at least one of a concave coupling portion and a convex coupling portion formed on one side in a direction of an axial line thereof, and a plurality of coupling members each having at least one of a concave coupling portion and a convex coupling portion on one side in a direction of an axial line thereof and at least one of a concave coupling portion and a convex coupling portion on another side in the axial line direction, wherein the plurality of driving force transmitting members are selectively used and coupled by connecting the concave or convex coupling portions of the driving force transmitting members with the convex and concave coupling portions of one or more of the coupling members so as to transmit a driving force by rotating about the axial line and to be detachable in the axial line direction.

According to the invention, the driving force transmitting members for transmitting a driving force by rotating have at least one of the concave coupling portion and the convex coupling portion in the axial line direction, and the coupling members for coupling these driving force transmitting members have at least one of the concave coupling portion and the convex coupling portion on both sides in the axial line direction. The driving force transmitting members are coupled by the concave coupling portions or the convex coupling portions formed on the respective driving force transmitting members, via the coupling members, so as to transmit a driving force by rotating about the axial line and so as to be attachable/detachable in the axial line direction.

Thus, the driving force transmitting members coupled by the concave coupling portions and the convex coupling portions, are coupled via the coupling members which have at least one of the concave coupling portions and the convex coupling portions on both sides in the axial line direction. Therefore, the respective driving force transmitting members have at least one of the concave coupling portions and the convex coupling portions on one sides in the axial line direction, whereby the driving force transmitting members can be coupled via the coupling members. In other words, by disposing the coupling members which have at least one of the concave coupling portions and the convex coupling portions on both sides in the axial line direction, it is possible to increase the variety of complex-type driving force transmitting parts which can be fabricated by selectively combining a plurality of driving force transmitting members having at least one of the concave coupling portion and the convex coupling portion on one side in the axial line direction. Therefore, it is possible to decrease the variety of driving force transmitting members which are necessary to fabricate a required kind of complex-type driving force transmitting part, and decrease the variety of molds. Moreover, as compared with molding the same part as a complex-type driving force transmitting part by using one mold, the shape of the mold is simple. Thus, since it is possible to decrease the variety of molds and simplify the shape thereof, it is possible to enhance the productivity of a complex-type driving force transmitting part and reduce the manufacturing cost.

In particular, in the case where three types of coupling members each having a coupling member which has concave coupling portions on both sides in the axial line direction, a coupling member which has convex coupling portions on both sides in the axial line direction, and a coupling member which has a concave coupling portion on one side in the axial line direction and a convex coupling portion on the other side in the axial line direction, are prepared as the coupling members, all driving force transmitting members can be coupled via the coupling members when the driving force transmitting members have at least one of the concave coupling portion and the convex coupling portion on one side in the axial line direction.

Furthermore, by selecting the number of the coupling members interposed between the respective driving force transmitting members, it is possible to select and set the space between the respective driving force transmitting members. In addition, it is possible to prevent the number of variations of driving force transmitting member from increasing, as compared with the configuration of forming a portion for setting the space between the respective driving force transmitting members when they are coupled, into one piece with the driving force transmitting member. Needless to say, the driving force transmitting member can be used independently. In the invention, rotation includes an angular displacement of less than 360°.

In the invention it is preferable that each of the driving force transmitting members has a concave coupling portion on one side in a direction of an axial line thereof, and the coupling member has convex coupling portions on both sides in the axial line direction thereof.

According to the invention, each of the driving force transmitting members has a concave coupling portion on one side in the axial line direction, and the coupling member has convex coupling portions on both sides in the axial line direction. Therefore, it is possible to couple the driving force transmitting members via the coupling members by making the respective convex coupling portions of the coupling members to be fitted into the concave coupling portions of the respective driving force transmitting members. Furthermore, since each of the driving force transmitting members does not have a convex coupling portion at least on one side in the axial line direction, the thickness of each of the driving force transmitting members can be decreased. Therefore, when the driving force transmitting members are used independently, it is easy to place them because they hardly interfere another member or the like.

Further, in the case where the driving force transmitting members are used independently, since the convex coupling portion is not formed on one side in the axial line direction of the respective driving force transmitting members when the rotation supporting member is pierced into the respective driving force transmitting members and the displacement preventing member is attached to the rotation supporting member so as to prevent the respective driving force transmitting members from being displaced with respect to the rotation supporting member, it is possible to ensure an area for placing the displacement preventing member. Therefore, there is no need to use a special member as the displacement preventing member attached to the rotation supporting member, in order to prevent the driving force transmitting members from being displaced with respect to the rotation supporting member and prevent the driving force transmitting members from falling off from the rotation supporting member. Further, it is possible to simplify the operation of attaching/detaching the displacement preventing member, and it is possible to quicken and simplify an operation of coupling the driving force transmitting members to fabricate a complex-type driving force transmitting part and an operation of disassembling the complex-type driving force transmitting part. As the displacement preventing member, it is possible to use, for example, a commercially available member such as an E ring and a C ring, which is easy to obtain. Further, the projection amount of the rotation supporting member can be decreased.

In the invention it is preferable that at least one of the driving force transmitting members to be coupled is a pulley member on which a belt is stretched; and at least a portion of the coupling member is projected more outward in a radial direction than a portion where the belt of the pulley member is stretched.

According to the invention, at least one of the driving force transmitting members to be coupled is a pulley member, and at least a portion of the coupling member is projected more outward in the radial direction than a portion where the belt of the pulley member is stretched. As a result, it is possible to prevent the belt stretched on the pulley member from being displaced in the axial direction, and there is no need to form a guard portion for preventing the belt from being displaced in the axial direction, at least on the coupling member side of the pulley member. Therefore, it is possible to decrease the thickness of the pulley member in the axial direction, and manufacture the pulley member in a simple fashion. Further, when the pulley member is used upon designing a complex-type driving force transmitting member, it is not necessary to consider the thickness of a guard portionso that the flexibility of designing is increased.

In the invention it is preferable that a plurality of coupling members are provided which can be coupled so as to transmit a driving force by rotating about an axial line and to be detachable in a direction of the axial line, and a plurality of space setting members are interposed between the driving force transmitting members and the coupling members, spaces between the respective driving force transmitting members are set by selectively using one or more coupling members and one or more space setting members.

According to the invention, space setting members are interposed between the driving force transmitting members and the coupling members, and the spaces between the respective driving force transmitting members can be set in accordance with the thickness and the number of the space setting members. The space setting members can be made to be thinner than the coupling members, so that the setting can be made in detail as compared with the case of using the coupling members only. Further, as compared with a configuration that a part for setting spaces between the respective driving force transmitting members when they are coupled, is formed into one piece with the driving force transmitting members, it is possible to limit the increase of the variety of the driving force transmitting members.

In the invention it is preferable that each of the coupling members has a convex coupling portion at least on one side in a direction of an axial line, at least one of the driving force transmitting members is provided with a plurality of concave coupling portions which have depths smaller than a projection height of the convex coupling portion of the coupling member and different from each other, and which have bottoms, on one side in the axial line direction; and the convex coupling portion of the coupling member is selectively fitted into the concave coupling portion of the driving force transmitting member.

According to the invention, the convex coupling portion of a coupling member is selectively fitted into the concave coupling portion of a driving force transmitting member which is provided with a plurality of concave coupling portions having different depths, whereby it is possible to select a space between the coupling member and the driving force transmitting member provided with a plurality of concave coupling portions having different depths. As a result, it is possible to select spaces between the respective driving force transmitting members, without using an extra member for setting the spaces between the respective driving force transmitting members.

In the invention it is preferable that each of the driving force transmitting members has a concave coupling portion on one side in a direction of an axial line, a plurality of coupling members are interposed between the respective driving force transmitting members, and the coupling member has convex coupling portions on both sides in the axial line direction and has a plurality of concave coupling portions which have depths smaller than a projection height of the convex coupling portions and different from each other, and which have bottoms, at least on one side in the axial line direction; and the coupling members are coupled by selectively fitting the convex coupling portion into the concave coupling portion.

According to the invention, the respective coupling members interposed between the respective driving force transmitting members are coupled by selectively fitting the convex coupling portions into the plurality of concave coupling portions having different depths, whereby it is possible to select the length in the axial line direction of the coupling member. Consequently, it is possible to select spaces between the respective driving force transmitting members, without using an extra member for setting the spaces between the respective driving force transmitting members.

In the invention it is preferable that each of the driving force transmitting members has a fitting hole into which a rotation supporting member pierced into the respective driving force transmitting members to rotatably support, is pierced, and a plurality of ring-shaped axial diameter setting members which can be fit into the respective fitting holes of the respective driving force transmitting members and provided with piercing holes having different inner diameters, are selectively used and fitted into the fitting holes, and the rotation supporting member is pierced into the piecing holes of the axial diameter setting members, whereby the respective driving force transmitting members are supported so as to rotate.

According to the invention, the respective driving force transmitting members have fitting holes which are pierced in the axial line direction, and axial diameter setting members are fittable into the fitting holes of the respective driving force transmitting members. The axial diameter setting members are ring-shaped. A plurality of axial diameter setting members having different inner diameters are selectively used and fitted into the fitting holes of the respective driving force transmitting members, and the rotation supporting axis is pierced into the piecing holes of the axial diameter setting members, whereby the respective driving force transmitting members are supported so as to be rotatable. Consequently, in the case of rotatably supporting the respective driving force transmitting members by rotation supporting members having different outer diameters, there is not need to prepare the respective driving force transmitting members so as to correspond to the outer diameters of the rotation supporting members, so that only one kind of driving force transmitting members are required even when the outer diameters of the rotation supporting members are different from each other.

In the invention it is preferable that the concave coupling portions formed on the driving force transmitting members or the coupling members have concave coupling portions into which the convex coupling portions of the coupling members or the driving force transmitting members are fitted in a status of close fits, and concave coupling portions into which the convex coupling portions of the coupling members or the driving force transmitting members are fitted in a status of clearance fits.

According to the invention, the convex coupling portions formed on the coupling members or the driving force transmitting members can be selectively fitted into either of the two concave coupling portions formed on the driving force transmitting members or the coupling members, that is, concave coupling portions to be close fits and concave coupling portions to be clearance fits. In other words, in accordance with a placing condition of the driving force transmitting members, a coupling status of the driving force transmitting members can be selected. For instance, in a case where the driving force transmitting members are rotatably disposed with the rotation supporting member pierced thereinto, when the driving force transmitting members are constructed so as to rotate together with the rotation supporting member, the convex coupling portions are fitted into the concave coupling portions to be close fits and a play between the concave coupling portions and the convex coupling portions is removed, whereby it is possible to reduce a noise which is generated during operation, and when the driving force transmitting members are constructed so as to rotate about the rotation supporting member, the convex coupling portions are fitted into the concave coupling portions to be clearance fits, whereby it is possible to prevent that unnecessary load is put between the respective driving force transmitting members.

In the invention it is preferable that the driving force transmitting member has a fitting portion into which a coupling member is fitted.

According to the invention, since the driving force transmitting member has a fitting portion into which a coupling member is fitted, the respective driving force transmitting members can be placed in a-status that a space made by interposing a coupling member between the respective driving force transmitting members is removed.

In the configurations of the inventions, the concave coupling portion and the convex coupling portion may be formed in a region whose radius is between the axial line and the perimeter portion of a driving force transmitting member having the smallest effective diameter, whereby it is possible to couple all driving force transmitting members regardless of effective diameters of the driving force transmitting members. Further, the concave coupling portion and the convex coupling portion may have a shape and a dimension which are determined based on a force put on the convex coupling portion at the time of transmitting a driving force, whereby it is possible to supply a sufficient strength to the convex coupling portion without forming the concave coupling portion and the convex coupling portion to be unnecessarily large. Furthermore, the concave coupling portion and the convex coupling portion may be formed into a shape which is elongated in the perimeter direction. As a result, it is possible to decrease the area of a section which is perpendicular to the axial line direction of the convex coupling portion, and increase the strength toward a force which is put at the time of transmitting a driving force. Assuming the largest torque which is generated in the course of coupling a driving force transmitting member having the largest effective diameter with a driving force transmitting member having the smallest effective diameter, the concave coupling portion and the convex coupling portion may be determined to have a shape and a dimension which are enough to transmit the largest torque. Consequently, it is possible to make the convex coupling portion have a sufficient strength by coupling the driving force transmitting members in any combination.

In the invention it is preferable that the concave coupling portions and the convex coupling portions formed on the driving force transmitting members and the coupling members, are selectively formed in a plurality of regions which have different distances from the axial line.

According to the invention, by interposing a coupling member, it is also possible to couple driving force transmitting members which have the concave coupling portions or the convex coupling portions at positions different in the radial direction. Consequently, a driving force transmitting member having a comparatively large effective diameter is provided with the concave coupling portion or the convex coupling portion on a side as outward in the radial direction as possible, and a force put on the convex coupling portion at the time of transmitting a driving force is minimized, whereby a driving force can be transmitted in a stable manner.

The invention provides a coupling structure of driving force transmitting members, comprising:

a plurality of driving force transmitting members each having concave and convex coupling portions formed on one side and another side in a direction of an axial line thereof, respectively, wherein the concave coupling portion is formed at least in a region which is the most inward in a radial direction among a plurality of different regions preset in a radial direction, and as an effective diameter of the driving force transmitting member becomes larger, in accordance with then effective diameter, the concave coupling portion is formed in a region more outward in the radial direction, the convex coupling portion is formed in a region where a concave coupling portion the most outward in the radial direction is formed, and the plurality of driving force transmitting members are selectively used and coupled by the concave coupling portions or the convex coupling portions so as to transmit a driving force by rotating about the axial line and to be detachable in the axial line direction.

According to the invention, the driving force transmitting members for transmitting a driving force by rotating are provided with concave coupling portions and convex coupling portions on both sides in the axial line direction, respectively, and coupled by the concave coupling portions and the convex coupling portions so as to transmit a driving force by rotating about the axial line and to be detachable in the axial line direction. When the driving force transmitting members are coupled, the driving force transmitting members are coupled by directly fitting the convex coupling portion of one driving force transmitting member into the convex coupling portion of the other driving force transmitting member.

Each of the driving force transmitting members has a concave coupling portion on one side in the axial line direction and a convex coupling portion on the other side in the axial line direction. Thus, the respective driving force transmitting members can be arbitrarily selected and coupled, whereby it is possible to increase the variety of complex-type driving force transmitting parts which can be fabricated by selectively combining a plurality of driving force transmitting members. Therefore, it is possible to decrease the variety of driving force transmitting members which are necessary for fabricating a required kind of complex-type driving force transmitting part, and decrease the variety of molds. Furthermore, as compared with molding the same part as a complex-type driving force transmitting member by using one mold, the shape of the mold is simple. Thus, since it is possible to decrease the variety of molds and simplify the shape thereof, the productivity of a complex-type driving force transmitting part is enhanced and the manufacturing cost can be reduced.

Furthermore, the concave coupling portions are formed in from a region which is the most inward in the radial direction to a region which is the most outward in the radial direction in accordance with the effective diameters of the driving force transmitting members, respectively, and the convex coupling portions are formed in a region of a concave coupling portion which is formed the most outward in the radial direction. Thus, since the convex coupling portions are formed in a region which is as outward in the radial direction as possible, it is possible to minimize a force put on the convex coupling portions at the time of transmitting a driving force. Further, the concave coupling portions are formed in from a region which is the most inward in the radial direction to a region which is the most outward in the radial direction in accordance with the effective diameters of the driving force transmitting members, with the result that regarding two driving force transmitting members which are selected, convex coupling portions of one of the driving force transmitting members can be surely fitted into any of the concave coupling portions of the other driving force transmitting member, and the two driving force transmitting members arbitrarily selected can be coupled with each other.

Needless to say, the driving force transmitting member can be used independently.

The invention provides a coupling structure of driving force transmitting members, comprising:

a plurality of driving force transmitting members, and engaging means formed on one side in a direction of an axial line of the driving force transmitting members, wherein the engaging means is provided with a plurality of concave portions and a plurality of projections, alternately, which are uniformly spaced in a direction of a perimeter so as to be adjacent to each other, the concave portions and the projections being formed at positions which are deviated by a preset distance in one of axial line directions, as shifted by a preset distance in one of perimeter directions; and the plurality of driving force transmitting members are selectively used and coupled by selectively fitting the concave portions into the projections and engaging the engaging means, so as to mutually transmit a rotation force about the axial line and so as to be mutually attachable/detachable in the axial line direction.

According to the invention, the driving force transmitting member for transmitting a driving force by rotating is provided with engaging means on one side in the axial line direction, and the engaging means is provided with a plurality of concave portions and projections, alternately, which are uniformly spaced in the perimeter direction so as to be adjacent to each other. The driving force transmitting members can be coupled by selectively fitting the projections into the concave portions and engaging the engaging means. Thus, the driving force transmitting members can be arbitrarily selected and coupled, whereby it is possible to increase the variety of complex-type driving force transmitting parts which can be fabricated by selectively combining a plurality of driving force transmitting members. Therefore, it is possible to decrease the variety of driving force transmitting members which are necessary for fabricating a required kind of complex-type driving force transmitting part, and decrease the variety of molds. Furthermore, as compared with molding the same part as a complex-type driving force transmitting member by using one mold, the shape of the mold is simple. Thus, since it is possible to decrease the variety of molds and simplify the shape thereof, the productivity of a complex-type driving force transmitting part is enhanced and the manufacturing cost can be reduced.

Further, the concave portions and the projections formed on the engaging means are formed at positions which are deviated by a preset distance in the axial line direction, as shifted by a present distance in the perimeter direction, and mutual positional relations of the driving force transmitting members can be selected by selecting the concave portions into which the projections are fitted. Therefore, it is not necessary to dispose an extra member for setting the positional relation between the driving force transmitting members. Further, an operation of setting the positional relation of the driving force transmitting members is easy, as compared with the case of using an extra member.

Needless to say, the driving force transmitting member can be used independently.

The invention provides a coupling structure of driving force transmitting members, comprising:

a plurality of driving force transmitting members;

engaging means formed in a collapsed region on one side in a direction of an axial line of the plurality of driving force transmitting members; and a coupling member which has engaging means in elevated regions on both sides in the direction of the axial line direction, wherein the engaging means of the driving force transmitting members and the coupling members are provided with a plurality of concave portions and a plurality of projections, alternately, which are uniformly spaced in a direction of a perimeter so as to be adjacent to each other, the concave portions and the projections being formed at positions which are deviated by a preset distance in one of axial line directions, as shifted by a preset distance in one of the perimeter directions; and the plurality of driving force transmitting means are selectively used and coupled by selectively fitting the concave portions into the projections of the coupling member and engaging the engaging means, via the coupling member, so as to mutually transmit a rotation force about the axial line and to be detachable in the axial direction.

According to the invention, the driving force transmitting member for transmitting a driving force by rotating is provided with engaging means in a collapsed region on one side in the axial line direction, and the coupling member for coupling the driving force transmitting members is provided with engaging means in elevated regions on both sides in the axial line direction. The engaging means is provided with a plurality of concave portions and projections, alternately, which are spaced in the perimeter direction so as to be adjacent to each other. The respective driving force transmitting members, it is possible to engage the respective engaging means by selectively fitting the respective concave portions and projections of the driving force transmitting members, and the respective concave portions and projections of the coupling members, whereby it is possible to couple the respective driving force transmitting members via the coupling members. Thus, the respective driving force transmitting members can be arbitrarily selected and coupled, so that it is possible to increase the variety of complex-type driving force transmitting parts which can be fabricated by selectively combining a plurality of driving force transmitting members. Therefore, it is possible to decrease the variety of driving force transmitting members which are necessary for fabricating a required kind of complex-type driving force transmitting part, and decrease the variety of molds. Furthermore, as compared with molding the same part as a complex-type driving force transmitting member, by using one mold, the shape of the mold is simple. Thus, since it is possible to decrease the variety of molds and simplify the shape thereof, the productivity of a complex-type driving force transmitting part is enhanced and the manufacturing cost can be reduced.

Further, the respective concave portions and projections formed on the engaging means are formed at positions which are deviated by a preset distance in the axial line direction, as shifted by a present distance in the perimeter direction, and mutual positional relations of the respective driving force transmitting members can be selected by selecting the concave portions into which the projections are fitted. Therefore, it is not necessary to dispose an extra member for setting the positional relations between the respective driving force transmitting members or prepare an extra mold. Further, an operation of setting the positional relations of the respective driving force transmitting members is easier, as compared with the case of using an extra member. Furthermore, the driving force transmitting member can be used independently, in which case, the engaging means of the driving force transmitting member is formed in the collapsed region and hence an inconvenience such that the engaging means is projected will never occur.

BRIEF DESCRIPTION OF THE DRAWINGS

Other and further objects, features, and advantages of the invention will be more explicit from the following detailed description taken with reference to the drawings wherein:

Figures 7A, 7B, 7C:
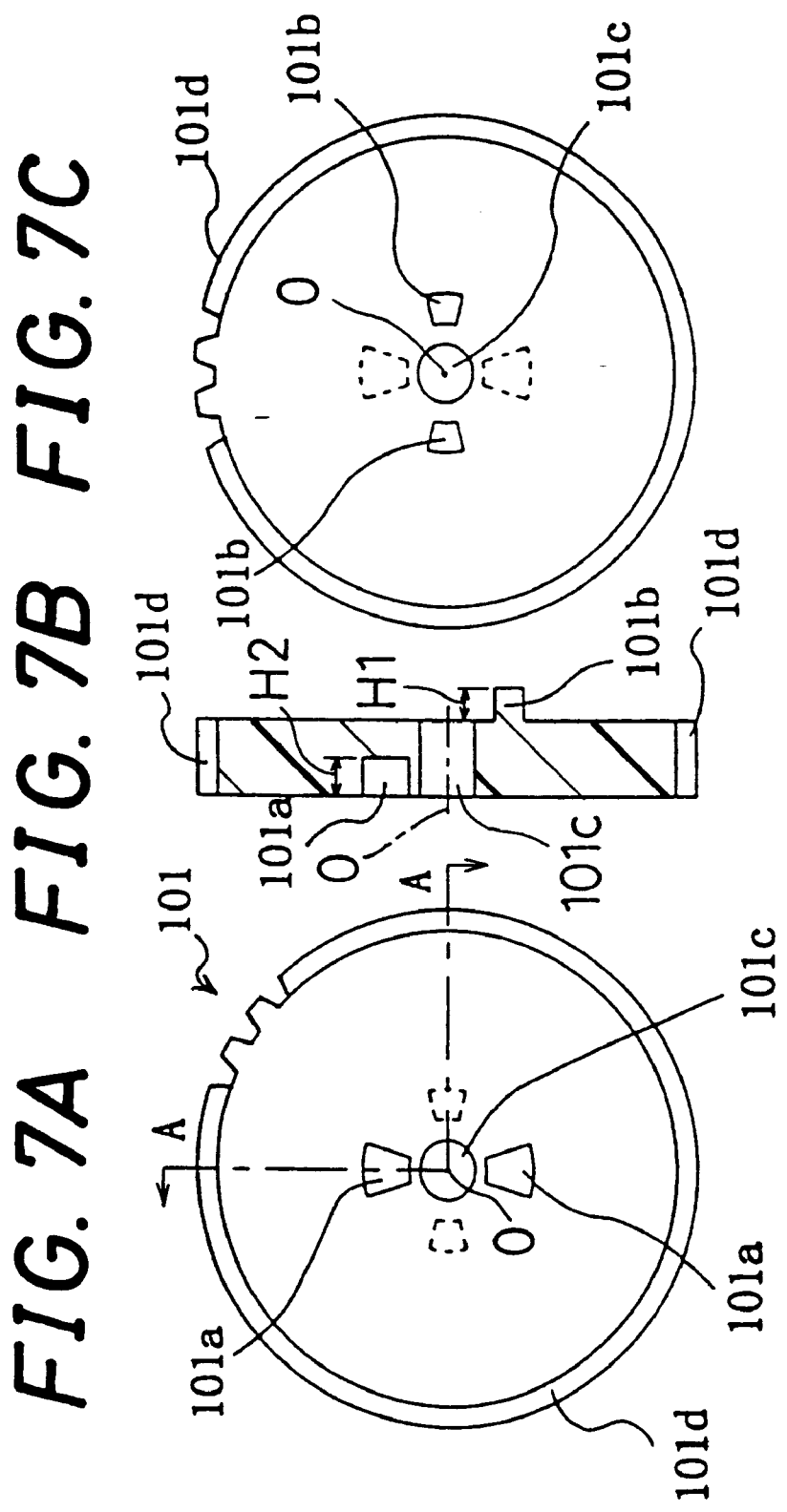

FIGS. 7A–7C are views showing a gear member 101, FIG. 7A being a front view, FIG. 7B being a section view, and FIG. 7C being a rear view;

FIGS. 18A–18D are views showing a gear member 103 of another embodiment, FIG. 18A being a front view, FIG. 18B being a section view, FIG. 18C being a section view, and FIG. 18D being a rear view;

FIGS. 19A–19D are views showing a gear member 104 of another embodiment, FIG. 19A being a front view, FIG. 19B being a section view, FIG. 19C being a section view, and FIG. 19D being a rear view;

FIGS. 44A–44C are views showing a gear member 604, FIG. 44A being a front view, FIG. 44B being a section view, and FIG. 44C being a rear view;

FIGS. 45A–45C are views showing a gear member 601, FIG. 45A being a front view, FIG. 45B being a section view, and FIG. 45C being a rear view;

FIG. 49 is a section view showing a coupling structure of driving force transmitting members of still another embodiment of the invention;

FIGS. 50A and 50B are views showing a space setting member 750, FIG. 50A being a front view, and FIG. 50B being a section view;

FIG. 51 is a section view showing coupling members 650A–650C;

FIG. 58 is a view showing a coupling member of still another embodiment of the invention;

FIGS. 59A–59C are views showing a gear member 603 of another embodiment, FIG. 59A being a front view, FIG. 59B being a section view, and FIG. 59C being a rear view;

FIGS. 60A–60C are views showing a gear member 604 of another embodiment, FIG. 60A being a front view, FIG. 60B being a section view, and FIG. 60C being a rear view;

FIGS. 63A–63C are views showing a gear member 604 of still another embodiment, FIG. 63A being a front view, FIG. 63B being a section view, and FIG. 63C being a rear view;

FIGS. 70A–70C are views showing a gear member 685 of still another embodiment, FIG. 70A being a front view, FIG. 70B being a section view, and FIG. 70C being a rear view;

FIGS. 71A–71C are views showing a gear member 686 of still another embodiment, FIG. 71A being a front view, FIG. 71B being a section view, and FIG. 71C being a rear view;

FIGS. 72A–72C are views showing a gear member 690 of still another embodiment, FIG. 72A being a front view, FIG. 72B being a section view, and FIG. 72C being a rear view;

FIGS. 73A–73C are views showing a gear member 691 of still another embodiment, FIG. 73A being a front view, FIG. 73B being a section view, and FIG. 73C being a rear view;

FIGS. 82A–82D are views showing a gear member 697 of still another embodiment, FIG. 82A being a front view, FIG. 82B being a side view, FIG. 82C being a rear view, and FIG. 82D being a section view;

FIGS. 83A–83D are views showing a gear member 698 of still another embodiment, FIG. 83A being a front view, FIG. 83B being a side view, FIG. 83C being a rear view, and FIG. 83D being a section view;

FIGS. 87A–87C are views showing a complex–type driving force transmitting member of a prior art, FIG. 87A being a perspective view showing a gear member 4b, FIG. 87B being a perspective view showing a gear member 4a, and FIG. 87C being a section view showing a part fabricated by the gear members 4a and 4b.

DETAILED DESCRIPTION OF THE PREFERRED EMBODIMENTS

Figure 1:
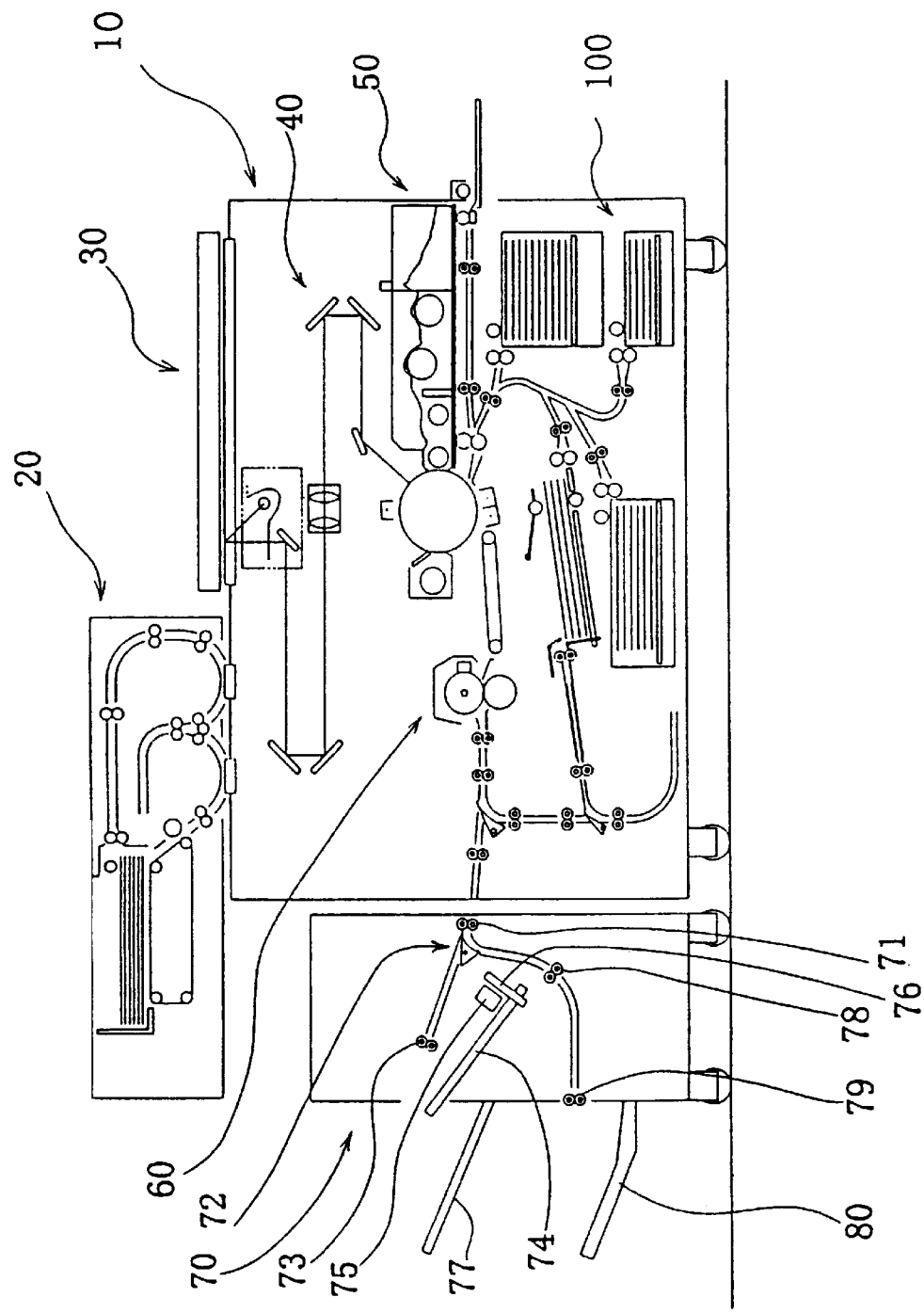
FIG. 1 is a section view showing a copying machine in which a coupling structure of driving force transmitting members of the invention is implemented.

Now referring to the drawings, preferred embodiments of the invention are described below.

FIG. 1 is a section view diagrammatically showing a main configuration of a copying machine serving as one of picture image processing apparatuses to which a coupling structure of driving force transmitting members of the invention is applied.

Figure 2:
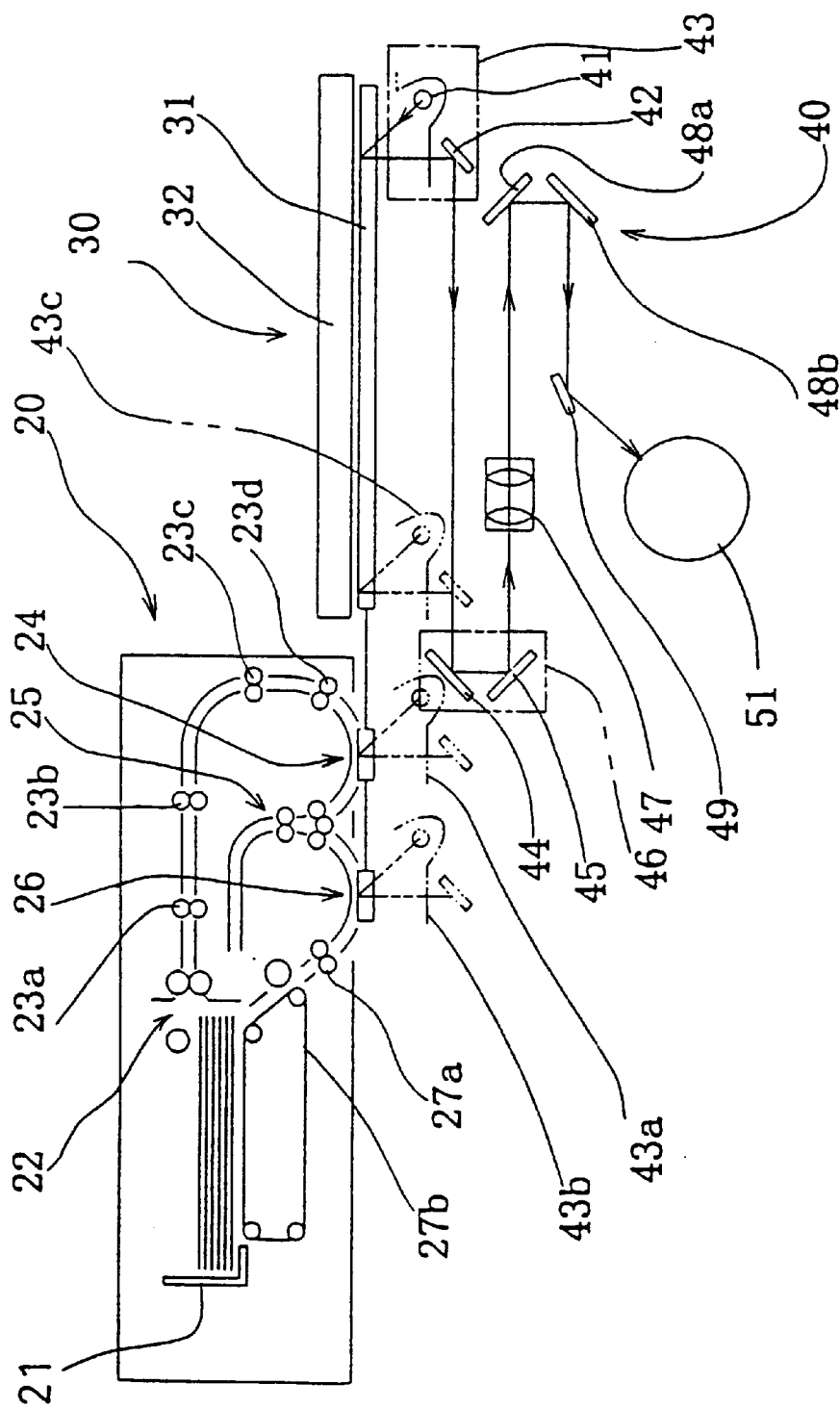
FIG. 2 is a section view showing a circulation-type automatic original-document feeding device, a manual original-document holding device and an optical device of the copying machine.
Figure 3:
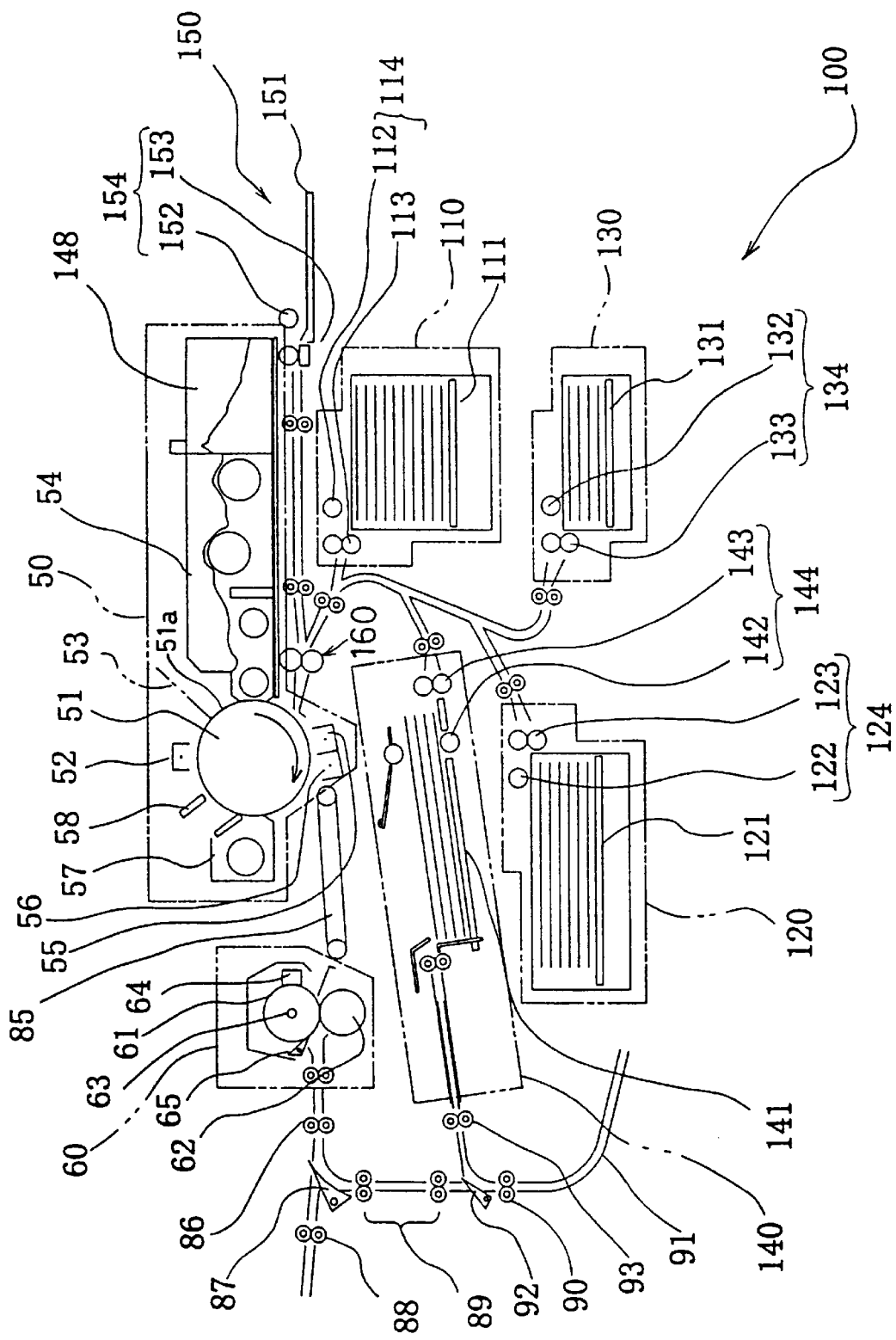
FIG. 3 is a section view showing an image forming device, a fixing device and a sheet feeding device of the copying machine.

FIG. 2 is a section view diagrammatically showing a circulation-type automatic original-document feeding device, a manual original-document holding device and an optical device of the copying machine shown in FIG. 1. FIG. 3 is a section view diagrammatically showing an image forming device, a fixing device and a sheet feeding device of the copying machine shown in FIG. 1.

As shown in FIG. 1, the copying machine serving as an image processing apparatus is equipped with a circulation-type automatic original-document feeding device 20 and a manual original-document holding device 30 on which an original document is manually set, on the top of a main body 10 of the copying machine. In the main body 10 of the copying machine, an optical device 40 is embedded upward, an image forming device 50 and a fixing device 60 are embedded in the middle, and a sheet feeding device 100 is embedded downward with partially exposed outside. Further, an aftertreatment device 70 is disposed on one side of the main body 10 of the copying machine (on the left side in FIG. 1).

As shown in FIG. 2, a plurality of original documents which are stacked in an original document holder 21 of the circulation-type automatic original-document feeding device 20, are separated by original-document separating/feeding means 22, and sent by original-document feeding rollers 23a, 23b, 23c, 23d, to a first original-document exposing section 24 on which a transparent member such as contact glass is placed, thereby being placed with one surface face the first original-document exposing section 24. After passing through the first original-document exposing section 24, the original documents are reversed by original-document reversing means 25 which is made by a switch back mechanism, and are placed so that a surface which is opposite to the surface facing the first original-document exposing section 24 faces a second original-document exposing section 26. Furthermore, after passing through the second original-document exposing section 26, the original documents are returned to the bottom of the original documents held in the original-document holder 21, by original-document returning means 27a, 27b. Thus, the circulation-type automatic original-document feeding device 20 can sequentially feed original documents to the first original-document exposing section 24 and the second original-document exposing section 26, and the original documents fed by the circulation-type automatic original-document feeding device 20 to the first original-document exposing section 24 and the second original-document exposing section 26, are exposed and scanned by the optical device 40 which will be illustrated later by an original-document moving system.

On the contrary, the manual original-document holding device 30 is composed of contact glass 31 and an original-document cover 32 which is disposed on the top of the contact glass 31 so as to open. When placing an original document on this manual original-document holding device 30, the operator manually opens the original-document cover 32 and places the original document at a reference position for placing an original document on the contact glass 31. When the original-document cover 32 is closed in this status, the original document is pushed onto the contact glass 31 by the original-document cover 32. When this manual original-document holding device 30 is used, the original document placed on the contact glass 31 in a standstill status, is exposed and scanned by the optical device 40 which will be illustrated later by the original-document standstill method.

The optical device 40 embedded upward in the main body 10 of the copying machine, comprises a scanning unit 43 which is integrally equipped with an exposing lamp 41 and a first mirror 42, a moving mirror unit 46 which is integrally equipped with a second mirror 44 and a third mirror 45, a scaling lens 47, a fourth mirror 48a, a fifth mirror 48b, and a sixth mirror 49. The optical device 40 causes the exposing lamp 41 to irradiate the surface of an original document, while causing the scanning unit 43 to scan along the original document surface, and guides a reflection light which is reflected on the original document surface, via the first mirror 42, the second mirror 44, the third mirror 45, the scaling lens 47, the fourth mirror 48a, the fifth mirror 48b, and the sixth mirror 49, onto the surface of a photosensitive member 51 which will be illustrated later, thereby forming an optical image by using the reflection light showing the image of the original document.

In a case where the circulation-type automatic original-document feeding device 20 is used to automatically feed a plurality of original documents by a mechanical operation and to expose and scan the original document surface, when the original document surfaces facing the first original-document exposing section 24 are to be exposed and scanned, the scanning unit 43 halts at a halting position 43a for the first original-document exposing section so as to expose and scan the original documents passing a position which fronts the first original-document exposing section 24, depending on the movement of the original document, and when the original document surfaces facing the second original-document exposing section 26 are to be exposed and scanned, the scanning unit 43 halts at a halting position 43b for the second original-document exposing section to expose and scan the original documents passing a position which fronts the second original-document exposing section 26, depending on the movement of the original document.

On the contrary, in a case where the operator uses the manual original-document holding device 30 and places one original document on the contact glass in a standstill status to expose and scan the original document surface, the scanning unit 43 exposes the original document while moving from a stand-by position 43c which corresponds to one end (left end in FIG. 2) of the contact glass 31, to the other end (right end in FIG. 2). At this moment, the moving mirror unit 46 moves in the same direction at a half speed of the moving speed of the scanning unit 43.

As shown in FIG. 3, the image forming device 50 embedded in the middle of the main body 10 of the copying machine is provided with main components such as a charger 52, an exposing optical path 53, developing means 54, a transferring unit 55, a peeling discharger 56, a cleaner 57, and a discharging lamp 58, sequentially, around a photosensitive member 51, in a rotating direction A of the photosensitive member 51 (a clockwise direction in FIG. 3). The charger 52 supplies electric charge onto the rotating photosensitive member 51, thereby charging the surface of the photosensitive member 51 uniformly. Next, when the surface of the photosensitive member 51 charged uniformly by the charger 52 reaches an exposure opening region 51a facing the exposing optical path 53, a reflection light of an original document captured and guided from the optical device 40 is irradiated onto the photosensitive member 51 through the exposing optical path 53, whereby the uniform electric charge on the surface of the photosensitive member 51 is changed into electric charge which corresponds to an image of the original document and an electrostatic latent image is formed on the surface of the photosensitive member 51.

Subsequently, when the surface of the photosensitive member 51 on which the electrostatic latent image is formed, shifts to a position facing the developing means 54, a developer of inverse polarity to the electric charge forming the electrostatic latent image is supplied by the developing means 54, and the developer adheres to the electrostatic latent image due to an electrostatic force, whereby the electrostatic latent image becomes a developer image which is developed. Next, the surface of the photosensitive member 51 on which the developer image is formed, reaches a position facing the transferring unit 55, electric charge of the same polarity as the electric charge on the surface of the photosensitive member 51 is supplied from the transferring unit 55 to a sheet which is fed from the sheet feeding device 100 to the photosensitive member 51, and the electric potential of the sheet adhered to the photosensitive member 51 becomes higher than that of the surface of the photosensitive member 51, whereby the developer image on the surface of the photosensitive member 51 is inhaled toward the sheet and the developer image is transferred from the surface of the photosensitive member 51 onto the sheet.

Subsequently, electric charge of inverse polarity to the electric charge supplied by the transferring unit 55 is supplied by the peeling discharger 56 which is adjacent to the transferring unit 55, the adhesion between the surface of the photosensitive member 51 and the sheet is decreased, and the sheet is peeled off the surface of the photosensitive member 51 with the developing image carried. Furthermore, when the surface of the photosensitive member 51 shifts and reaches a position facing the cleaner 57, a developer residue on the surface of the photosensitive member 51 which does not shift at the time of transferring, is removed from the surface of the photosensitive member 51. Next, when the surface of the photosensitive member 51 from which the developer residue has removed, shifts to a position facing the discharging lamp 58, the discharging lamp 58 emits a discharging light to decrease the electric potential of the surface of the photosensitive member 51 almost uniformly, whereby it is possible to avoid that the surface of the photosensitive member 51 keeps too high electric potential and decreases uniformity of the electric potential when charged by the charger 52. While these processes are executed successively, an image of an original document exposed and scanned is formed as a developer image on a sheet. The developer collected by the cleaner 57 is sent to a developer collecting vessel 148 via a developer collecting/conveying path which is not shown.

The above-said sheet feeding device 100 which feeds sheets to a transferring position of the image forming device 50, is embedded at the bottom of the main body 10 of the copying machine, with partially exposed outside, and the sheet feeding device 100 comprises a first sheet feeding device 110, a second sheet feeding device 120, a third sheet feeding device 130, double-side feeding device 140, and a manually feeding device 150, wherein only the manually feeding device 150 is exposed outside of the main body 10 of the copying machine. The respective sheet feeding devices 110, 120, 130, 140, 150 are equipped with, as main means, sheet holding means 111, 121, 131, 141, 151, and feeding units 114, 124, 134, 144, 154 composed of calling/feeding means 112, 122, 132, 142, 152 and separating/feeding means 113, 123, 133, 143, 153.

Further, on conveying paths for guiding sheets fed one by one from the respective sheet feeding devices 110, 120, 130, 140, 150 to the photosensitive member 51, conveying rollers are placed when necessary between synchronization matching means 160 and the respective sheet feeding devices 110, 120, 130, 140, 150. Sheets which are fed from the sheet feeding devices 110, 120, 130, 140, 150, are sent to the synchronization matching means 160 by the conveying rollers placed in the course of the conveying paths, synchronized with the position of the developer image formed on the surface of the photosensitive member 51 while adjusted by the synchronization matching means 160 so that front end lines of the sheets are parallel to the axial line of the photosensitive member 51, and fed to the photosensitive member 51. A sheet which is caused to carry the developer image at the transferring position, is peeled off the photosensitive member 51 by the peeling discharger 56, and sent to the fixing device 60 by a conveying belt 85.

The fixing device 60 is composed of main components such as a heat roller 61 formed by covering the surface of a metal pipe of aluminum or the like with a refractory mold release resin, a crimping roller 62 formed by covering the core of a metal with a refractory elastic layer made of silicon rubber or the like, a heater lamp 63 serving as a heating source for supplying heat which is placed inside the heat roller 61, a temperature detector 64 like a thermistor which is placed in contact with the perimeter of the heat roller 61 to keep the temperature of the heater lamp 63 at a predetermined one; a peeling nail 65 placed in contact with the perimeter of the heat roller 61 or the crimping roller 62 to peel a sheet off the heat roller 61 or the crimping roller 62, and pressuring means (not shown) for pressing the heat roller 61 and the crimping roller 62. When a sheet caused to have the unfixed developer image formed by the image forming device 50 as mentioned above, is conveyed by the conveying belt 85 to reach the fixing device 60 and pass through between the heat roller 61 and the crimping roller 62, heat and pressure are applied to the sheet and the unfixed developer image is fixed onto the sheet, and thereafter the sheet is peeled off the heat roller 61 or the crimping roller 62 by the peeling nail 65, and sent out from the fixing device 60.

After passing through a conveying roller 86, a sheet sent out from the fixing device 60 is discharged outside of the main body 10 of the copying machine by a discharging roller 88 with a conveying path switched over by a switching gate 87, or is sent to a switchback conveying path 91 by a conveying roller 89 and a normal-reverse roller 90. A sheet sent to the switchback conveying path 91 is conveyed toward the double-side feeding device 140 due to a switch-over of the conveying path by a switching gate 92 and a reverse of the normal-reverse roller 90. A sheet conveyed out of the switchback conveying path 91 and caused to pass through an advancing roller 93 is sequentially stacked and held in the double-side feeding device 140. A sheet temporarily held in the double-side feeding device 140 is separated one by one and fed by the calling/feeding means 142 and the separating/feeding means 143. A sheet fed from the double-side feeding device 140 is fed to the photosensitive member 51 again in a manner that a surface on which an image is not formed faces the photosensitive member 51.

When a one-side mode is selected through an operation panel which is not shown, sheets fed from the sheet holding means 111, 121, 131, 151 are discharged outside of the main body 10 of the copying machine after an image is formed and fixed on one side thereof. On the contrary, when a double-side mode is selected, sheets fed from the sheet holding means 111, 121, 131, 151 are held in the double-side feeding device 140 after an image is formed and fixed on one side thereof, fed to the photosensitive member 51 again, and discharged outside of the main body 10 of the copying machine in the same manner with the one-side mode after an image is formed also on the opposite surface on which an image has not been formed.

Sheets discharged outside of the main body 10 of the copying machine as described above, are conveyed to the aftertreatment device 70. With reference to FIG. 1 again, the aftertreatment device 70 is composed of main components such as a staple tray 74, a stapler 75, a pusher 76, a stapled-sheet discharge tray 77, and a stack tray 80. Sheets discharged from the main body 10 of the copying machine are sent to an entrance roller 71, and while a conveying path is switched over by a switching gate 81, the sheets are sent via a conveying roller 73 to be stacked on the staple tray 74 or sent via a conveying roller 78 and a discharging roller 79 to be stacked on the stack tray 80. After stapled by the stapler 75 for each preset copy, sheets stacked on the staple tray 74 are discharged onto the stapled-sheet discharge tray 77 by the pusher 76.

The various devices placed in the copying machine as explained above, obtain a driving force from a motor, a solenoid and the like serving as a driving force source which is placed in the copying machine, via a driving force transmitting device. In other words, the devices obtain, for example, a force for moving the scanning unit 43 and the moving mirror unit 46, a force for rotating the photosensitive member 51, and a force for rotating the respective rollers for conveying original documents and sheets, from a motor and a solenoid, via a driving force transmitting member.

In such a copying machine, a transmitting device for transmitting a force from a motor and a solenoid to the respective devices, has a lot of driving force transmitting parts. The driving force transmitting parts are, for example, gears, which can be broadly classified into: a gear member which has only one transmission acting portion meshed with another member to make a transmission action of a driving force, that is, only one teeth portion meshed with another gear to mutually transmit a rotation force; and a complex-type gear member which is a complex-type driving force transmitting part provided with a plurality of teeth portions in the axial line direction. In order to share complex-type gear members at a plurality of placing positions as mentioned above, it is required that the respective teeth portions of the complex-type gear members act on each other at the respective placing positions. In view of the difficulty of sharing complex-type gear members at a plurality of placing positions, a coupling structure of driving force transmitting members of the invention is realized in order to form a complex-type gear member by fabricating components including a plurality of gear members and thereby reduce the variety of molded components which are formed by using molds.

Figure 4:
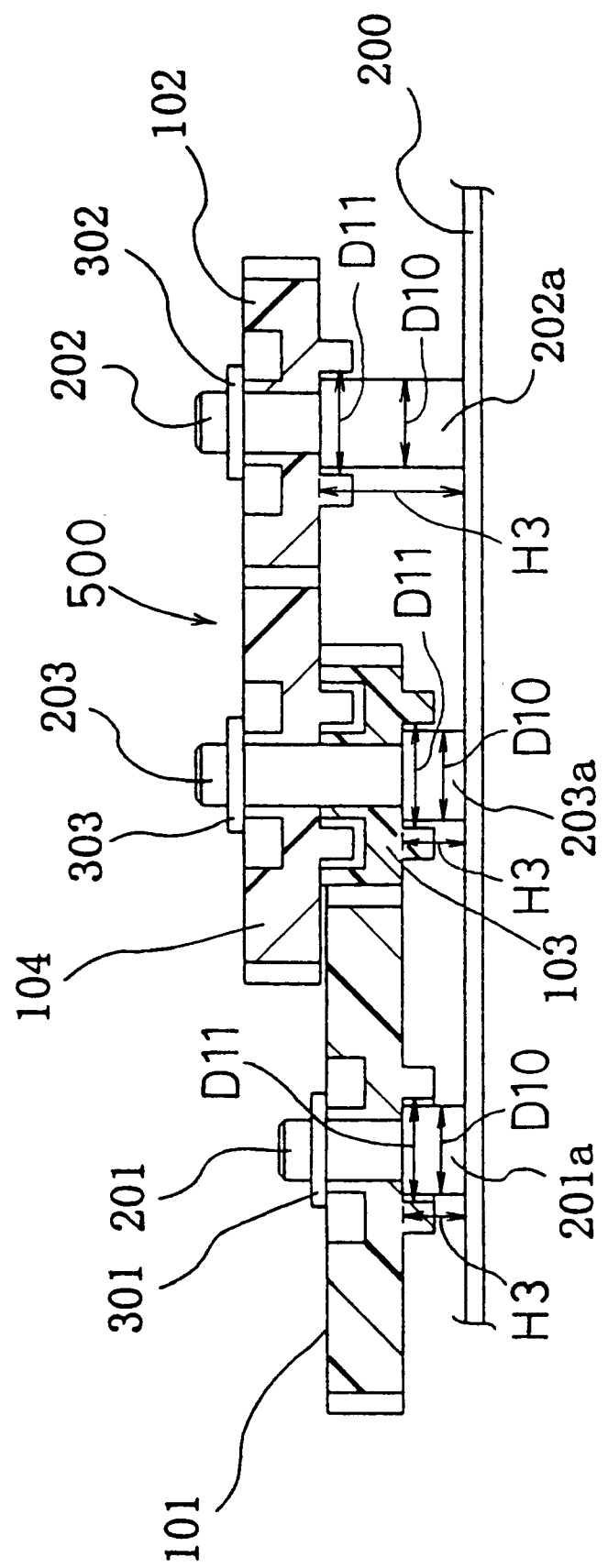
FIG. 4 is a section view showing a coupling structure of driving force transmitting members of an embodiment of a first group of the invention.
Figures 5A, 5B, 5C:
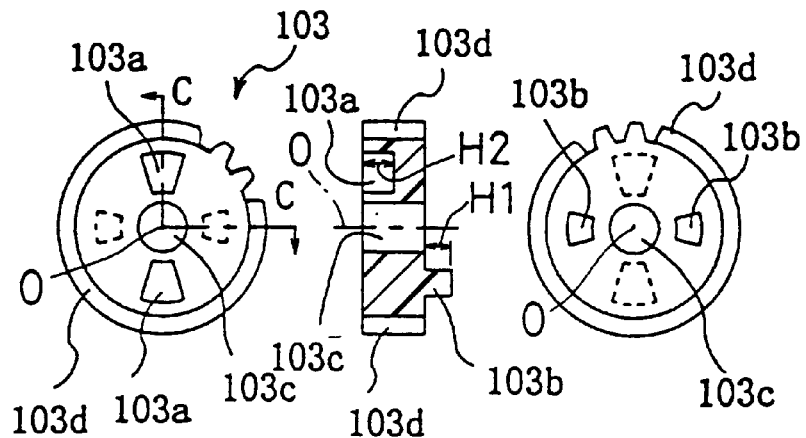
FIGS. 5A–5C are views showing a gear member 103, FIG. 5A being a front view, FIG. 5B being a section view, and FIG. 5C being a rear view.
Figures 6A, 6B, 6C:
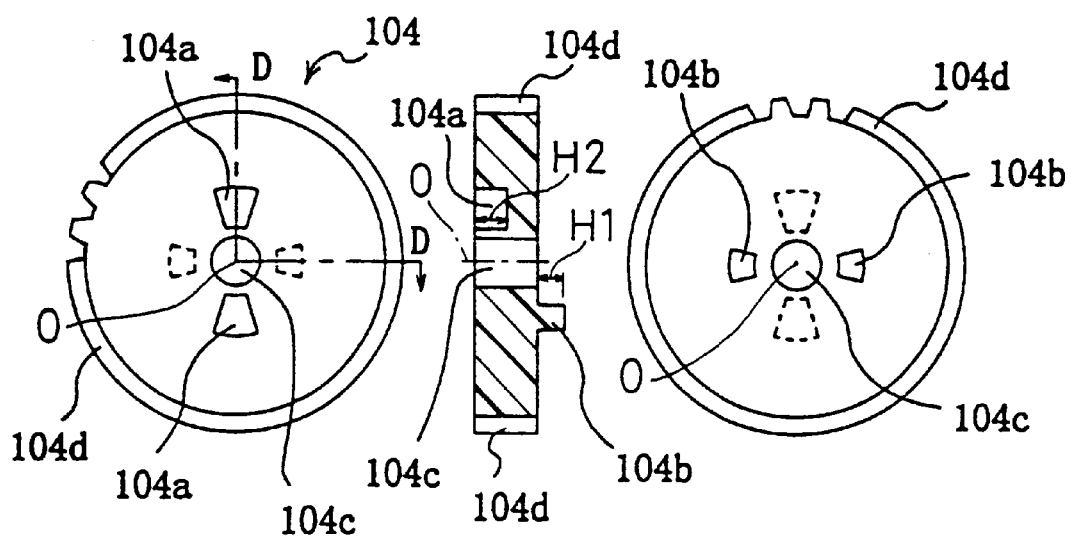
FIGS. 6A–6C are views showing a gear member 104, FIG. 6A being a front view, FIG. 6B being a section view, and FIG. 6C being a rear view.
Figures 8A, 8B, 8C:
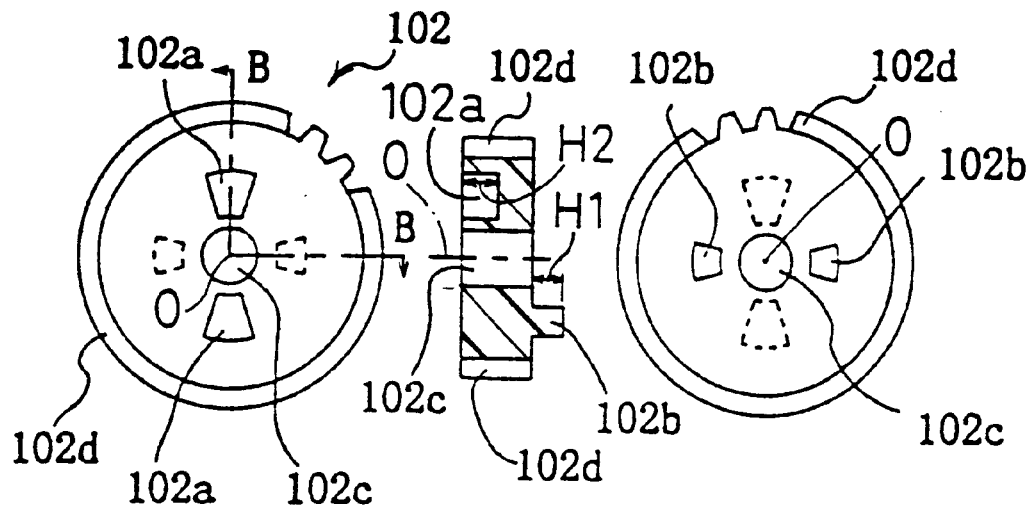
FIGS. 8A–8C are views showing a gear member 102, FIG. 8A being a front view, FIG. 8B being a section view, and FIG. 8C being a rear view.

In the present invention, an invention of a first group will be explained at first with reference to FIGS. 4–41. FIG. 4 is a section view showing a gear train which has a complex-type driving force transmitting part 500 (may be referred to as "an assembly" hereafter) coupled in accordance with the structure for coupling gear members serving as driving force transmitting members of an embodiment of the first group of the invention. FIG. 5A is a front view showing a gear member 103 which composes the assembly 500, FIG. 5B is a section view of the gear member 103 taken on section line C—C of FIG. 5A, and FIG. 5C is a rear view of the gear member 103. FIG. 6A is a front view showing a gear member 104 which composes the assembly 500, FIG. 6B is a section view of the gear member 104 taken on section line D—D of FIG. 6A, and FIG. 6C is a rear view of the gear member 104. FIG. 7A is a front view showing a gear member 101 which composes a gear train having the assembly 500, FIG. 7B is a section view of the gear member 101 taken on section line A—A of FIG. 7A, and FIG. 7C is a rear view of the gear member 101. FIG. 8A is a front view showing a gear member 102 which composes a gear train having the assembly 500, FIG. 8B is a section view of the gear member 102 taken on section line B—B of FIG. 8A, and FIG. 8C is a rear view of the gear member 102.

In the embodiment, as mentioned above, a driving force transmitting member will be described by taking four kinds of gear members 101–104 which transmit a driving force by meshing a teeth portion on the perimeter portion with another member as examples. The gear member 103 is provided with: on one side in the axial direction, a concave coupling portion 103a which is concave from a portion residue toward the other side in the axial direction; and on the other side in the axial direction opposite to the one side in the axial line direction where the concave coupling portion 103a is formed, a convex coupling portion 103b which is projected from a portion residue toward a direction away from the one side in the axial direction. As well as the gear member 103, the gear members 101, 102, 104 are provided with concave coupling portions 101a, 102a, 104a on one sides in the axial line direction, and convex coupling portions 101b, 102b, 104b on the other sides in the axial line direction.

The concave coupling portions 101a–104a are formed into the same shape and placed at the same positions with respect to the axial lines of the respective gear members 101–104. Further, the convex coupling portions 101b–104b are also formed into the same shape and placed at the same positions with respect to the axial lines of the respective gear members 101–104. Furthermore, a height H1 of each of the convex coupling portions 101b–104b is set to be smaller than a depth H2 of each of the concave coupling portions 101a–104a from the surface of one side of each of the gear members 101–104. In addition, the respective convex coupling portions 101b–104b are stable fitted into the respective concave coupling portions 101a–104a without largely rattling, and are shaped so as to be smoothly fitted and removed, with the result that it is easy to couple and remove the respective gear members 101–104.

The respective concave coupling portions 101a–104a and the respective convex coupling portions 101b–104b are formed between bearing holes 101c–104c which are formed at center portions of the respective gear members 101–104 so as to pass through the respective members 101–104 and teeth portions 101d–104d which serve as driving force transmission acting portions, spaced by preset distances from respective axial lines O of the respective gear members which become centers of the bearing holes 101c–104c, at two positions for every 180° in the perimeter direction. Thus, the respective concave coupling portions 101a–104a and the respective convex coupling portions 101b–104b formed on the respective gear members 101–104, are uniformly formed, whereby it is possible to arbitrarily select the same kind of gear members or different kinds of gear members to place on the same axial line, fit and fix the convex coupling portions into the concave coupling portions, and couple the respective gear members so as to transmit a rotation force about the axial line and to mutually detachable in the axial line direction.

Concretely, as shown in FIG. 4, the respective gear members 103, 104 are coupled by fitting the convex coupling portion 103b into the concave coupling portion 104a, whereby the assembly 500 can be constructed. Although not shown, it is needless to say that the other gear members 101, 102 can be also coupled in the same manner. In specific, the respective gear members 101–104 are provided with the concave coupling portions 101a–104a and the convex coupling portions 101b–104b, which are placed on different sides from each other, so that even when two of the respective gear members 101–104 are arbitrarily selected, the two gear members can be surely coupled. In other words, since at least one of the selected gear members has a concave coupling portion and a convex coupling portion, a gear member to be coupled with this gear member can be coupled when having a concave coupling portion or a convex coupling portion, and all of the gear members 101–104 can be coupled with each other.

As a result, when the four kinds of gear members 101–104 are prepared, it is possible to assemble ten kinds of complex-type driving force transmitting parts which have two teeth portions of 101d–104d, including six combinations of different kinds and four combinations of the same kind. In other words, it is possible to assemble the more number of complex-type driving force transmitting parts than the variety of gear members. This effect can be accomplished when more than two kinds of gear members are prepared. Further, the gear members 101–104 can be used independently and can be used for fabricating an assembly which has more than three teeth portions. When they are included, it is possible to construct the more number of driving force transmitting parts.

Although the four kinds of gear members 101–104 will be mainly taken as examples to describe the following in the specification, it is possible to couple all gear members by forming the same concave coupling portions and convex coupling portions on all the gear members to be shared in the whole copying machine and another appliance. When the variety of gear members to be prepared is increased, the ratio of the variety of prepared gear members to the variety of driving force transmitting parts which can be constructed is decreased and the above effect of the invention is increased, with the result that in a picture image processing apparatus such as a copying machine which uses a lot of driving force transmitting parts, a full effect of the invention can be exerted.

As shown in FIG. 4, on a frame 200 which supports a gear train serving as a driving mechanism, rotation axes 201, 202, 203 serving as rotation supporting members are fixed and erected so as to be one piece, and the respective rotation axes 201–203 are disposed parallel to each other. The rotation axis 201 is pierced into the gear member 101, the rotation axis 202 is pierced into the gear member 102, and the rotation axis 203 is pierced into the assembly 500 composed of the gear members 103, 104, whereby the gear members 101, 102 and the assembly 500 are supported so as to be rotatable.

In a transmission path of a driving force, the gear member 101 is placed on a side near the driving force source, the gear member 102 is placed on a side far from the driving force source, and in order to increase a rotation speed and transmit a driving force from the gear member 101 to the gear member 102, the assembly 500 is interposed therebetween. The assembly 500 is constructed by coupling the two gear members 103, 104 in the above manner so as to rotate integrally. The gear member 103 is meshed with the gear member 101, and the gear member 104 is meshed with the gear member 102. In this status, a rotation of the gear member 101 is transmitted to the gear member 102 via the gear member 103 and the gear member 104.

The respective gear members 101–104 are provided with the respective convex coupling portions 101b–104b placed on sides which front the frame 200, the respective rotation axes 201–203 pierced thereinto, and displacement preventing members 301, 302, 303 such as an E ring attached to the rotation axes 201–203, whereby the respective gear members are prevented from being displaced with respect to the respective rotation axes 201–203 and falling off. To be precise, the respective displacement preventing members 301–303 function for limiting the displacement of the gear members 101–104 in the axial direction within a predetermined amount, and also prevent the gear members 101–104 from falling off.

In this embodiment, the convex coupling portions and the concave coupling portions of the respective gear members are placed with the phases shifted by 90° in the rotating direction, i.e., the diameter direction of the gear members. However, as another embodiment, the phases of the convex coupling portions and the concave coupling portions in the rotating direction may be coincident, in which case, the same effect can be exerted.

Further, in order to facilitate understanding, drawings to be illustrated hereafter show sections of the gear members 101–104 provided with convex coupling portions and concave coupling portions which are placed in the same phase, as long as there is no explanation.

Further, since the height H1 of the convex coupling portion is set to be smaller than the depth H2 of the concave coupling portion, in a case where the gear member 103 and the gear member 104 are coupled as shown in FIG. 4, side faces of the gear member 103 and the gear member 104 come into contact with each other and no space will be generated between the gear members. Therefore, the stability of the assembly 500 is enhanced. In other words, rattling of the gear members is limited. Furthermore, in the case of supporting the gear members 101, 102 and the assembly 500 by the rotation axis 203, when a height H3 of each of boss portions 201a, 202a, 203a of the rotation axes is larger than the height H1 of the convex coupling portion and an outer diameter D10 of the boss portion 203a is smaller than an inner diameter D11 between inner ends in the radial direction of the convex coupling portions 101b–104b, the gear member may be placed so that an opposite side in the axial direction to a side where the convex coupling portion is formed of the gear member, faces the frame 200. Thus, it is possible to use a space effectively.

Figure 9:
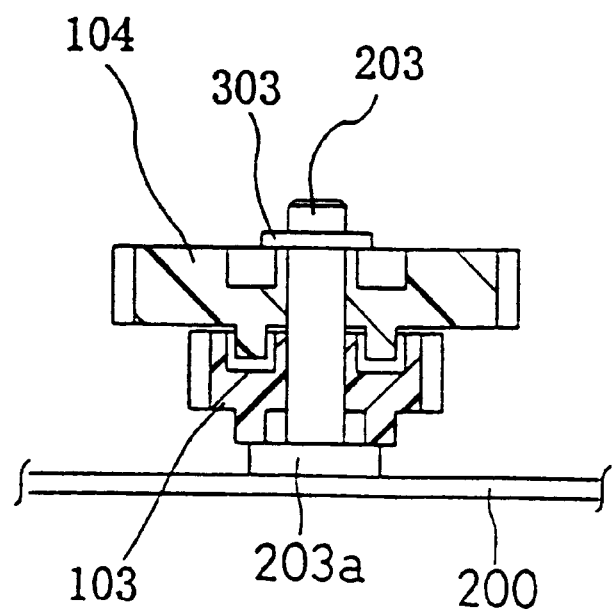
FIG. 9 is a section view showing a structure for coupling another embodiment of the invention.

Further, in another embodiment of the first group of the invention, as shown by taking the assembly 500 as an example in FIG. 9, when an outer diameter H11 of the boss portion 203a of the rotation axis 203 is larger than an inner diameter H10 between inner ends in the radial direction of the convex coupling portions 103b, the respective driving force transmitting parts may be placed in a manner that the tip end of the convex coupling portion 103b comes into contact with the boss portion 203a of the rotation axis 203. In this case, it is possible to achieve space savings by reducing the height H3 of the boss portion 203a.

Figure 10:
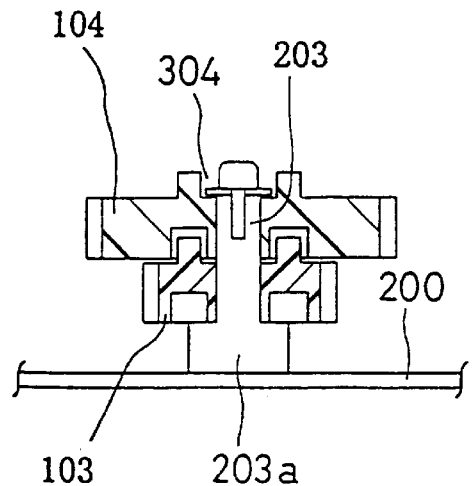
FIG. 10 is a section view showing a structure for coupling still another embodiment of the invention.

In still another embodiment of the first group of the invention, in the case of constructing an assembly 501 by fitting the convex coupling portion 103b into the concave coupling portion 104a, the assembly 501 may be placed so that the concave coupling portion 103a faces the frame 200 as shown in FIG. 10. In the case of placing the concave coupling portions 101a–104a so as to face the frame 200 as shown by this example, when the convex coupling portions 101b–104b are adjacent to the rotation axes 201–203, it is possible to prevent the respective driving force transmitting members from being displaced by using a screw 304 and from falling off.

In the case of using E rings 301–303 and a screw 304 as the displacement preventing member, by detaching the displacement preventing members 301–303, 304 from the rotation axes 201–203, it is possible to remove the respective driving force transmitting members 101, 102, 500, 501 from the rotation axes and replace the respective parts, and such operations are easily conducted. Especially, using the E rings results in an excellent operability. The assemblies 500, 501 can be disassembled into the gear members 103, 104, so that not only the assemblies 500, 501 but also only one of the gear members 103, 104 can be replaced, which is economical.

Next, an embodiment will be described, which can quicken and simplify operations of assembling and disassembling driving force transmitting parts, i.e., the gear members 101–104 and an assembly composed thereof, by making it possible to use an E ring which can be detached in an easier manner than a screw as the displacement preventing member for preventing a driving force transmitting part from being displaced with respect to the rotation axis and falling off.

Figure 11:
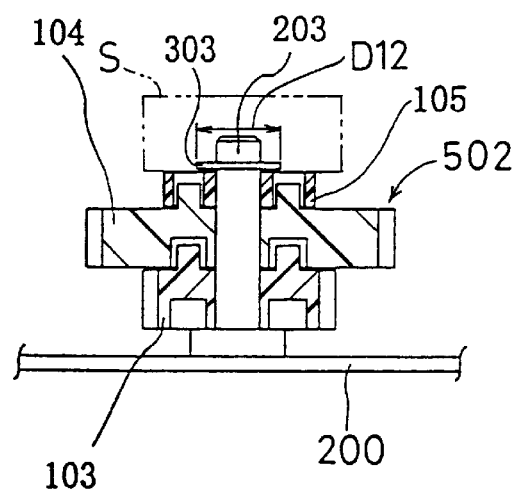
FIG. 11 is a section view showing a structure for coupling still another embodiment of the invention.
Figures 12A, 12B:
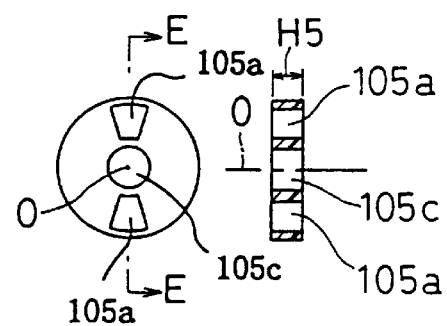
FIGS. 12A and 12B are views showing a spacer member 105, FIG. 12A being a front view, and FIG. 12B being a section view.

Firstly, such an embodiment will be described that even when the convex coupling portions 101b–104b of the gear members 101–104 are placed little away from the bearing holes 101d–104d, that is, an inner diameter between the inner sides in the radial direction of the convex coupling portions 101b–104b is smaller than the outer diameter of the E ring, a displacement preventing member like an E ring can be used as displacement preventing members for controlling the gear members 101–104 not to fall off the rotation axes. FIG. 11 is a section view showing an assembly 502 in which a coupling structure of driving force transmitting members of another embodiment of the first group of the invention is implemented, FIG. 12A is a front view showing a spacer member 105 which composes the assembly 502, and FIG. 12B is a section view taken on section line E—E of FIG. 12A.

The coupling structure of driving force transmitting members of this embodiment comprises the spacer member 105, wherein in the case of positioning the convex coupling portion 104b on a side where the displacement preventing member 303 of an E ring is placed, the spacer member 105 is mounted on an opposite side in the axial line direction where the convex coupling portion 104b is formed. The spacer member 105 is provided with a fitting concave portion 105a which has the same shape as the concave coupling portions 101a–104a of the gear members 101–104, into which the convex coupling portions 101b–104b of the gear members 101–104 can be arbitrarily fitted. A thickness H5 of the spacer member 105 is larger than the height H1 of the convex coupling portions 101b–104b of the gear members 101–104. In this embodiment, H5 is selected to be slightly larger than H1.

The spacer 105 is provided with a fitting concave portion 105a which has a depth H4 larger than the height H1 of the convex coupling portion 104b of the gear member 104, and with a bearing hole 105c in the same manner with the gear members 101–104. The fitting concave portion 105a is passed through in the thickness direction, and formed at the same placing position with the convex coupling portion 104b.

In a status that the convex coupling portion 104b of the gear member 104 is fitted into the fitting concave portion 105a, the spacer member 105 comes into contact with the other side of the gear member 104 in a region excluding the convex coupling portion, thereby mounted. As a result, a region S for mounting the displacement preventing member and performing an operation thereof can be ensured in the same manner with a case where one side in the axial direction of the respective gear members 101–104 fronts the displacement preventing member. In other words, even when the most outer diameter D12 of the displacement preventing member is larger than an inner diameter between the convex coupling portions of the respective gear members, e.g., between the convex coupling portions 103b of the gear member 103, the member 303 made of the same kind of E ring can be used as the displacement preventing member.

As another embodiment of the invention, the fitting concave coupling portion 105a of the spacer member 105 may be an indentation having a bottom, instead of a hole passing through in the thickness direction as shown in the embodiment, whereby the same effect can be exerted.

Figure 13:
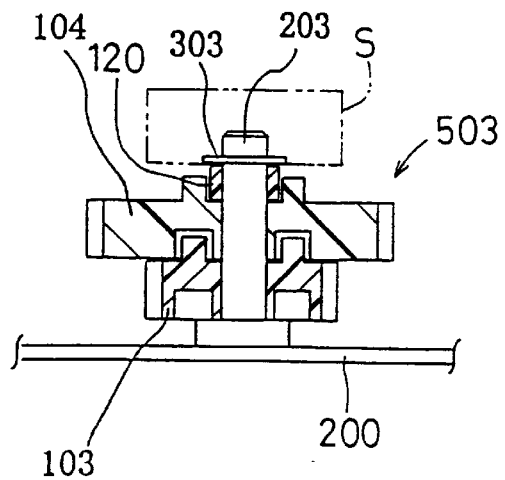
FIG. 13 is a section view showing a coupling structure of driving force transmitting members of still another embodiment of the invention.
Figures 14A, 14B:
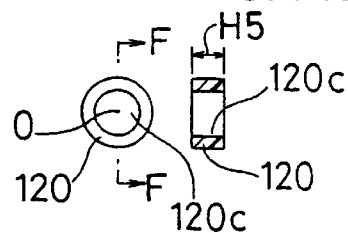
FIGS. 14A and 14B are views showing another spacer member 120, FIG. 14A being a front view, and FIG. 14B being a section view.

FIG. 13 is a section view showing an assembly 503 in which a coupling structure of driving force transmitting members of another embodiment of the first group of the invention is implemented, FIG. 14A is a front view showing a spacer member 120 which composes the assembly 503, and FIG. 14B is a section view taken on section line F—F of FIG. 14A. The spacer member may be a member which comes into contact with the other side in the axial direction in a region excluding the convex coupling portions 101b–104b of the respective gear members 101–104 and, in this status, which projects in the axial direction more than the convex coupling portions 101b–104b while avoiding the convex coupling portions 101b–104b. For example, the spacer member 120 is used, which may be formed into a cylindrical shape provided with the same bearing hole 120c. This spacer member 120 is placed in a region between the rotation axis 203 and the convex coupling portion 104b of the gear member 104. Such a spacer member 120 can also exert the same effect as the spacer member 105. Further, the spacer member 120 can be easily formed and simply manufactured, as compared with the spacer 105.

Figure 15:
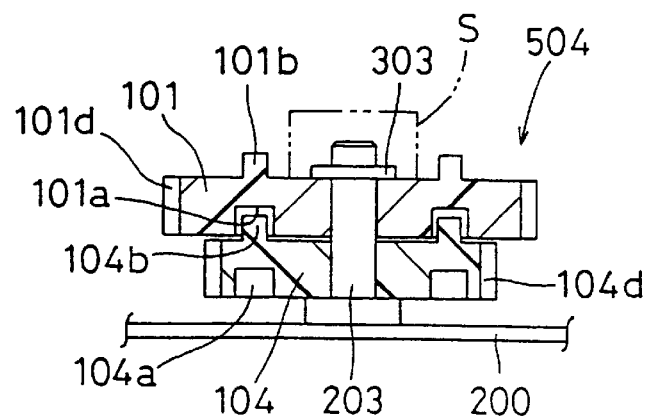
FIG. 15 is a section view showing a coupling structure of driving force transmitting members of still another embodiment of the invention.
Figure 16:
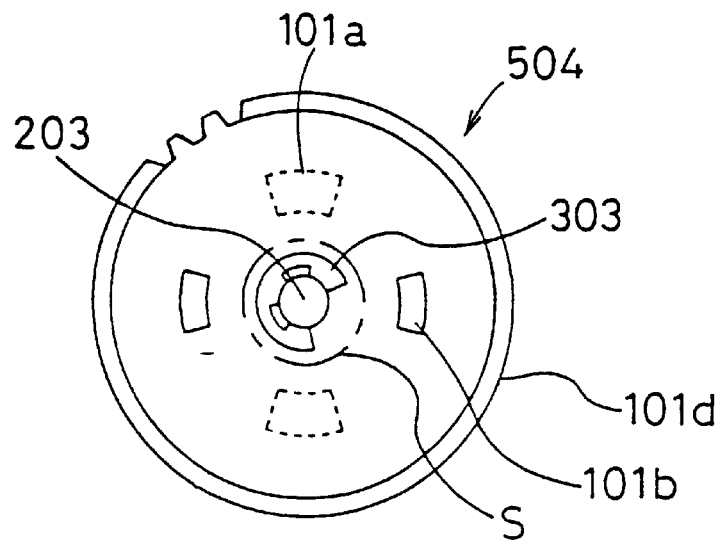
FIG. 16 is a plan view seen from the top of FIG. 15.

Next, such an embodiment will be described that by placing the convex coupling portions 101b–104b of the gear members 101–104 far away from the bearing holes 101d–104d, that is, by forming the inner diameter between the inner sides in the radial direction of the respective convex coupling portions 101b–104b to be larger than the outer diameter of the E ring, it is possible to use a displacement preventing member such as an E ring as a displacement preventing member which controls so that the gear members 101–104 do not fall off the rotation axes. FIG. 15 is a section view showing an assembly 504 in which a coupling structure of driving force transmitting members of still another embodiment of the first group of the invention is implemented, and FIG. 16 is a plan view of FIG. 15, seen from the top. According to the embodiments described above with reference to FIGS. 11–14, the length in the axial direction of the rotation axis 203 are long. When it is required to avoid this for the design, the coupling structure of driving force transmitting members of this embodiment is preferably implemented. In this embodiment, the same reference numerals are given to portions corresponding to those used in the above-mentioned embodiments, and only different configurations will be described.

Gus According to the embodiment, in the respective gear members 101–104 serving as driving force transmitting members, positions for disposing the convex coupling portions 101b–104b and the concave coupling portions 101a–104a are largely spaced outward in the radial direction. Thus, regions for mounting the displacement preventing members 301–303 and operation regions S which are necessary for mounting and removing them, are ensured. Therefore, in the same manner with FIGS. 11–14, operations of attaching/detaching a driving force transmitting part and operations of assembling and disassembling an assembly are quickened and simplified by using the displacement preventing members 301–303 such as E rings, and the variety of displacement preventing members are uniformized. Further, the length in the axial direction of the rotation axis can be shortened.

Figure 17:
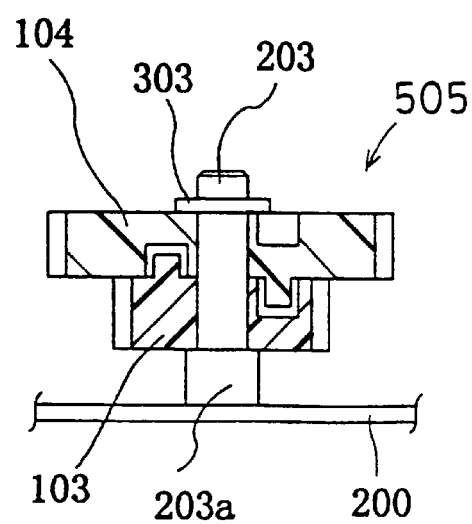
FIG. 17 is a section view showing a coupling structure of driving force transmitting members of still another embodiment of the invention.

Further, as another configuration that the convex coupling portions 101a–104a of the gear members 101–104 are not projected in the axial direction of an assembly, an embodiment of reducing the thickness in the axial direction of the assembly will be described below. FIG. 17 is a section view showing an assembly 505 of still another embodiment of the first group of the invention. FIG. 18A is a front view showing the gear member 103 composing the assembly 505, FIG. 18B is a section view of the gear member 103 taken on section line G—G of FIG. 18A, FIG. 18C is a section view of the gear member 103 taken on section line H—H of FIG. 18A, and FIG. 18D is a rear view of the gear member 103. FIG. 19A is a front view showing the gear member 104 composing the assembly 505, FIG. 19B is a section view of the gear member 104 taken on section line I—I of FIG. 19A, FIG. 19C is a section view of the gear member 104 taken on section line J—J of FIG. 19A, and FIG. 19D is a rear view of the gear member 104. FIG. 17 shows both a section showing a coupling of the convex coupling portion 103b of the gear member 103 and the concave coupling portion 104e of the gear member 104 which is on the side of the convex coupling portion 104b, and a section showing a coupling of the concave coupling portion 103e of the gear member 103 which is on the side of the convex coupling portion 103b and the convex coupling portion 104b of the gear member 104, on the left side and right side of the rotation axis 203. The same reference numerals are given to portions corresponding to those used in the above-mentioned embodiments, and only different configurations will be described.

This embodiment describes an example in which the convex coupling portions 101b–104b of the respective gear members 101–104 (the gear members 101, 102 are not shown) are not positioned on the end face sides of the assembly. The concave coupling portions 101e–104e are additionally formed on the other sides in the axial direction of the respective gear members 101–104 where the convex coupling portions 101b–104b are formed. In this embodiment, the convex coupling portions 101b–104b, the concave coupling portions 101a–104a formed on one side in the axial direction, and the concave coupling portions 101e–104e formed on the other side in the axial direction, are formed with the phases shifted by 60°, respectively.

According to the configuration of the embodiment, when coupling the two gear members 103, 104, the gear members 103, 104 are coupled so that the other sides in the axial direction face each other, on the other sides both the convex coupling portions 103b, 104b and the concave coupling portions 103e, 104e being formed. Thus, it is possible to realize a configuration that neither of the convex coupling portions 103b, 104b is projected from both the sides in the axial direction of the assembly 505. Thus, even when the convex coupling portions 103b, 104b are not away from the bearing holes 103c, 104c, it is possible to quicken the operations of assembling and disassembling and to uniformize the variety of displacement preventing members, by using the displacement preventing members 301–303 such as E rings, as well as mentioned above. Further, it is possible to reduce the variety of tools for attaching/detaching the displacement preventing members, by uniformizing the displacement preventing members.

Figures 20A, 20B, 20C:
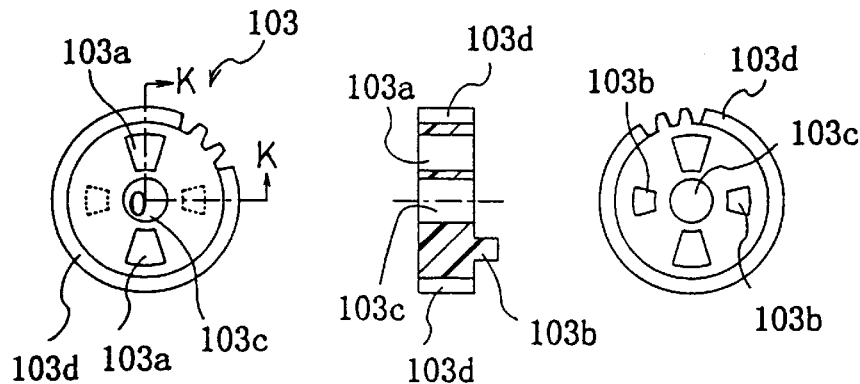
FIGS. 20A–20C are views showing a gear member 103 of still another embodiment, FIG. 20A being a front view, FIG. 20B being a section view, and FIG. 20C being a rear view.

FIG. 20A is a front view showing the gear member 103 of a coupling structure of driving force transmitting members of still another embodiment of the first group of the invention, FIG. 20B is a section view of the gear member 103 taken on section line K—K of FIG. 20A, and FIG. 20C is a rear view of the gear member 103. Although, in this embodiment, the gear member 103 is taken as an example and the same reference numerals are given to the corresponding portions and only different portions from the above embodiments are described, the other gear members 101, 102, 104 can be constructed in the same manner.

According to the embodiment, in the same manner with the embodiments shown in FIGS. 1–16, the concave coupling portions 101a–104a and the convex coupling portions 101b–104b of the gear members 101–104 are formed with the phases shifted by 90° in the perimeter direction, and furthermore, the concave coupling portions 101a–104a are formed so as to pass through in the axial direction. As a result, the concave coupling portions 101a–104a passing through in the thickness direction, also function as concave coupling portions formed on the sides where the convex coupling portions 101b–104 bare formed. Even in such a configuration, the same effect can be exerted. Furthermore, as compared with a configuration of forming concave coupling portions individually on both sides in the axial direction, it is easy to manufacture.

Figure 21:
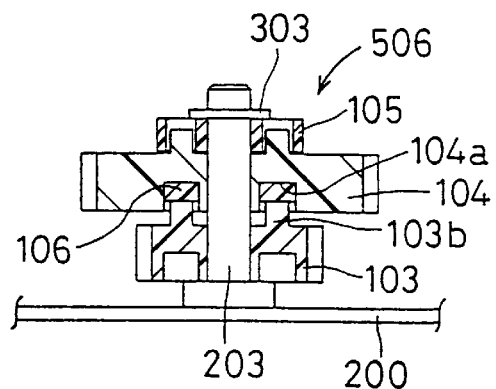
FIG. 21 is a section view showing a coupling structure of driving force transmitting members of still another embodiment of the invention.
Figures 22A, 22B:
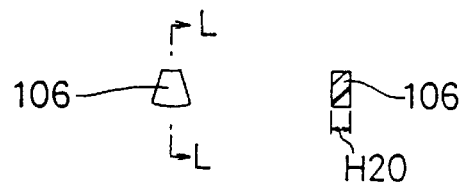
FIGS. 22A and 22B are views showing a space adjusting member 106, FIG. 22A being a front view, and FIG. 22B being a section view.

Next, a configuration of setting a positional relation in the axial direction of gear members which compose an assembly, will be explained with reference to FIGS. 21–26. FIG. 21 is a section view showing an assembly 506 in which a coupling structure of driving force transmitting members of still another embodiment of the invention is implemented, FIG. 22A is a front view showing a space setting member 106 which composes the assembly 506, and FIG. 22B is a section view taken on section line L—L of FIG. 22A.

For example, such a configuration is required for the design that as compared with the above configurations, a position of the teeth portion 104 of the gear member 104 with respect to the teeth portion 103 of the gear member 103 shifts in the axial direction, that is, the gear member 103 and the gear member 104 can integrally rotate and the teeth portions 103d, 104d are apart from each other. In this case, the space setting member 106 is used, which is fittable into the concave coupling portion 103a of the gear member 103, and a thickness of which is determined in accordance with a distance to be spaced.

The space setting member 106 is fitted into the concave coupling portion 104a of the gear member 104 to lift up the bottom of the concave coupling portion 104a, and the convex coupling portion 103b of the gear member 103 is caused to come into contact with the space setting member 106, whereby the gear members 103, 104 are spaced. In this case, a thickness H5 of the space setting member 106 is selected to be smaller than the depth H2 of the concave coupling portion 104a, and the convex coupling portion 103b of the gear member 103 is fitted into the concave coupling portion 104a of the gear member 104 to couple the gear members, so that the gear members 103, 104 can rotate together.

It may be possible to enhance the operability by causing the shape of a section perpendicular to the thickness direction of the space setting member 106, to be almost the same as that of a section perpendicular to the axial line of the concave coupling portion 104a and to be slightly larger, and by fitting the space setting member 106 into the concave coupling portion 104a as a close fit so as not to fall off the concave coupling portion 104a.

Figure 23:
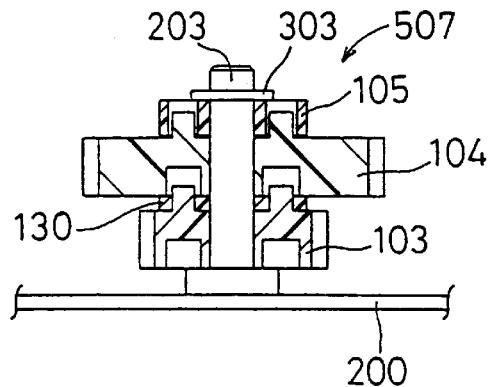
FIG. 23 is a section view showing a coupling structure of driving force transmitting members of still another embodiment of the invention.
Figures 24A, 24B:
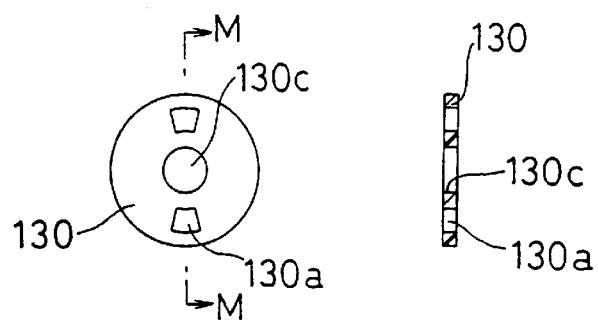
FIGS. 24A and 24B are views showing a space adjusting member 130 of another embodiment, FIG. 24A being a front view, and FIG. 24B being a section view.

FIG. 23 is a section view showing an assembly 507 in which a coupling structure of driving force transmitting members of still another embodiment of the first group of the invention is implemented, FIG. 24A is a front view showing a space setting member 130 which composes the assembly 507, and FIG. 24B is a section view taken on section line M—M of FIG. 24A. According to the embodiment described with reference to FIGS. 21 and 22, the space setting member 130 becomes small and hard to handle during operation, and the same number of operations are required as that of the concave coupling portions. Therefore, the space setting member of the embodiment is implemented in order to make the operation easier. The space setting member 130 is provided with a bearing hole 130c where the rotation axis 203 is pierced and a piercing hole 130a where the convex coupling portion 103b of the gear member 103 is pierced. For the purpose of preventing the space setting member 130 from being displaced in the radial direction and thereby obstructing transmission of the rotation of the gear members 103, 104, the inner diameter of the bearing hole 130c is selected to be larger, for example, slightly larger than the outer diameter of the rotation axis 203.

This space setting member 130 is placed so that the convex coupling portion 103b is pierced through the piercing hole 130a and fitted into the concave coupling portion 104a of the gear member 104. As a result, the mutual relation in the axial direction of the gear members 103, 104 can be set, and the assembling operation can be simplified.

Figure 25:
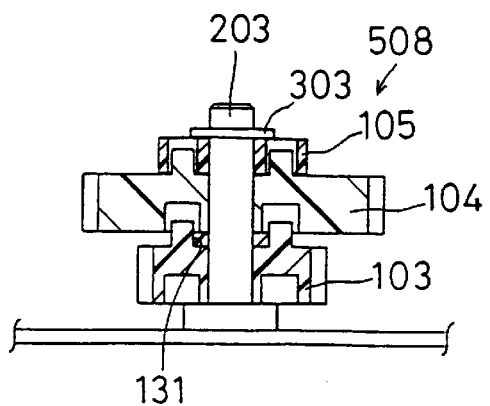
FIG. 25 is a section view showing a coupling structure of driving force transmitting members of still another embodiment of the invention.
Figures 26A, 26B:
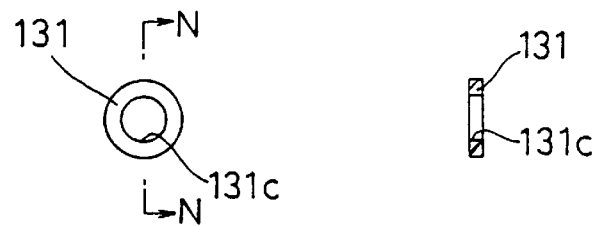
FIGS. 26A and 26B are views showing a space adjusting member 131 of another embodiment, FIG. 26A being a front view, and FIG. 26B being a section view.

FIG. 25 is a section view showing an assembly 508 in which a coupling structure of driving force transmitting members of still another embodiment of the first group of the invention is implemented, FIG. 26A is a front view showing a space setting member 131 which composes the assembly 508, and FIG. 26B is a section view taken on section line N—N of FIG. 26A. This embodiment is one which can exert the same effect with the embodiment shown in FIGS. 23 and 24. The space setting member 131 of the embodiment is an annular member provided with a bearing hole 131c into which the rotation axis 203 can be pierced. The outer diameter of the space setting member 131 is selected to be smaller than an inner diameter between the inward ends in the radial direction of the convex coupling portions 103b of the gear member 103. This space setting member 131 is interposed by the gear members 103, 104, in which status the convex coupling portion 103b is fitted into the concave coupling portion 104a. This embodiment can not only exert the aforementioned effect but also simplify the configuration of the space setting member 131 to facilitate the manufacture thereof.

In the embodiments shown in FIGS. 21–26, while examples of setting the space between the gear members 103, 104 are taken to describe, it is also possible to implement the embodiments when using the other gear members 101, 102.

Figure 27:
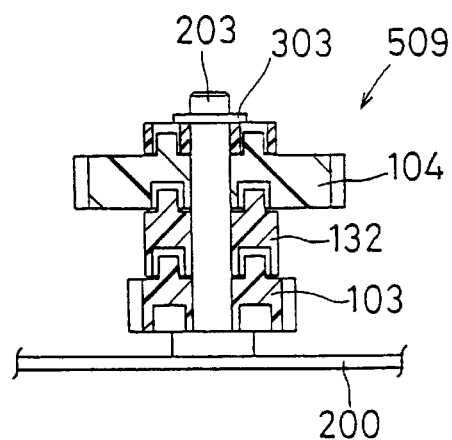
FIG. 27 is a section view showing a coupling structure of driving force transmitting members of still another embodiment of the invention.
Figures 28A, 28B, 28C:
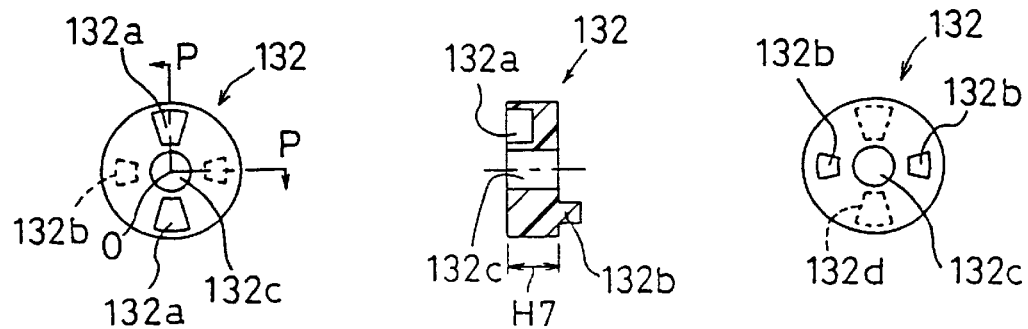
FIGS. 28A–28C are views showing a space adjusting member 132 of another embodiment, FIG. 28A being a front view, FIG. 28B being a section view, and FIG. 28C being a rear view.

The embodiments shown in FIGS. 21–26 cannot be applied to a case where a space setting amount between the respective gear members 101–104 is more than the depth H2 of the concave coupling portions 101a–104a of the gear members 101–104. A configuration that can set the amount even in the above case will be illustrated below with reference to FIGS. 27–30. FIG. 27 is a section view showing an assembly 509 of still another embodiment of the first group of the invention. FIG. 28A is a front view showing a space setting member 132 which composes the assembly 509, FIG. 28B is a section view taken on section line P—P of FIG. 28A, and FIG. 28C is a rear view of the space setting member 132. The same reference numerals are given to portions corresponding to those of the above embodiments, and only different portions will be described.

The space setting member 132 is provided with: concave coupling portions 132a into which the convex coupling portions 101b–104b of the respective gear members 101–104 can be fitted, on one side in the axial direction; and convex coupling portions 132b which can be fitted into the concave coupling portions 101a–104a of the respective gear members 101–104, on the other side in the axial direction. Further, since a thickness H7 in the axial direction excluding the convex coupling portion 132b, equals to a space setting amount between the respective gear members 101–104, the thickness H7 is selected as necessary. The convex coupling portions 132b of the space setting member 132 are fitted into the concave coupling portions 104a of the gear member 104, and the convex coupling portions 103b of the gear member 103 are fitted into the concave coupling portions 132a of the space setting member 132, whereby the space setting member 132 is interposed between the gear members 103, 104.

As a result, the gear members 103, 104 are coupled so as to rotate integrally, and a space which corresponds to the thickness H7 can be ensured between the gear members 103, 104. Since the thickness H7 is not restricted at the time of coupling the gear members 103, 104 so as to integrally rotate, such a space setting member 132 can be preferably implemented when a space between the gear members 103, 104 is required to be large.

Figure 29:
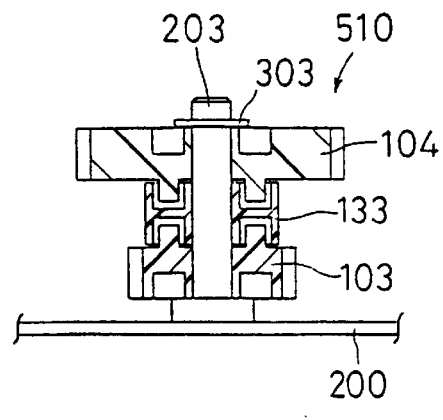
FIG. 29 is a section view showing a coupling structure of driving force transmitting members of still another embodiment of the invention.
Figure 30A:
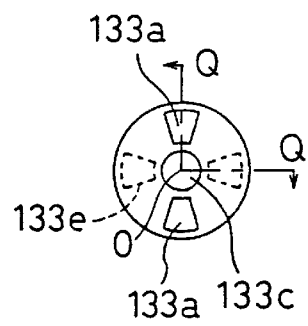
FIGS. 30A–30C are views showing a space adjusting member 133 of another embodiment, FIG. 30A being a front view, FIG. 30B being a section view, and FIG. 30C being a rear view.
Figure 30B:
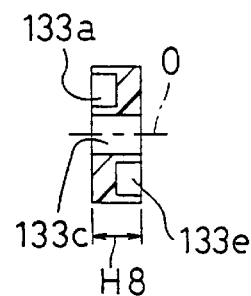
Figure 30C:
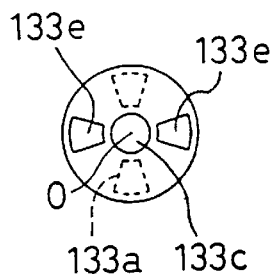

FIG. 29 is a section view showing an assembly 510 of still another embodiment of the first group of the invention. FIG. 30A is a front view showing a space setting member 133 which composes the assembly 510, FIG. 30B is a section view taken on section line Q—Q of FIG. 31A, and FIG. 30C is a rear view of the space setting member 133. The same reference numerals are given to portions corresponding to those of the above-described embodiments, and only different portions will be illustrated. Although convex coupling portions are projected in the axial direction of the assembly in the embodiments shown in FIGS. 21–28, the embodiment can avoid such a problem.

On both sides in the axial direction of the space setting member 133 of this embodiment, concave coupling portions 133a, 133e are formed, into which the gear members 101b–104b can be fitted. Further, this space setting member 133, whose thickness H8 is a space setting amount, is selected as necessary. In a status that the convex coupling portions 103b, 104b of the respective gear members 103, 104 are fitted into the concave coupling portions 133a, 133e of the space setting member 133, the space setting member 133 is interposed between the gear members 103, 104. As a result, the convex coupling portion is not projected from both sides in the axial direction of the assembly 510, so that it is possible to quicken the operations of assembling/disassembling, and uniformize the variety of displacement preventing members. Moreover, the length in the axial direction of the assembly 510 is shortened, so that it is also possible to prevent the rotation axis from being long unnecessarily.

Further, it is possible to prevent the problem caused by forming the concave coupling portion 132a on one side in the axial direction and the concave coupling portion 132e on the other side in the axial direction with the phases shifted in the perimeter direction that: in a case where the sum of the depths of the concave coupling portions 132a, 132e on both sides in the axial direction is larger than the thickness of the space setting member 132, the concave coupling portions 132a, 132e are pierced through each other, and the convex coupling portions 103b, 104b come into contact with each other when the convex coupling portions 103b, 104b of the gear members 103, 104 are fitted into the concave coupling portions 133a, 133e, whereby a setting amount of space larger than a desired space setting amount is generated.

In the embodiments described with reference to FIGS. 27–30, only the space setting member 132 or 133 is used and a space between the gear members 103, 104 is set based on a thickness of the space setting member, so that it is necessary to prepare the same number of space setting members of different thicknesses as that of assemblies of different setting amounts. An embodiment will be illustrated below with reference to FIGS. 31–38, wherein it is possible to set the amount precisely to be multilevel, and additionally, reduce the variety of space setting members.

Figure 31:
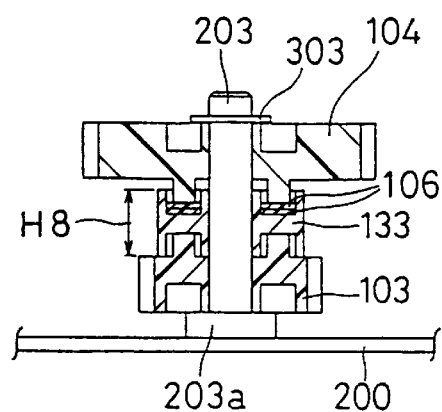
FIG. 31 is a section view showing a coupling structure of driving force transmitting members of still another embodiment of the invention.
Figure 32:
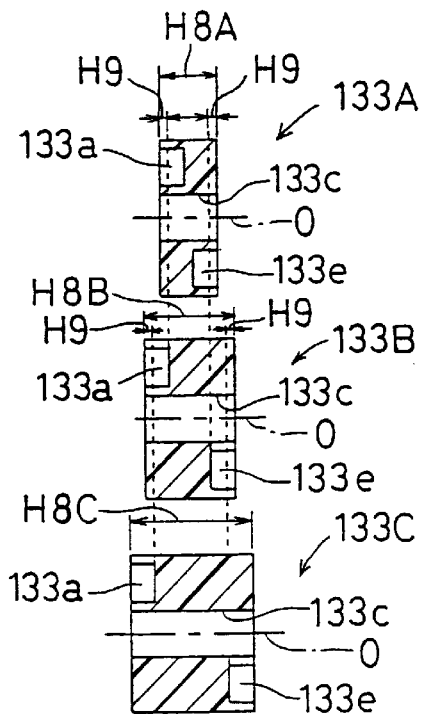
FIG. 32 is a section view showing space adjusting members 132A–132C.

FIG. 31 is a section view showing an assembly 511 of still another embodiment of the first group of the invention, and FIG. 32 is a section view showing a plurality of space setting members 133 which have different thicknesses H8. In the embodiment, two systems of space setting members for setting a mutual positional relation of the gear members 103, 104, are prepared. A first system is the space setting member 133 shown in FIG. 30, which is prepared as a rough space setting member for roughly setting a mutual positional relation between the gear members 103, 104, and a second system is the space setting member 106 shown in FIG. 22, which is prepared as a precise space setting member for precisely setting a mutual positional relation between the gear members 103, 104.

On the rough space setting member 133, when the sum of the depths of the concave coupling portions 133a, 133e on both sides in the axial direction is larger than the thickness of the space setting member 133, the respective concave coupling portions 133a, 133e are formed with the phases shifted in the perimeter direction, and formed to have a bottom so as not to pass through each other. The precise space setting member 106 is formed into a flat board which has a thickness smaller than the depth of the concave coupling portion of the rough space setting member 133, and formed into a shape which has an outer shape similar to and slightly smaller than an inner shape of the concave coupling portions 133a, 133e on a section perpendicular to the axial line O of the rough space setting member 133. Thus, one or more precise space setting members 106 can be fitted into the concave coupling portions 133a, 133e of the rough space setting member 133 while coming into contact with the bottoms of the concave coupling portions. In specific, the smaller the thickness of the precise space setting member 106 is, the more number of members 106 can be stacked, and it is preferable to stack a plurality of members 106 and fit them into the concave coupling portions 133a, 133e.

The rough space setting members 133 and the precise space setting members 106 are selectively combined and used, and as shown in FIG. 31, the convex coupling portions 103b of the gear member 103 is fitted into the concave coupling portions 133a on one side in the axial direction of the rough space setting member 133, and two precise space fitting members are fitted into each of the concave coupling portions 133e on the other side in the axial direction, in which status the convex coupling portion 104b of the gear member 104 is fitted. As a result, a space which is the sum of the thickness of the rough space setting member 133 and twice the thickness of the precise space setting member 106 can be ensured between the gear members 103, 104.

By combining two systems of space setting members of the rough space setting member 133 and the precise space setting member 106 in the same manner with this embodiment, it is possible to set the space between the gear members 103, 104 to be multilevel of more than the number of the systems, i.e., more than three, for every thickness of the precise space setting member 106. For instance, in the same manner with the embodiment of FIG. 31, as well as the two precise space setting members 106 are fitted into each concave coupling portion 133e on the other side in the axial direction, one precise space setting member 106 may be fitted into the concave coupling portion 133a on one side in the axial direction of the rough space setting member 133. The number selected as necessary of precise space setting members 106 can be fitted into the respective concave coupling portions 133a, 133e of the rough space setting member 133.

Further, the precise space setting members are fitted into the respective concave coupling portions 133a, 133e of the rough space setting member 133 so as to ensure a lower limit of engaging depth where the respective convex coupling portions 103b, 104b of the gear members 103, 104 can be fitted. In other words, in a status where a lower limit of engaging depth is ensured, which depth can reliably prevent an engaging status of the convex coupling portions 103b, 104b of the gear members 103, 104 and the concave coupling portions 133a, 133e of the rough space setting member 133, from being released because a transmitted driving force affects or because the respective gear members 103, 104 rattle between the boss portion 203a of the rotation axis and the fall-off preventing member 303, a plurality of precise space setting members 106 are stacked and fitted. The lower limit of engaging depth is a minimum depth which is necessary for engaging the convex coupling portions 103b, 104b with the concave coupling portions 133a, 133e of the rough space setting member 133, and a value of the depth is set by considering a minimum force which is necessary for a clearance in the axial direction and for a transmitted driving force. On the basis of this, a thickness of the precise space setting member 106 is selected to a value which is gained by subtracting the lower limit of engaging depth from the depth of the respective concave coupling portions 133a, 133e, and then dividing the remainder by an integer. As a result, in addition to reliably accomplishing an essential object of transmitting a driving force, it becomes possible to efficiently utilize the depth of the concave coupling portions 133a, 133e to set a space setting amount for many levels.

Furthermore, as shown in FIG. 32, it is possible to make the space setting amount multilevel, by preparing a plurality of space setting members 133A, 133B, 133C which have different thicknesses as the rough space setting member 133. In this case, the dimensions of the rough space setting members 133a, 133B, 133C may be selected to differ from each other by twice a value gained by subtracting a lower limit of engaging depth H9 from the depth H2 of the respective concave coupling portions 133a, 133e. Thus, it is possible to set a space setting amount to be fixed, that is, to be multilevel per thickness H20 of the precise space setting member 106.

Accordingly, it is possible to reduce the variety of rough space setting members 133 requiring a mold which is slightly smaller than the gear members 101–104 but is costly, thereby setting a space between the respective gear members 101–104 and to mold a space setting member so as to correspond to different setting amounts, thereby preventing an unnecessary mold cost from occurring. In addition to this, it can be prevented that a setting amount between the gear members 101–104 becomes rough and a meshing width of the teeth portions 101d–104d of the gear members 101–104 becomes small, which is a problem for that case. Further, since the precise space setting members are small and thin, and have the same dimension and shape, only an inexpensive and small mold is used even when they are formed using a mold. Furthermore, when the precise space setting member is a sheet member, a further inexpensive mold such as a Thomson teeth mold can be used.

Figure 33:
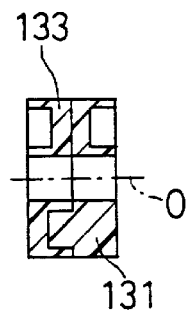
FIG. 33 is a section view showing a space adjusting assembly.
Figure 34:
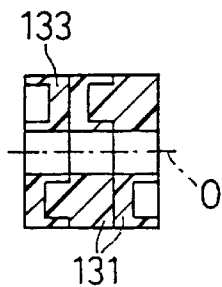
FIG. 34 is a section view showing another space adjusting assembly.

In the case of preparing a plurality of rough space setting members 133A–133C having different thicknesses H8 as shown in FIG. 32, space setting assemblies 550, 551 which have the same function as the rough space setting members 133B, 133C, may be configured by preparing a space setting member 133 (133A) having a thickness H8A of the same configuration with the space setting member shown in FIG. 30 and a space setting member 131 of the same configuration with the space setting member shown in FIG. 28, and combining them as shown in FIGS. 33 and 34. In this case, the variety of space setting members composing the rough space setting members is only two, so that the mold cost can be more reduced. Further, when the thickness H7 of the space setting member 131 excluding the convex coupling portion 131b is selected to be a thickness of twice a value gained by subtracting the lower limit of engaging depth H9 from the depth H2 of the respective concave coupling portions 133a, 133e, it is possible to construct space setting assemblies as rough space setting members which are different per this value.

Figure 35:
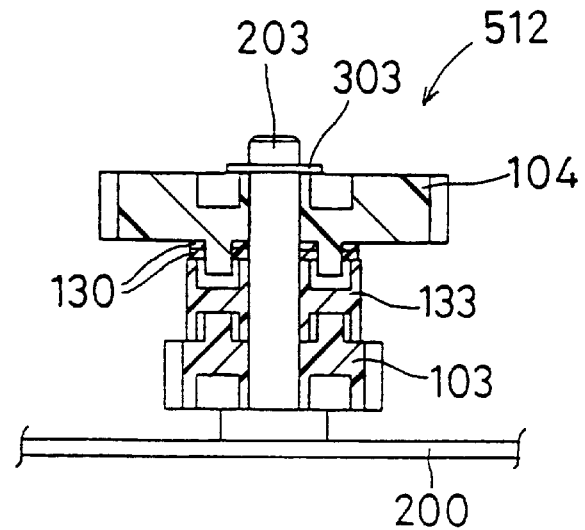
FIG. 35 is a section view showing a coupling structure of driving force transmitting members of still another embodiment of the invention.
Figure 36:
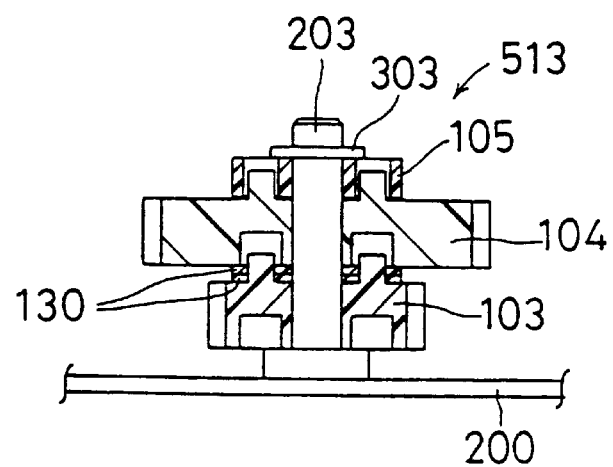
FIG. 36 is a section view showing a coupling structure of driving force transmitting members of still another embodiment of the invention.

As still another embodiment, assemblies 512, 513 may be constructed as shown in FIGS. 35 and 36, by combining a precise space setting member 130 of the same configuration shown in FIG. 24, the rough space setting member 133, and the space setting assembly. In this case, the same effect as described with reference to FIGS. 31–34 can be exerted.

Figure 37:
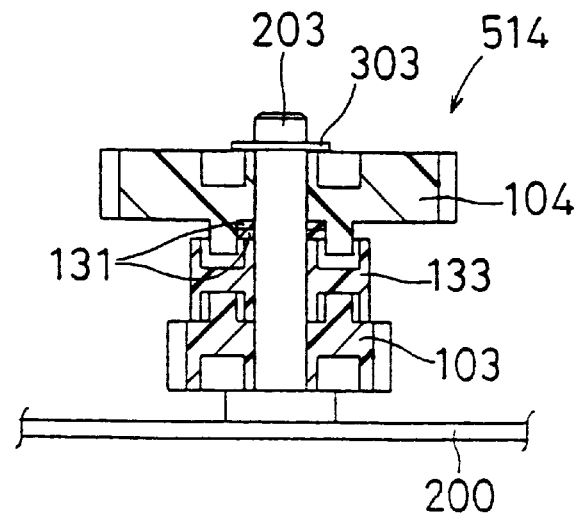
FIG. 37 is a section view showing a coupling structure of driving force transmitting members of still another embodiment of the invention.
Figure 38:
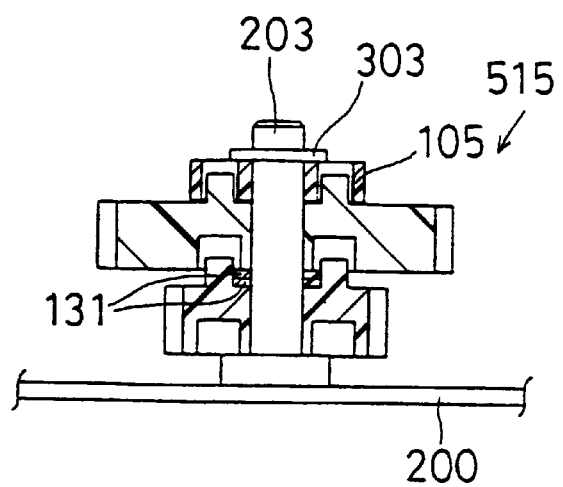
FIG. 38 is a section view showing a coupling structure of driving force transmitting members of still another embodiment of the invention.

As still another embodiment, assemblies 514, 515 may be constructed as shown in FIGS. 37 and 38, by combining a precise space setting member 131 of the same configuration shown in FIG. 26, the rough space setting member 133 and the space setting assembly. In this case, the same effect as described with reference to FIGS. 31–34 can be exerted.

Figure 39A:
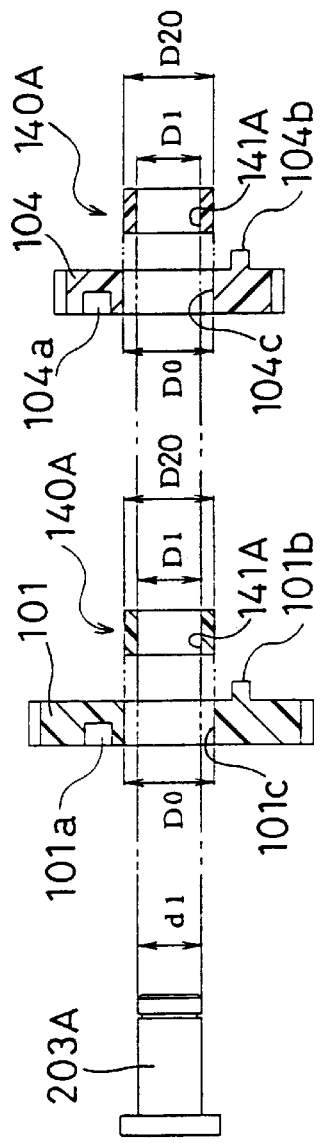
FIGS. 39A–39C are exploded section views showing a coupling structure of driving force transmitting members of still another embodiment of the invention, FIG. 39A being a coupling structure using a bearing 140A, FIG. 39B being a coupling structure using a bearing 140B, and FIG. 39C being a coupling structure using a bearing 140C.
Figure 39B:
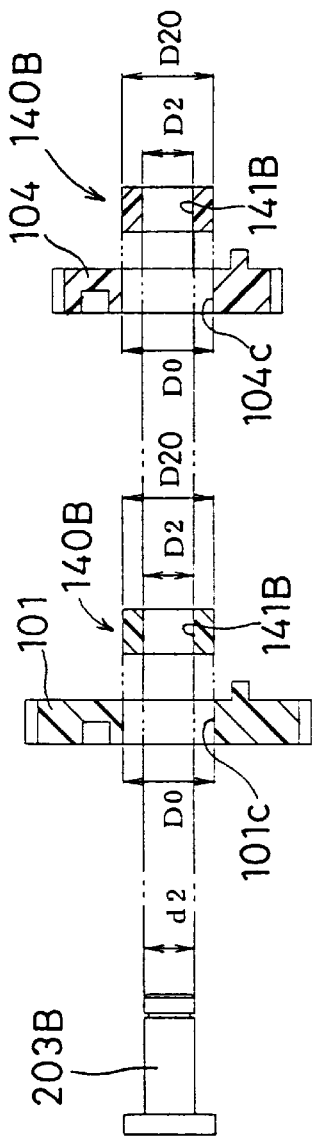
Figure 39C:
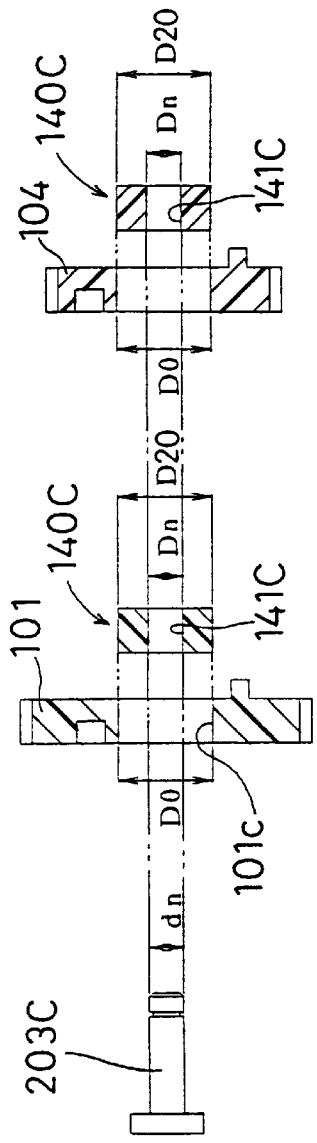
Figures 40A, 40B, 40C:
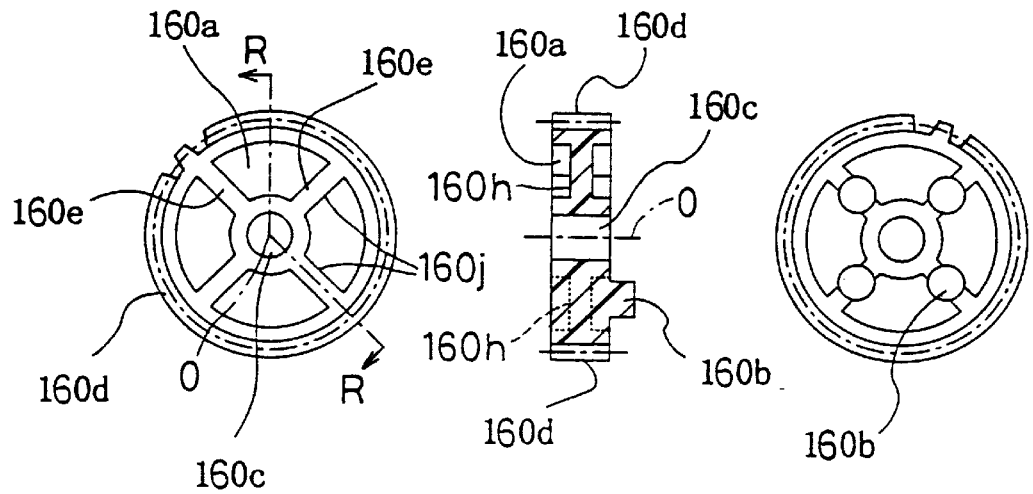
FIGS. 40A–40C are views showing another gear member 160, FIG. 40A being a front view, FIG. 40B being a section view, and FIG. 40C being a rear view.
Figures 41A, 41B, 41C:
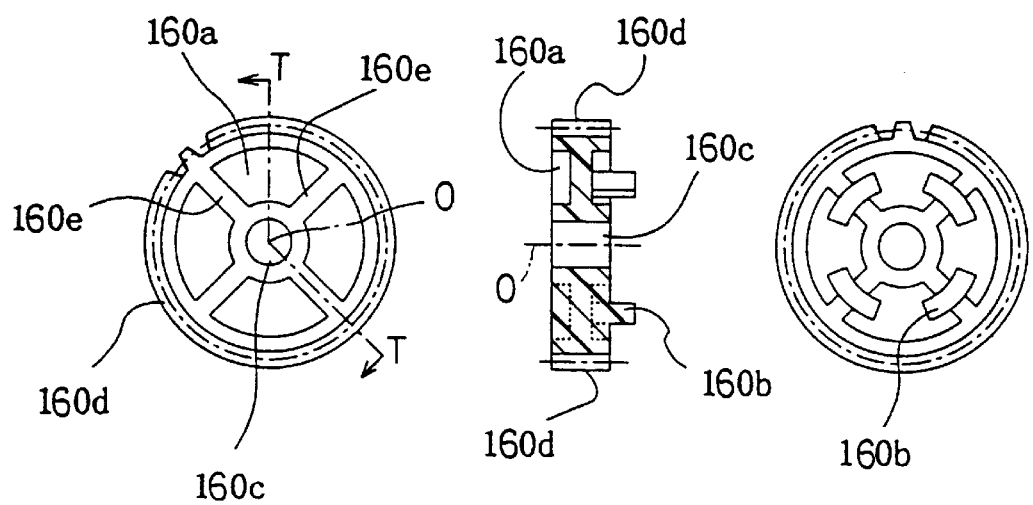
FIGS. 41A–41C are views showing still another gear member 160, FIG. 40A being a front view, FIG. 40B being a section view, and FIG. 40C being a rear view.

FIGS. 39A–39C are exploded section views showing an assembly 516 of still another embodiment of the first group of the invention, and the outer diameter of the rotation axis is different for each of the FIGS. 39A–39C. With reference to FIGS. 39A–39C, such an embodiment will be illustrated that even when outer diameters d1, d2, dn of a plurality of rotation axes 203A, 203B, 203C are different from each other, the same gear members 101–104 can be used. In an apparatus such as a copying machine, a transmitted driving force is within a predetermined range, except a special case. Based on this, as shown in FIG. 39, the outer diameters of the rotation axes 201–203 for supporting the gear members 101–104 to be used in common are set to be the axial diameters d1–dn within the predetermined range. Bearings 140A, 140B, 140C serving as axial diameter setting members are prepared, which have inner diameters D1, D2, D3 so that the rotation axes 203A–203C having the preset axial diameters d1–dn can be rotatably pierced into and which have fixed outer diameters D20, and inner diameters D0 of the fitting holes 101c–104c are selected to be the same so that the bearings 140A–140C are fitted into the fitting holes 101c–104c of the gear members 101–104 (only the gear members 101, 104 are shown in FIG. 31) as close fits.

Further, since the close fits do not work appropriately when the thicknesses of the respective bearings 140A–140C are too thin, outer diameters D20 of the bearings 140A–140C are determined so that the thicknesses of the bearings 140A–140C are larger than a predetermined thickness. In the gear members 101–104, the concave coupling portions 101a–104a and the convex coupling portions 101b–104b are formed between the teeth portions 101d–104d and the fitting holes 101c–104c.

When the bearings 140A–140C are used and the rotation axes 203A–203C are pierced into bearing holes 141A, 141B, 141C of the bearings 140A–140C, the gear members 101, 104 can be supported so as to be rotatable, and further the same gear members 101–104 can be supported by the rotation axes 203A–203C having different diameters. Therefore, it is not necessary to mold the gear members 101–104, respectively, corresponding to the outer diameters d1–dn for each of the rotation axes 203A–203C having the different outer diameters, and the variety of the gear members 101–104 to be molded can be reduced regardless of the variety of the rotation axes of different diameters. In this case, since the bearings 140A–140C are shaped to be simple and small, even when the bearings 140A–140C are formed by resin molding, the cost is low and the variety of molds is a few as compared with a mold of a gear member, with the result that the manufacturing cost is reduced.

In the configurations of the inventions, the concave coupling portion and the convex coupling portion may be formed in a region whose radius is between the axial line and the perimeter portion of a driving force transmitting member having the smallest effective diameter, whereby all driving force transmitting members can be coupled with each other, regardless of an effective diameter of a driving force transmitting member. The shape and dimension of the concave coupling portion and the convex coupling portion may be determined based on a force applied to the convex coupling portion at the time of transmitting a driving force, whereby the concave coupling portion and the convex coupling portion are not formed to be unnecessarily huge, and a sufficient strength can be given to the convex coupling portion. The concave coupling portion and the convex coupling portion may be formed into a shape which elongates in the perimeter direction, whereby it is possible to decrease an area of a section which is perpendicular to the axial line of the convex coupling portion, and to increase a strength with respect to a force which is applied at the time of transmitting a driving force. The shape and dimension of such a concave coupling portion and a convex coupling portion may be determined by considering the largest torque which is generated at the time of coupling a driving force transmitting member having the largest effective diameter and a driving force transmitting member having the smallest effective diameter, so as to transmit the largest torque. Thus, in whichever combination of driving force transmitting members, the convex coupling portions can hold a sufficient strength.

Although various embodiments are illustrated above, the first group of the invention is not restricted to those embodiments. For example, such embodiments as shown below are also realized according to the invention.

(1) In the above embodiments, a rotation axis serving as a driving force transmitting member, may be formed by molding into one piece with a driving frame made of a resin, or may be formed by fixing a rotation supporting member made of a metal in one piece onto a driving force transmitting frame made of a plate metal by a swage or the like.

(2) In the above embodiments, a driving force transmitting member is illustrated as a gear member, but the invention can be applied to another driving force transmitting member such as a pulley with a timing belt, and a friction wheel.

(3) In the above embodiments, two gear members placed adjacent on the same axial line are coupled with each other, but a combination of driving force transmitting members is not limited to driving force transmitting members which have the same driving force transmission acting portion, e.g., to a gear member and a gear member as shown in the above embodiments, and a gear member may be combined with a pulley member, for example. Furthermore, three or more driving force transmitting members may be coupled.

(4) A section shape of a convex coupling portion in a direction perpendicular to the axial line is not required to be almost the same as a section shape of a concave coupling portion in a direction perpendicular to the axial line. For example, as shown in a front view FIG. 40A, a section view FIG. 40B which is taken on section line R—R of FIG. 40A, and a rear view FIG. 40C, a concave portion within a strengthening rib 160 disposed between a fitting hole 160c and a teeth portion 160d of a gear member 160, may be a concave coupling portion 160a. When a contact face 160h of the concave coupling portion 160a is flat as shown in this case, a supporting face j of the concave coupling portion 160a with which a convex coupling portion 160b having a curved outer shape comes into contact, may be curved. Further, when the concave coupling portion 160a is configured to be thus large, it is also possible to couple the gear member 160 shown in FIG. 40, with a gear member 160 having a different convex coupling portion 160b shown in a front view FIG. 41A, a section view FIG. 41B taken on section line T—T of FIG. 41A, and a rear view FIG. 41C.

(5) In the above embodiments, the convex coupling portions and the concave coupling portions are coupled at two positions, but they may be coupled at three or more positions, or at one position.

(6) In the above embodiments, the convex coupling portion and the concave coupling portion are formed with the phases shifted by 90° in the perimeter direction, but they may be formed with whatever phases.

(7) The concave coupling portion may be a hole which passes through a driving force transmitting member.

(8) The height of the convex coupling portion may be larger than the depth of the concave coupling portion.

(9) In the above embodiments, all kinds of driving force transmitting members have a convex coupling portion and a concave coupling portion when it is aimed to use driving force transmitting members in common, but when a group of driving force transmitting members having only one of a convex coupling portion and a concave coupling portion, are coupled with a group of driving force transmitting members having a convex coupling portion and a concave coupling portion such an effect is also exerted that while the variety of driving force transmitting members is decreased, the number of coupling combinations of driving force transmitting members adjacent to each other is increased, which is an effect of the invention.

Further, only a driving force transmitting member frequently used in an apparatus, may be provided with a concave coupling portion on one side in the axial direction and a convex coupling portion on the other side in the axial direction. In other words, when there is a driving force transmitting member having both a convex coupling portion and a concave coupling portion of predetermined kind, for a driving force transmitting member having one of a convex coupling portion or a concave coupling portion, it is possible to cause a driving force transmitting member arbitrarily selected from among a group of driving force transmitting members having one driving force transmission acting portion, to transmit a driving force between driving force transmitting members adjacent to each other on the same axial line, and it is possible to use a driving force transmitting member independently.

(10) In the above embodiments, the number of teeth, a module, the width of teeth and a material which are design parameters for determining a teeth portion of a gear member serving as a driving force transmitting member, are not specified, but gear members having different design parameters may be coupled so as to be adjacent to each other on the same axial line.

(11) In the above embodiments, a driving force transmitting member is fixed so as to rotate about a rotation supporting axis, but a driving force transmitting member may be supported onto a rotation supporting member by a fixing pin or the like, so as to integrally rotate.

Although various embodiments of the invention are illustrated above, when the above embodiments are implemented independently or in combination, it is possible to cause a driving force to be transmittable between driving force transmitting members adjacent to each other on the same axial line while further reducing the variety of driving force transmitting members whose molds are costly, and it is possible to use a driving force transmitting member independently.

Further, in the above embodiments, the convex coupling portion and the concave coupling portion are formed in one annular band which is away from the center of a bearing hole by a preset distance outward in the radial direction, but the convex coupling portion and the concave coupling portion may be formed in a plurality of annular bands which are away from the center of a bearing hole by a preset distance outward in the radial direction. In an embodiment where this configuration is applied, driving force transmitting members are classified into a group of small diameter driving force transmitting members having a narrow space between a bearing hole and a driving force transmission acting portion, a group of medium diameter driving force transmitting members having a medium space between a bearing hole and a driving force transmission acting portion, and a group of large diameter driving force transmitting members having a large space between a bearing hole and a driving force transmission acting portion. To the group of small diameter driving force transmitting members, a pair of convex coupling portions and concave coupling portions are positioned in one annular band. To the group of medium diameter driving force transmitting members, concave coupling portions where the convex coupling portions of the group of small diameter driving force transmitting members can be inserted and coupled are positioned, and a pair of convex coupling portions and concave coupling portions are positioned in an annular band outside thereof. To the group of large diameter driving force transmitting members, concave coupling portions where the convex coupling portions of the group of medium diameter driving force transmitting members can be inserted and coupled are positioned, and a pair of convex coupling portions and concave coupling portions are positioned in one annular band. As a result, the respective groups of driving force transmitting members can be coupled with each other, and can be easily distinguished from each other. For example, it is easy to distinguish groups of gear members which have different modules of teeth.

Further, the respective driving force transmitting members may be fixed onto a rotation supporting member which is provided so as to be rotatable. Since accompanying the size of a transmitted driving force, a falling strength of a teeth face and a shaving strength of a teeth face depend on a teeth face pressure, the driving force transmitting members may be divided into groups of different teeth widths. Further, a portion for setting a space between the driving force transmitting members, may be formed in one piece with a rotation supporting member.

Figure 42:
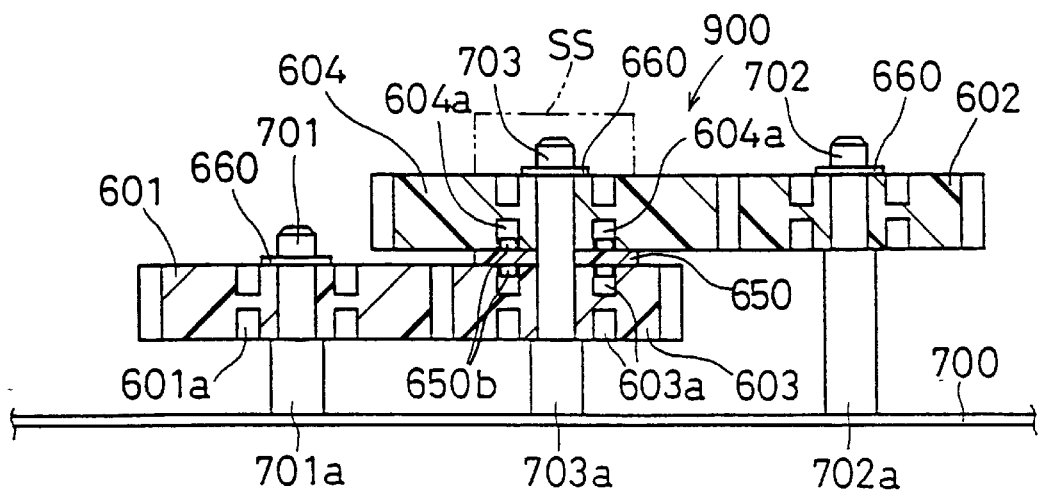
FIG. 42 is a section view showing a coupling structure of driving force transmitting members of an embodiment of a second group of the invention.
Figures 43A, 43B, 43C:
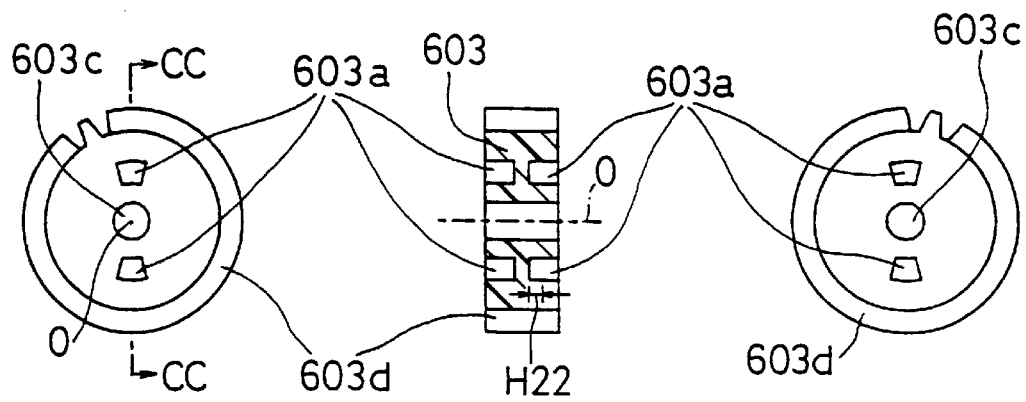
FIGS. 43A–43C are views showing a gear member 603, FIG. 43A being a front view, FIG. 43B being a section view, and FIG. 43C being a rear view.
Figures 46A, 46B, 46C:
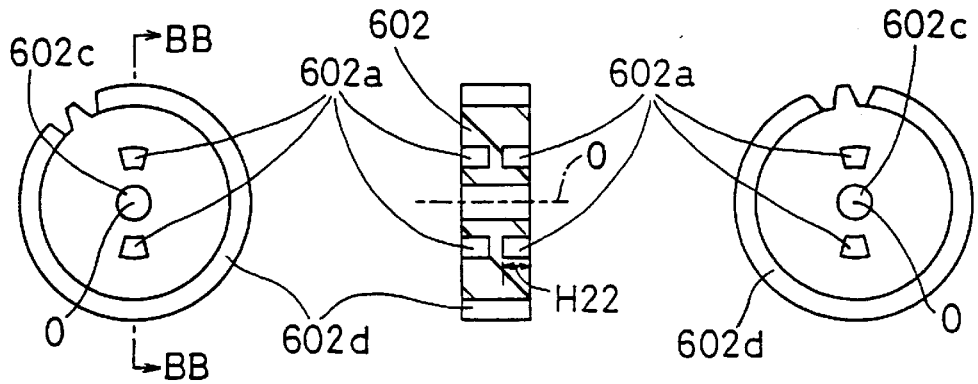
FIGS. 46A–46C are views showing a gear member 602, FIG. 46A being a front view, FIG. 46B being a section view, and FIG. 46C being a rear view.
Figures 47A, 47B, 47C:
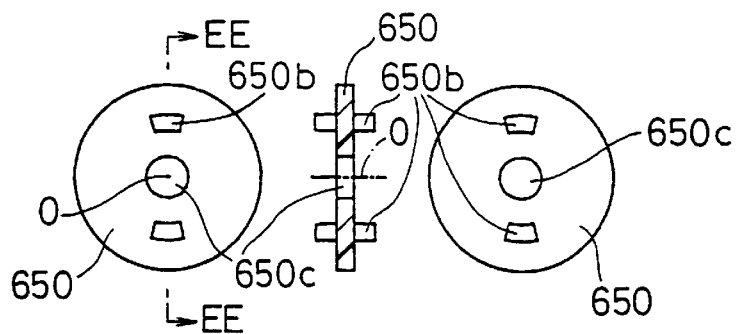
FIGS. 47A–47C are views showing a coupling member 650, FIG. 47A being a front view, FIG. 47B being a section view, and FIG. 47C being a rear view.

Next, an invention of a second group of the invention will be described with reference to FIGS. 42–74. FIG. 42 is a section view showing a gear train having an assembly 900 which is formed by coupling in accordance with a coupling structure of driving force transmitting members of an embodiment of the second group of the invention. This embodiment will be described by taking a gear member which transmits a driving force by meshing a teeth portion of the perimeter portion thereof with another member will be taken as an example of a driving force transmitting member. FIG. 43A is a front view showing a gear member 603 which composes an assembly 900, FIG. 43B is a section view of the gear member 603 taken on section line CC—CC of FIG. 43A, and FIG. 43C is a rear view of the gear member 603. FIG. 44A is a front view showing a gear member 604 which composes the assembly 900, FIG. 44B is a section view of the gear member 604 taken on section line DD—DD of FIG. 44A, and FIG. 44C is a rear view of the gear member 604. FIG. 45A is a front view showing a gear member 601 which composes a gear train having the assembly 900, FIG. 45B is a section view of the gear member 601 taken on section AA—AA of FIG. 45A, and FIG. 45C is a rear view of the gear member 601. FIG. 46A is a front view showing a gear member 602 which composes a gear train having the assembly 900, FIG. 46B is a section view of the gear member 602 taken on section line BB—BB of FIG. 46A, and FIG. 46C is a rear view of the gear member 602. FIG. 47A is a front view showing a coupling member 650 which composes the assembly 900 and couples the gear members 603, 604, FIG. 47B is a section view of the coupling member 650 taken on section line EE—EE of FIG. 47A, and FIG. 47C is a rear view of the coupling member 650.

This embodiment, as mentioned above, will be described by taking four kinds of gear members 601–604 which transmit a driving force by meshing the teeth portion thereof with another member, as examples of driving force transmitting members. The gear member 603 is provided with concave coupling portions 603a on both sides in the axial line direction, the concave coupling portions 603a being concave from a portion residue in the axial line direction. The gear members 601, 602, 604 are also provided with concave coupling portions 601a, 602a, 604a on both sides in the axial line direction, respectively. The concave coupling portions 601a–604a are formed into the same shape and are positioned at identical positions with respect to the axial lines of the gear members 601–604.

The coupling member 650 is provided with convex coupling portions 650b on both sides in the axial line direction, the convex coupling portions 650b being projected from a portion reside along the axial line direction. The convex coupling portions 650b are formed into similar figures to the concave coupling portions 601a–604a of the driving force transmitting members 601–604 and are positioned at identical positions to the positions of the concave coupling portions 601a–604a with respect to the axial lines of the gear members 601–604. Furthermore, a height H21 of the convex coupling portion 650b is made to be smaller than a depth H22 of each of the concave coupling portions 601a–604a, from a surface of each side of the gear members 601–604 (H21<H22). The concave coupling portions 601a–604a and the convex coupling portions 650b are formed into a shape such that the convex coupling portions 650b can be stably fitted into the concave coupling portions 601a–604a without rattling and the operations of fitting and detaching can be smoothly conducted.

The concave coupling portions 601a–604a and the convex coupling portions 650b are formed between bearing holes 601c–604c which are formed by passing the gear members 601–604 through center portions of the respective gear members 601–604, and the teeth portions 601d–604d which serve as driving force transmission acting portions. Specifically, they are formed at positions between the axial line and the teeth portion 601d of the perimeter portion, i.e., between the bearing hole 601c and the teeth portion 601d on the gear member 601 having the smallest effective diameter, and spaced at a preset distance from the axial lines O of the respective gear members 601–604 and the coupling members 650, at two positions for each 180° in the perimeter direction. Since the concave coupling portions 601a–604a of the gear members 601–604 and the convex coupling portions 650b of the coupling members 650 are thus formed at uniform positions and into a uniform shape, the same kind of gear members or different kinds of gear members are arbitrarily selected and placed on the same axial line, and the convex coupling portions are fitted and fixed into the concave coupling portions, whereby the gear members can be coupled via the coupling members 650 so as to transmit a driving force by rotating about the axial direction and so as to be mutually attachable/detachable in the axial line direction.

Accordingly, it is possible to fabricate ten kinds of complex-type driving force transmitting parts having two teeth portions of 601*d*–604*d* by preparing four kinds of gear members 601–604, as well as the first group as mentioned above. In other words, it is possible to fabricate a more number of complex-type driving force transmitting parts than the variety of the gear members. Further, the gear members 601–604 can be used independently, and can be used for fabricating an assembly which has three or more teeth portions. When they are included, more number of complex-type driving force transmitting parts can be constructed.

Although the following in the specification will be described by taking only the four gear members 601–604 as examples, all gear members to be used in common for the whole copying machine and for another apparatus can be coupled via coupling members by the same concave coupling portions and convex coupling portions. The more the variety of gear members to be prepared becomes, the smaller a ratio of the variety of prepared gear members to the variety of driving force transmitting parts to be constructed becomes, and the larger the above-said effect of the invention becomes, with the result that a full effect of the invention will be exerted in a picture image processing apparatus such as a copying machine which uses a lot of driving force transmitting parts.

As shown in FIG. 42, on a frame 700 for supporting a gear train serving as a driving force transmitting mechanism, a rotation axes 701, 702, 703 are fixed and erected so as to be one piece, and the rotation axes 701–703 are disposed so as to be parallel to each other. The rotation axis 701 is pierced into the gear member 601, the rotation axis 702 is pierced into the gear member 602, and the rotation axis 703 is pierced into the assembly 900 composed of the gear members 603, 604 and the coupling member 650. The gear members 601, 602 and the assembly 900 are supported so as to be rotatable about the rotation axes 701–703.

In a transmission path of a driving force, the gear member 601 is placed on a side near the driving force source, the gear member 602 is placed on a side far from the driving force source, and the assembly 900 is interposed in order to increase a rotation speed and transmit a driving force from the gear member 601 to the gear member 602. The assembly 900 is constructed by coupling the two gear members 603, 604 as mentioned above so as to rotate integrally. The gear member 603 is meshed with the gear member 601, and the gear member 604 is meshed with the gear member 602. In this status, a rotation of the gear member 601 is transmitted to the gear member 602 via the gear member 603 and the gear member 604.

The respective rotation axes 701–703 are pierced into the respective gear members 601–604, and displacement preventing members 660 such as an E ring are attached to the rotation axes 701–703, whereby the gear members are prevented from being displaced with respect to the respective rotation axes 701–703 and falling off the rotation axes 701–703. To be precise, the respective displacement preventing members 660 function for limiting the displacement in the axial direction of the gear members 601–604 within a predetermined amount, and also prevent the gear members 601–604 from falling off.

Further, the height H21 of the convex coupling portions 650*b* is set to be smaller than the depth H22 of the concave coupling portions 601*a*–604*a*, so that in a case where the gear member 603 and the gear member 604 are coupled as shown in FIG. 42, side faces of the gear members 603, 604 and the coupling member 650 come into contact with each other and no space will be generated between them. Therefore, the stability of the assembly 900 is enhanced. In other words, rattling of the gear members is limited.

In the embodiment, the respective gear members 601–604 are provided with concave coupling portions on both sides in the axial line direction, so that three or more gear members 601–604 can be coupled in the axial direction as described above, and two of the gear members 601–604 can be coupled by the coupling member 650 regardless of the front and rear of the gear members 601–604. Therefore, the embodiment shows an excellent operability. Further, the coupling member 650 is provided with the convex coupling portion 650*b* and the respective gear members 601–604 are provided with the concave coupling portions 601*a*–604*a*, whereby the sizes of the respective gear members 601–604 in the axial direction can be reduced, and the convex coupling portions are not open in both cases where the gear members 601–604 are used by coupling and where used independently. Accordingly, it is possible to reduce the size in the axial direction of the assembly 900 and ensure a region SS for mounting or attaching/detaching the displacement preventing member 660. Therefore, there is no need to use a special member as the displacement preventing member 660, so that an E ring or a C ring can be used which are commercially available and easy to obtain, and an operation of attaching/detaching the displacement preventing member 660 is facilitated. Further, it is possible to remove the driving force transmitting parts 601, 602, 900 from the rotation axes by detaching the displacement preventing member 660 from the rotation axes 701–703, replace the respective parts, and conduct such operations in a simple manner. In particular, when an E ring is used, an excellent operability can be brought. Further, since the assembly 900 can be disassembled into the gear members 603, 604, and not only the whole assembly 900 but also one of the gear members 603, 604 can be replaced, it is economical.

Further, according to another embodiment, in the case of coupling two gear members, they can be coupled via the coupling member 650 even when the concave coupling portions are formed on only one side in the axial direction. Furthermore, even when the respective gear members 601–604 are provided with the convex coupling portions, and the coupling members are provided with the concave coupling portions, the gear members 601–604 can be coupled by the coupling members 650.

Figure 48:
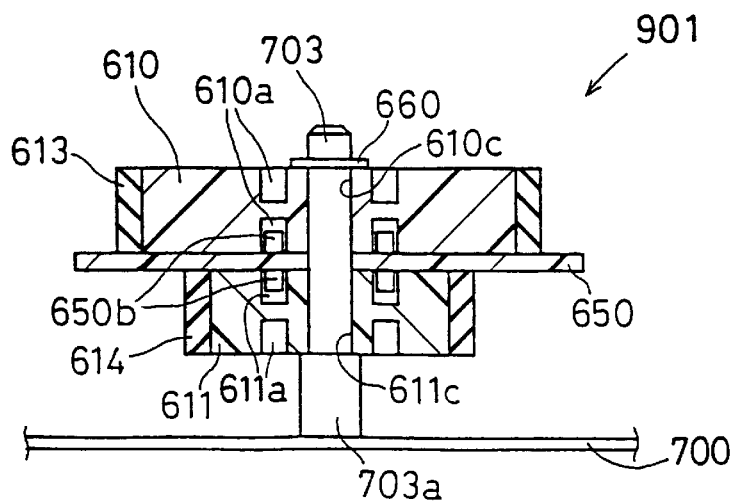
FIG. 48 is a section view showing a coupling structure of driving force transmitting members of another embodiment of the invention.

Next, as another embodiment of the second group of the invention, such an embodiment will be described with reference to FIG. 48 that a portion of a coupling member is used as a guard when at least one of the driving force transmitting members to be coupled is a pulley member 606. FIG. 48 is a section view showing an assembly 901 in which a coupling structure of driving force transmitting members of another embodiment of the second group of the invention is implemented. The same reference numerals are given to portions corresponding to those of the embodiments shown in FIGS. 42–47, and only different configurations will be described.

In the embodiment, the driving force transmitting members are pulley members 610, 611, which are provided with the same concave coupling portions 610a, 611a on both sides in the axial direction, as well as the above-described gear members 601–604. The respective pulley members 610, 611 are provided with bearing holes 610c, 611c which are passed through the center portions in the axial direction, and are rotatably supported by a rotation axis 704 which is pierced into the bearing holes. The respective pulley members 610, 611 are provided with belts 613, 614 which are stretched on the respective perimeter portions.

Thus, when a driving force transmitting member is a pulley member, a portion of the coupling member 650, which is the outer diameter of the coupling member 650 in the embodiment, is formed be larger than an effective diameter, i.e., the outer diameter of the pulley member 610 having a larger outer diameter, and the perimeter of the coupling member is projected from the pulley members 610, 611 in the radial direction. Thus, the coupling member 650 functions as a guard for preventing the belts 613, 614 stretched on the respective pulley members from being displaced in the axial line direction. Consequently, it is possible to prevent not only the belt stretched on the pulley member 611 having a smaller diameter but also the belt 613 stretched on the pulley member 610 having a larger diameter, from being displaced in one of the axial line directions, i.e., in a direction near the coupling member 650, and it is possible to cause the belts 613, 614 not to be detached easily.

In particular, when a guard is formed on a side opposite to the coupling member 650 of the respective pulley members 610, 611, the belts 613, 614 are never detached. As shown above, a guard may be formed on only one side in the axial line direction, so that it can be manufactured easily and it can reduce the thickness of the pulley members 610, 611 in the axial line direction.

Next, a configuration of setting a positional relation in the axial direction of gear members composing an assembly, will be described with reference to FIGS. 49–65. FIG. 49 is a section view showing an assembly 902 in which a coupling structure of driving force transmitting members of still another embodiment of the second group of the invention is implemented, FIG. 50A is a front view showing a space setting member 750 which composes the assembly 902, and FIG. 50B is a section view taken on section line FF—FF of FIG. 50A. The same reference numerals are given to portions corresponding to those of the embodiment as shown above, and only different configurations will be described.

The gear members 603, 604 are coupled in a status that a space corresponding to a thickness of the coupling member 650 is set between the gear members 603, 604. Such a configuration that the space between the gear members 603, 604 can be arbitrarily set in a direction of further widening, is needed for design. In this case, a space setting member as shown in FIGS. 50A is used, which can be fitted into the concave coupling portion 603a of the gear member 603.

One or more space setting members 750 are fitted into the concave coupling portions 603a, 604a of the gear members 603, 604, thereby lifting up the bottoms of the concave coupling portions 603a, 604b, and the convex coupling portions 650b of the coupling member 650 are made to come into contact with the space setting members 750, thereby positioning and spacing the gear members 603, 604 and the coupling member 650. In this case, a thickness H25 of the space setting member 750 is smaller than a depth H22 of the concave coupling portions 603a, 604a, wherein the smaller is the more preferable, with the result that it is possible to stack and fit a plurality of space setting members to set spaces to be multilevel.

In the embodiment, a value is selected by subtracting a lower limit of engaging depth from the depth of the respective concave coupling portions 603a, 604a, and dividing the remainder by an integer. In this case, the lower limit of engaging depth is a minimum depth which is necessary for engaging the concave coupling portions 603a, 604a of the gear members 603, 604 with the convex coupling portions 650b of the coupling member 650, and is a value which is set by considering a minimum force necessary for a clearance in the axial line direction and for a transmitted driving force. Thus, in addition to surely accomplishing an essential object of transmitting a driving force, it is possible to effectively use a depth of the concave coupling portions 603a, 604a, and set space setting amounts into a lot of levels. In this case, the convex coupling portions 650b of the coupling member 650 are fitted into and coupled with the concave coupling portions 604a of the gear member 604, so that the gear members 603, 604 can integrally rotate. In such a configuration, the respective concave coupling portions 603a, 604a are formed to have bottoms, and constructed so as to be lifted up by the space setting member 750.

Further, the operability may be enhanced by causing the shape of a section perpendicular to the thickness direction of the space setting member 750, to be almost identical to the shape of a section perpendicular to the axial line of the concave coupling portions 603a, 604a and to be slightly larger, and by fitting the space setting members 750 into the concave coupling portions 603a, 604a as close fits so as to prevent from falling off the concave coupling portions 603a, 604a.

Furthermore, by preparing as the coupling members 650, not only such space setting members 750 but also a plurality of coupling members 650A, 650B, 650C having different thicknesses as shown in FIG. 51, it is possible to selectively combine the space setting members 750 and the coupling members 650A–650C, and cause spaces between the gear members to be multilevel, with the result that it becomes easy to set the spaces. In this case, the respective rough space setting members 132A, 132B, 132C are selected to have sizes which are different by twice a value gained by subtracting the lower limit of engaging depth H29 from the depth H22 of the concave coupling portion 603a shown in FIG. 43B. Thus, it is possible to set space setting amounts to be multilevel by a preset amount, i.e., by a thickness H30 of the precise space setting member 606.

Thus, it is possible to reduce the variety of the coupling members 650 requiring a mold which is slightly smaller than those of the gear members 601–604 but is costly, thereby setting a space between the respective gear members 601–604, and to mold the coupling member 650 and the space setting member 750 so as to correspond to different setting amounts, thereby preventing an unnecessary mold cost from occurring. In addition to this, such a problem in this case can be prevented from occurring that: a setting amount between the gear members 601–604 becomes rough, a meshing width of the teeth portions 601d–604d of the gear members 601–604 becomes small and a meshing amount of the respective teeth portions 601d–604d becomes insufficient, so that a pressure on a teeth face is increased and a gear life cannot be adequately exerted due to a teeth break or the like. Further, since the space setting members are small and thin, and have the same dimension and shape, only an inexpensive and small mold is used even when they are formed by using a mold. Furthermore, when the space setting member is a sheet member, a further inexpensive mold such as a Thomson teeth mold can be used.

Figure 52:
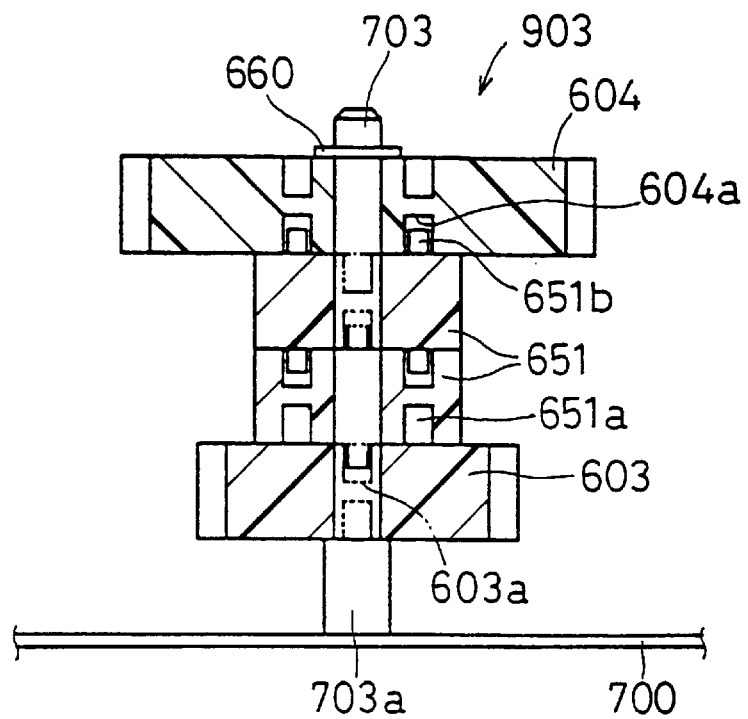
FIG. 52 is a section view showing a coupling structure of driving force transmitting members of still another embodiment of the invention.
Figures 53A, 53B, 53C:
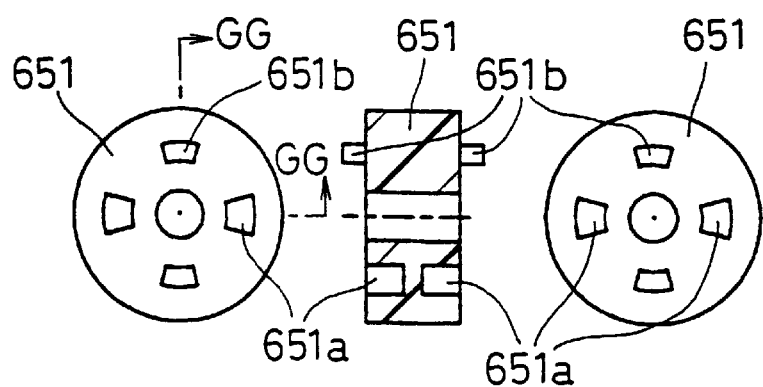
FIGS. 53A–53C are views showing a coupling member 650 of another embodiment, FIG. 53A being a front view, FIG. 53B being a section view, and FIG. 53C being a rear view.

FIG. 52 is a section view showing an assembly 903 in which a coupling structure of driving force transmitting members of still another embodiment of the second group of the invention, go; FIG. 53A is a front view showing a coupling member 651 composing the assembly 903, FIG. 53B is a section view taken on section line GG—GG of FIG. 53A, and FIG. 53C is a rear view of the coupling member 651. The same reference numerals are given to portions corresponding to those of the above embodiments, and only different configurations will be described.

The coupling member 651 is provided with, in addition to the convex coupling portions 650b, concave coupling portions 650a at two positions off the convex coupling portions 650b on both sides in the axial line direction. Convex coupling portions 650b of another coupling member 651 can be fitted into the concave coupling portions 650a, whereby the two coupling members 651 are coupled by the concave coupling portions 650a and the convex coupling portions 650b so as to rotate to transmit a driving force, and so as to be attachable/detachable in the axial line direction. Thus, as shown in FIG. 52, the two coupling members 651 are interposed between the gear members 603, 604 in a status of being coupled, so that the gear members 603, 604 can be coupled, between which a space twice a thickness of the coupling member 651 is set. Thus, only one kind of coupling member 651 is required, the mold cost is further reduced, and multilevel spaces can be set between the respective gear members.

Figure 54:
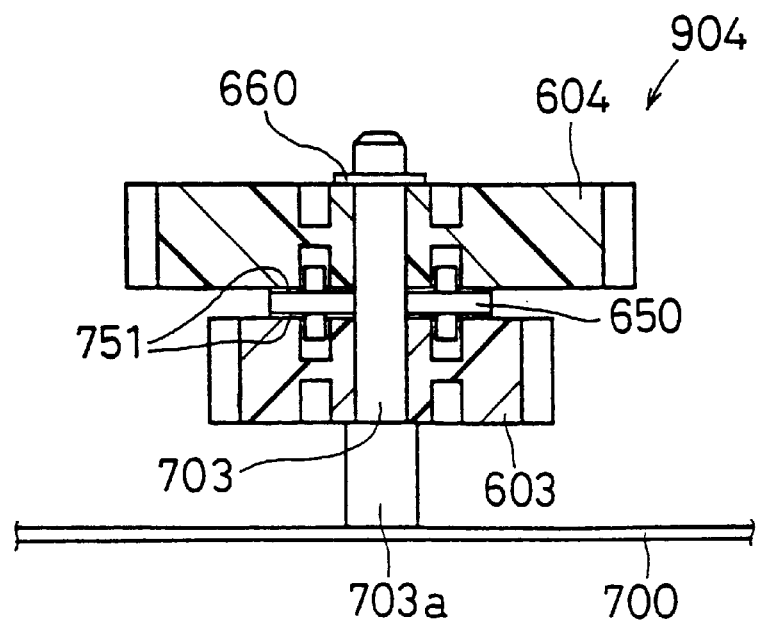
FIG. 54 is a section view showing a coupling structure of driving force transmitting members of still another embodiment of the invention.
Figure 55A:
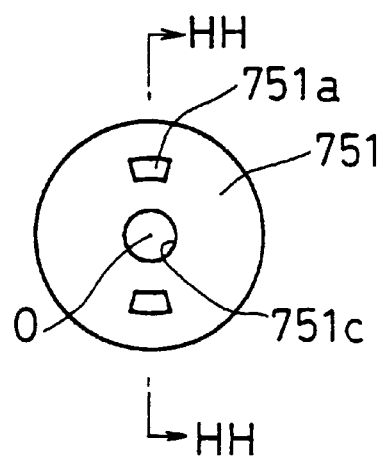
FIGS. 55A and 55B are views showing a space setting member 751 of another embodiment, FIG. 55A being a front view, and FIG. 55B being a section view.
Figure 55B:
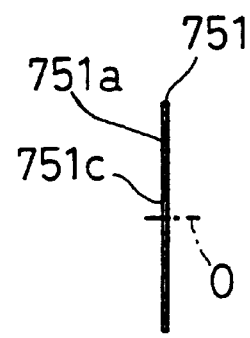

FIG. 54 is a section view showing an assembly 904 in which a coupling structure of driving force transmitting members of still another embodiment of the second group of the invention, FIG. 55A is a front view showing a space setting member 751 composing the assembly 904, and FIG. 55B is a section view taken on section line HH—HH of FIG. 55A. According to the embodiment described with reference to FIGS. 49 and 50, the space setting member 751 becomes small and hard to handle at the time of operating, and the same number of operations as that of the concave coupling portions are required. Therefore, in order to simplify the operations, a space setting member of this embodiment is implemented. The space setting member 751 is provided with a bearing hole 751c into which a rotation axis 703 is pierced, and a piercing hole 751a into which the convex coupling portion 650b of the coupling member 650 is pierced. In order to avoid that the space setting member 751 is displaced in the radial direction to obstruct the transmission of the rotation of the respective gear members 603, 604, the inner diameter of the bearing hole 130c is selected to be larger, e.g., slightly larger, than the outer diameter of the rotation axis 703.

This space setting member 751 is placed so that the convex coupling portions 650b are pierced into the piercing hole 751a and fitted into the concave coupling portions 603a, 604a of the gear members 603, 604. As a result, it is possible to set a mutual relation in the axial line direction between the gear members 603, 604, and to simplify an assembling operation.

Figure 56:
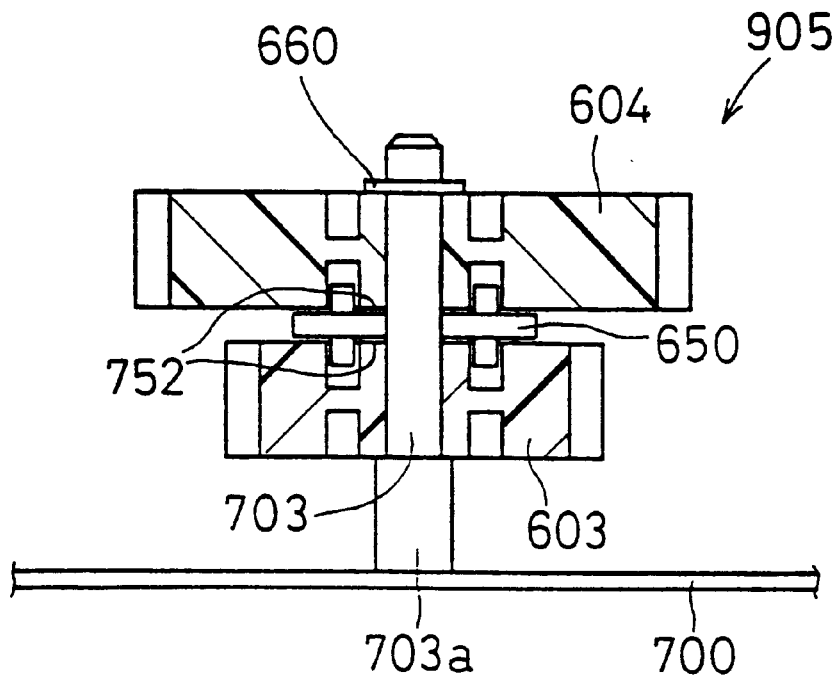
FIG. 56 is a section view showing a coupling structure of driving force transmitting members of still another embodiment of the invention.
Figures 57A, 57B:
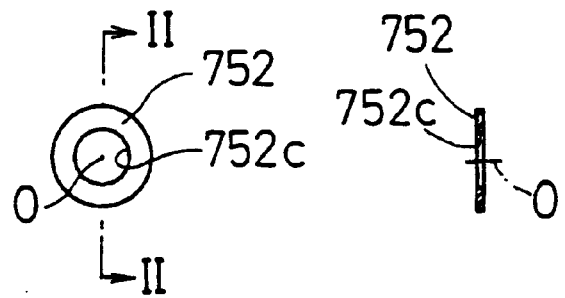
FIGS. 57A and 57B are views showing a space setting member 752 of still another embodiment of the invention, FIG. 57A being a front view, and FIG. 57B being a section view.

FIG. 56 is a section view showing an assembly 905 in which a coupling structure of driving force transmitting members of still another embodiment of the second group of the invention, FIG. 57A is a front view showing a space setting member 752 a composing the assembly 905, and FIG. 57B is a section view taken on section line II—II of FIG. 57A. This embodiment can exert the same effect as the embodiments shown in FIGS. 54 and 55. The space setting member 752 is an annular member provided with a bearing hole 752c into which the rotation axis 703 can be pierced. The outer diameter of the space setting member 752 is selected to be smaller than the inner diameter between the inner ends in the radial direction of the convex coupling portions 650b of the coupling member 650. The space setting members 752 are interposed between the respective gear members 603, 604 and the coupling member 650, in which status, the convex coupling portions 650b are fitted into the concave coupling portions 603a, 604a. This embodiment, in addition to the above-said effect, enables to easily manufacture the space setting member 752 because a configuration thereof is simple.

The embodiments shown in FIGS. 50–57 describe ones of setting a space between the gear members 603, 604 by using the coupling members 650, 651 and the space setting members 750–752. The space setting member 750 shown in FIG. 50 is hard to handle at the time of operating because it is small, and it requires the same number of operations as that of the concave coupling portions 603a, 603b. In the configurations of using the space setting members 751, 752 shown in FIGS. 55 and 57, it is necessary to interpose the space setting members 751, 752 between the gear members 603, 604, with the result that a lot of operations are required. An embodiment which solves such problems to enable precisely set spaces by using only driving force transmitting members and further simplify the operations, will be described below with reference to FIGS. 58–60.

FIG. 58 is a section view showing an assembly 906 which is formed by coupling in accordance with a coupling structure of driving force transmitting members of still another embodiment of the second group of the invention. FIG. 59A is a front view showing the gear member 603 composing the assembly 906, FIG. 59B is a section view of the gear member 603 taken on section line JJ—JJ of FIG. 58A, and FIG. 59C is a rear view of the gear member 603. FIG. 60A is a front view showing the gear member 604 composing the assembly 906, FIG. 60B is a section view of the gear member 604 taken on section line KK—KK of FIG. 60A, and FIG. 60C is a rear view of the gear member 604. The same reference numerals are given to portions corresponding to those of the above embodiments, and only different configurations will be described.

On both sides in the axial direction of the gear member 603 of the embodiment, concave coupling portions 603a1, 603a2, . . . 603an are spaced in the perimeter direction, respectively, which concave coupling portions whose depths from a side face of each side are different, and which are positioned so that the depth is increased toward one perimeter direction. The concave coupling portions 603a–603an are formed at two positions, respectively, and the concave coupling portions having the same depth are formed at positions which are displaced 180° in the perimeter direction. Further, on both sides in the axial direction of the gear member 604, concave coupling portions 604a1, 604a2, . . . 604an are formed, respectively, which concave coupling portions are identical to the concave coupling portions 603a1–603an of the gear member 603.

The respective concave coupling portions 603a1–603an; 604a1–604an are formed so that depths of concave coupling portions 603a1, 604a1 having the largest depths are selected to be larger than the projection height H21 of the convex coupling portion 650b of the coupling member 650, e.g., to be identical to the depth H22 of the concave coupling portions 601a–604a of the gear members shown in FIGS. 43–46, and the other concave coupling portions 603a2–603an; 604a2–604an are selected to be smaller than the projection height H21 of the convex coupling portion 650b of the coupling member 650 and the depths of the concave coupling portions 603an; 604an having the smallest depth are selected to be larger than the above-mentioned lower limit of engaging depth.

The gear members 603, 604 are coupled by selectively fitting the convex coupling portions 650b of the coupling member 650 into the concave coupling portions 603a1–603an; 604a1–604an of the gear members 603, 604. FIG. 58 shows that the convex coupling portions 650b of the coupling member 650 are fitted into the concave coupling portion 603an having the smallest depth of all the concave coupling portions 603a1–603an, and fitted into the concave coupling portion 604a1 having the largest depth of all the concave coupling portions 604a1–604an.

By thus providing the gear members 603, 604 with the concave coupling portions 603a1–603an; 604a1–604an having different depths and selectively fitting the convex coupling portions 650b of the coupling member 650 into the concave coupling portions 603a1–603an; 604a1–604an of the respective gear members 603, 604, it is possible to set multilevel spaces in accordance with the depth of selected one of the concave coupling portions 603a1–603an; 604a1–604an, between the gear members 603, 604. Furthermore, an extra space setting member is not needed, so that the assembling operation of the assembly 906 can be simplified.

Figures 61A, 61B, 61C:
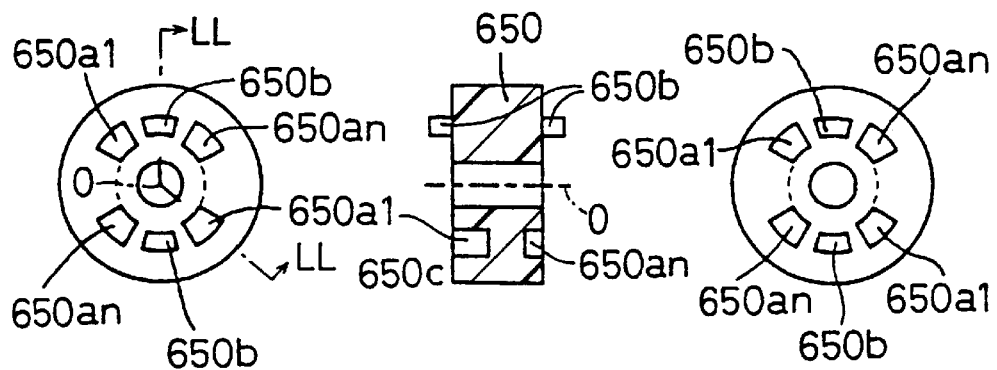
FIGS. 61A–61C are views showing a coupling member 650 of another embodiment, FIG. 61A being a front view, FIG. 61B being a section view, and FIG. 61C being a rear view.

While the embodiment of providing concave coupling portions having different depths with driving force transmitting members is described with reference to FIGS. 58–60, an embodiment of setting a mutual relation between driving force transmitting members by providing concave coupling portions having different depths with coupling members, will be described with reference to FIGS. 61A–61C. FIG. 61A is a front view showing the coupling member 650 of still another embodiment of the second group of the invention, FIG. 61B is a section view of the coupling member 650 taken on section line LL—LL of FIG. 61A, and FIG. 61C is a rear view of the coupling member 650. The same reference numerals are given to portions corresponding to those of the above embodiments, and only different configurations will be described.

On both sides in the axial line direction of the coupling member 650, the convex coupling portions 650b are formed, and the concave coupling portions 650a1, 650a2, . . . 650an are formed so as to be off the convex coupling portions 650b, respectively. The respective concave coupling portions 650a1–650an are formed so that a depth of the concave coupling portion 650a1 having the largest depth is selected to be larger than the projection height H21 of the convex coupling portion 650b of the coupling member 650, e.g., to be identical to the depth H22 of the concave coupling portions 601a–604a of the respective gear members shown in FIGS. 43–46, and the other concave coupling portions 650a2–650an are selected to be smaller than the projection height H21 of the convex coupling portion 650b of the coupling member 650, and the depth of concave coupling portion 650an having the smallest depth is selected to be larger than the above-mentioned lower limit of engaging depth.

A plurality of coupling members 650 are disposed between the gear members 603, 604, and the respective coupling members 650 are coupled by selectively fitting the convex coupling portions 650b into the respective concave coupling portions 650a1–650an. When using a plurality of coupling members 650 and coupling with each other, by forming the concave coupling portions 650a1–650an having different depths and selectively fitting the convex coupling portions 650b into the concave coupling portions 650a1–650an, it is possible to select spaces in the axial line direction in the whole coupling members which are coupled, to be multilevel, in accordance with the depth of selected one of the concave coupling portions 650a1–650an, and it is possible to set multilevel spaces between the gear members 603, 604. Furthermore, an extra space setting member is not needed, so that the assembling operation of the assembly 906 can be simplified.

Next, an embodiment of disposing both a concave coupling portion for a close fit and a concave coupling portion for a clearance fit and selecting the concave coupling portion in accordance with the usage at the time of coupling driving force transmitting members by coupling members, will be described with reference to FIGS. 62A–62C and 63A–63C.

Figures 62A, 62B, 62C:
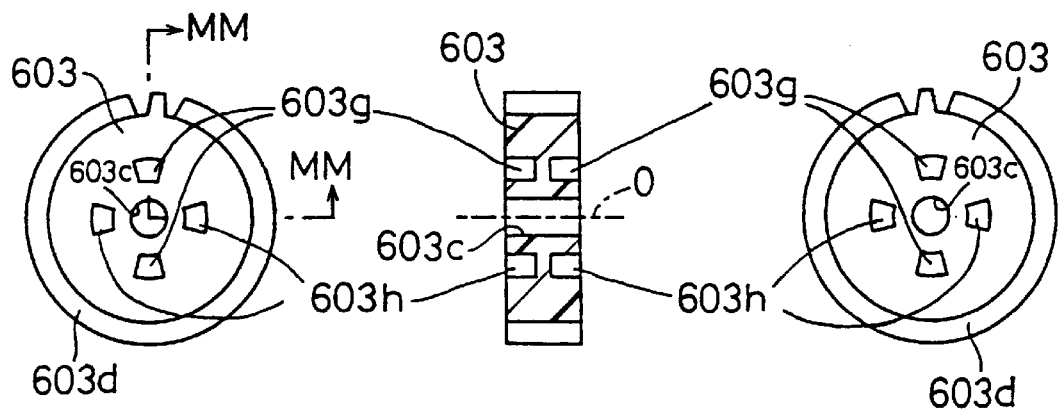
FIGS. 62A–62C are views showing a gear member 603 of still another embodiment, FIG. 62A being a front view, FIG. 62B being a section view, and FIG. 62C being a rear view.

FIG. 62A is a front view showing the gear member 603 of still another embodiment of the second group of the invention, FIG. 62B is a section view of the gear member 603 taken on section line MM—MM of FIG. 62A, and FIG. 62C is a rear view of the gear member 603. FIG. 63A is a front view showing the gear member 604 to be coupled with the gear member 603 shown in FIGS. 62A–62C, FIG. 63B is a section view of the gear member 604 taken on section line NN—NN of FIG. 63A, and FIG. 63C is a rear view of the gear member 604. The same reference numerals are given to portions corresponding to those of the above embodiments, and only different configurations will be described.

The gear members 603, 604 are provided with concave coupling portions 603g, 603h; 604g, 604h, on both sides in the axial line direction, respectively. These gear members 603, 604 are coupled by selectively fitting the convex coupling portions 650b into the concave coupling portions 603g, 603h; 604g, 604h by the coupling member 650 which is provided with the convex coupling portions 650b on both sides in the axial line direction. The concave coupling portions 603g, 604g are formed so that the convex coupling portions 650b of the coupling member 650 are fitted thereinto in a status of close fits, and the concave coupling portions 603h, 604h are formed so that the convex coupling portions 650b of the coupling member 650 are fitted thereinto in a status of clearance fits.

In a case where the respective driving force transmitting members 603, 604 are disposed so as to rotate together with a rotation axis, the convex coupling portions 650b are fitted into the concave coupling portions 603g, 604g to be close fits. In a case where the respective driving force transmitting members 603, 604 are disposed so as to rotate about a rotation axis, the convex coupling portions 650b are fitted into the concave coupling portions 603h, 604h to be clearance fits. Thus, when the respective gear members 603, 604 are disposed so as to rotate together with a rotation axis, it is possible to prevent a noise from occurring because there is a play, and when the respective gear members 603, 604 are disposed so as to rotate about a rotation axis, it is possible to reduce an unnecessary load which is given between the gear members 603, 604. Accordingly, it is possible to use in accordance with the usage and to enhance the flexibility of a combination of driving force transmitting members.

Figure 64:
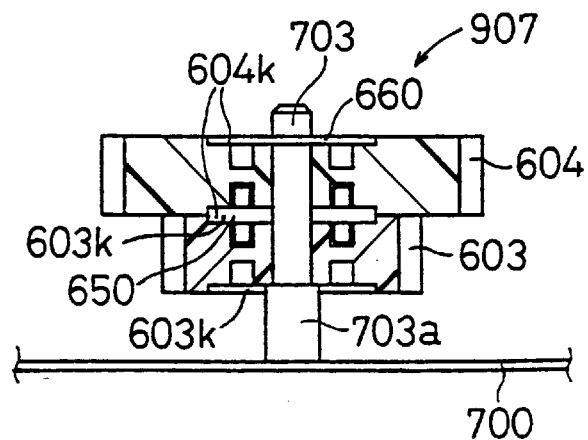
FIG. 64 is a section view showing a coupling structure of driving force transmitting members of still another embodiment of the invention.
Figure 65:
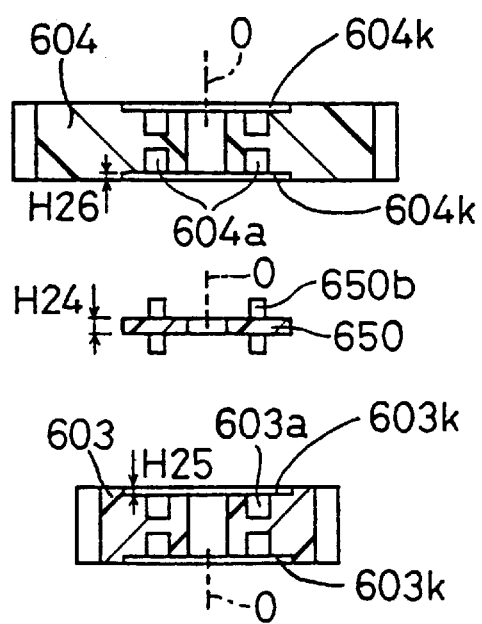
FIG. 65 is an exploded section view showing the gear members 603 and 604 and the coupling member 650.

According to the embodiments shown in FIGS. 42–63, the coupling member 650 is interposed between the gear members 603, 604, so that a space in accordance with a thickness of the coupling member 650 will be set between the respective gear members 603, 604 in the axial line direction. An embodiment which can be preferably implemented in a case where it is desired to avoid the above problem for design, will be described with reference to FIGS. 64 and 65. FIG. 64 is a section view showing an assembly 907 of still another embodiment of the second group of the invention, and FIG. 65 is an exploded section view showing the gear members 603, 604 and the coupling member 650 which compose the assembly 907. The same reference numerals are given to portions corresponding to those of the above embodiments, and only different configurations will be described.

The respective gear members 603, 604 are provided with fitting portions 603k, 604k into which the coupling member 650 is fitted, on both sides in the axial line direction. Depths H25, H26 of the respective fitting portions 603k, 604k are selected to be equal, and the sum of the depths H25, H26 of the fitting portions 603k, 604k is selected to be slightly larger than a thickness H24 of the coupling member 650 which excludes the convex coupling portion 650b. Thus, in a status that the gear members 603, 604 are coupled by the coupling member 650, the coupling member is fitted and stored into the fitting portions 603k, 604k, with the result that the gear members 603, 604 can be disposed so as to come into contact with each other while no space is formed between the gear members 603, 604.

As another embodiment of the invention, the depths H25, H26 of the fitting portions 603k, 604k formed on the gear members 603, 604 may be different from each other. The fitting portions may be formed on only one of the gear members 603, 604. In either case, it is possible to exert the same effect as the embodiments shown in FIGS. 64 and 65.

Figure 66A:
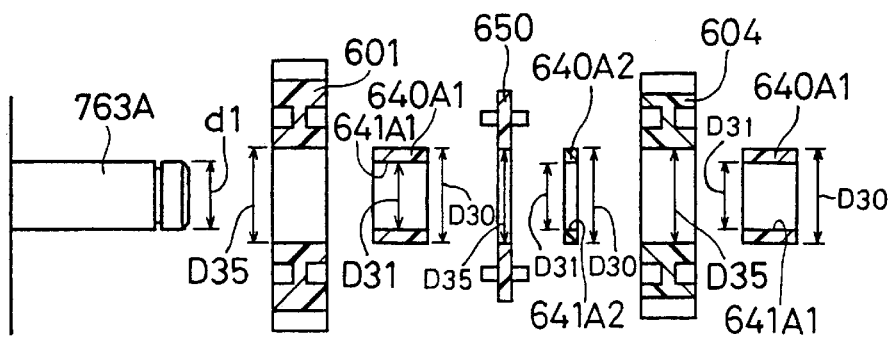
FIGS. 66A–66C are exploded section views showing a coupling structure of driving force transmitting members of still another embodiment of the invention, FIG. 66A being a coupling structure using bearings 640A1 and 640A2, FIG. 66B being a coupling structure using bearings 640B1 and 640B2, and FIG. 66C being a coupling structure using bearings 640C1 and 640C2.
Figure 66B:
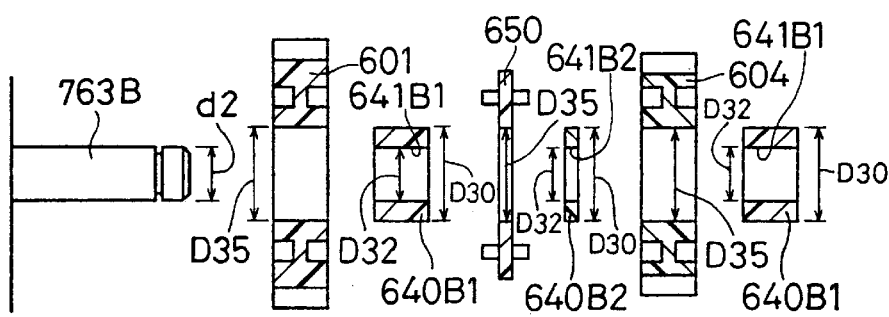
Figure 66C:
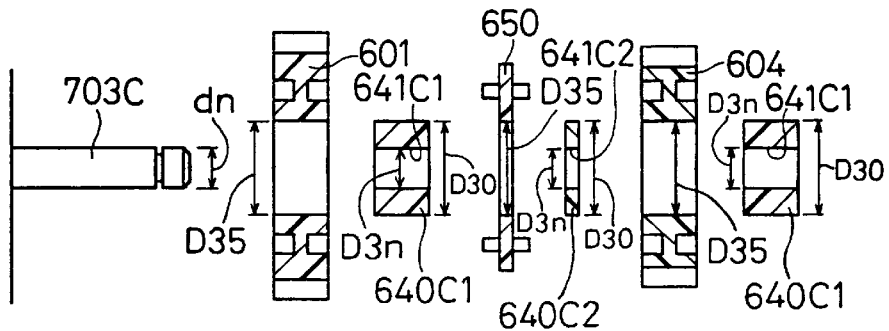

FIG. 66A is an exploded section view showing an assembly 908A of still another embodiment of the second group of the invention, FIG. 66B is an exploded section view showing an assembly 908B of still another embodiment of the second group of the invention, and FIG. 66C is an exploded section view showing an assembly 908C of still another embodiment of the second group of the invention. In FIGS. 66A–66C, rotation axes 703A, 703B, 703C have different outer diameters from each other.

Such an embodiment will be described with reference to FIG. 66 that even when axial diameters d1, d2, dn of a plurality of rotation axes 703A, 703B, 703C are different from each other, the same gear members 601–604 can be used. In an apparatus such as a copying machine, a transmitted driving force is within a predetermined range, excluding a specific case. On the basis of this, as shown in FIGS. 66A–66C, the rotation axes 703A–703C for supporting the gear members 601–604, which may be used in common, are set to have the axial diameters d1–dn within the predetermined range. Bearings 640A1, 640A2; 640B1, 640B2; 640C1, 640C2 (which may be referred to as the bearings 640 when used as a generic term) are disposed, which have inner diameters D31, D32, D3n so that the rotation axes 703A–703C having the predetermined axial diameters d1–dn can be pierced thereinto and which have a uniform outer diameter D30, and the fitting holes 601c–604c are selected to have the same inner diameter D35 so that the bearings 640 are fitted into the fitting holes 601c–604c of the gear members 601–604 (only the gear members 601, 604 are shown in FIGS. 66A–66C) as close fits.

Further, since the close fits do not act properly when the thickness of the bearings 640 is too thin, an outer diameter D30 of the bearings 640 is determined so that the thickness of the bearings 640 becomes larger than a predetermined thickness. The concave coupling portions 601a–604a of the gear members 601–604 and the convex coupling portions 650b of the coupling member 650 are formed so as to locate between the teeth portions 601d–604d and the fitting holes 601c–604c.

By piercing the rotation axes 703A–703C into axial holes 641A1, 641A2; 641B1, 641B2; 641C1, 641C2 of the bearings 640 by using such bearings 640, it is possible to rotatably support the respective gear members 601–604 and to support the same gear members 601–604 by using the rotation axes 703A–703C having different diameters. Therefore, there is no need to form a gear member having the same teeth portion, e.g., the gear member 603 having the teeth portion 603c, for each of the rotation axes 703A–703C having different outer diameters, corresponding to the outer diameters d1–dn thereof, whereby it is possible to reduce the variety of the gear members 601–604 to be formed regardless of the variety of the rotation axes having different diameters. In this case, since the shape of the bearings 640 is simple and the size thereof is small, even when the bearings 640 are formed by resin molding, the cost is lower than the molds of the gear members, and since the variety of the whole molds is decreased, the manufacturing cost is reduced.

In the respective embodiments of the second group of the invention shown in FIGS. 42–66, a configuration such that driving force transmitting members having different effective diameters can be also coupled, is described, but in order to couple the driving force transmitting members having different effective diameters by using common concave coupling portions and convex coupling portions, the concave coupling portions and the convex coupling portions may be formed in regions whose radius is located between the axial line of a driving force transmitting member having the smallest effective diameter and the perimeter portion. Thus, regardless of the effective diameters of driving force transmitting members, it is possible to provide common concave coupling portions or convex coupling portions with all driving force transmitting members, and it is possible to provide common concave coupling portions or convex coupling portions with a coupling member. Therefore, it is possible to couple all driving force transmitting members.

Further, in order to supply a strength which is necessary for transmitting a driving force, to a complex-type driving force transmitting part which is constructed by using driving force transmitting members, the shapes of the concave coupling portions and the convex coupling portions may be determined based on a force given to the convex coupling portions at the time of transmitting a driving force. Thus, the concave coupling portions and the convex coupling portions are not formed to be unnecessarily large, and an enough strength to transmit a driving force is given to the convex coupling portions. In addition, the concave coupling portions and the convex coupling portions, especially the convex coupling portions, may be formed into a shape which is elongated in the perimeter direction. Thus, it is possible to decrease an area of a section of the convex coupling portion which is perpendicular to the axial line direction, and increase the strength with respect to the force given at the time of transmitting a driving force.

Furthermore, in order to realize all combinations of the driving force transmitting members in a status that an enough mechanical strength to transmitting a driving force is given thereto, in a case where in the driving force transmitting members to be coupled, distances from the axial lines to the driving force transmission acting portions, e.g., to the teeth portions of the gear members, are largely different from each other, a large torque must be transmitted between the respective driving force transmitting members. A torque which must be transmitted by the respective transmitting members in this case, is common. Considering this point, and assuming the largest torque which is generated at the time of coupling a driving force transmitting member having the largest effective diameter and a driving force transmitting member having the smallest effective diameter, the shape and size of the concave coupling portions and the convex coupling portions may be determined to be a shape and size which enable to transmitting the largest torque. Thus, even when the driving force transmitting members are coupled in any combination, the convex coupling portions have a sufficient strength.

Furthermore, an embodiment will be described with reference to FIG. 67, which enhances the reliability so as to prevent a problem from occurring such that: in a configuration where the driving force transmitting members whose effective diameters are largely different are coupled and a large force is applied to the concave coupling portions and the convex coupling portions, the convex coupling portions are broken, or the driving force transmitting members affect the driving force transmission acting portions because a portion between the concave coupling portion or the convex coupling portion and the driving force transmission acting portion is distorted, whereby a driving force cannot be properly transmitted.

Figure 67:
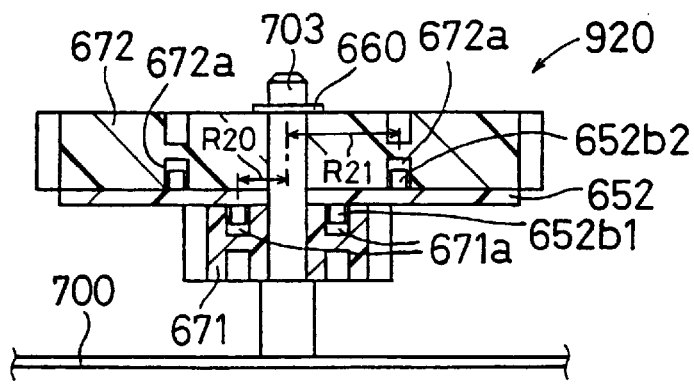
FIG. 67 is a section view showing a coupling structure of driving force transmitting members of still another embodiment of the invention.
Figure 68:
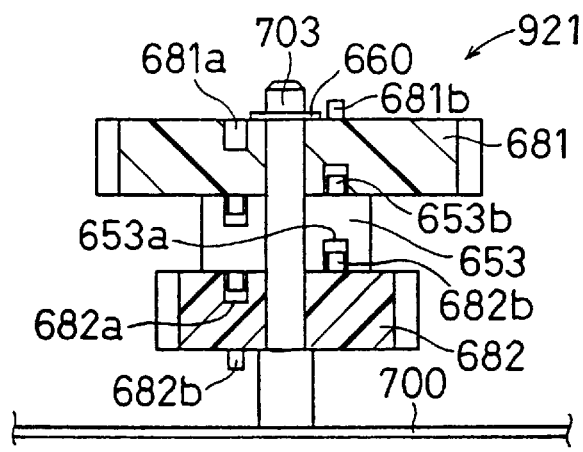
FIG. 68 is a section view showing a coupling structure of driving force transmitting members of still another embodiment of the invention.

FIG. 67 is a section view showing an assembly 920 of still further embodiment of the second group of the invention. The same reference numerals are given to portions which correspond to those of the above embodiments, and only different configurations will be described. The gear members 671, 672 are provided with concave coupling portions 671a, 672a on both sides in the axial direction, respectively. The respective concave coupling portions 671a, 672a have almost the same configuration as the concave coupling portions 601a–604a of the gear members 601–604, also formed at two positions with the phases shifted by 180° in the perimeter direction.

The concave coupling portion 671a of the gear member 671 having a smaller effective diameter is formed at a distance R20 from the axial line O between a bearing hole 671c into which the rotation axis 703 is pierced and a teeth portion 671d. The concave coupling portion 672a of the gear member 672 having a larger effective diameter is formed at a distance R21 from the axial line O between a bearing hole 672c into which the rotation axis 703 is pierced and a teeth portion 672d. The distance R21 from the axial line to the concave coupling portion 672a on the gear member 672 having a larger diameter is selected to be larger than the distance R20 from the axial line to the concave coupling portion 671a on the gear member 671 having a smaller effective diameter.

On both sides in the axial line direction of a coupling member 652, convex coupling portions 652b1, 652b2 are formed at two positions with the phases shifted by 180° in the perimeter direction, respectively. The concave coupling portion 652b1 on one side in the axial line direction is formed at the distance R20 from the axial line O so as to be fitted into the concave coupling portion 671a of the gear member 671 having a smaller effective diameter. The concave coupling portion 652b2 on the other side in the axial line direction is formed at the distance R21 from the axial line O so as to be fitted into the concave coupling portion 672a of the gear member 672 having a larger effective diameter.

The gear members 671, 672 are coupled via the coupling member 652, when the convex coupling portions 652b1 on one side in the axial line direction of the coupling member 652 are fitted into the concave coupling portions 671a of the gear member 671 and the convex coupling portions 652b2 on the other side in the axial line direction of the coupling member 652 are fitted into the concave coupling portions 672a of the gear member 672. As a result, driving force transmitting members provided with concave coupling portions or convex coupling portions, in the embodiment, concave coupling portions, at different positions in the radial direction, can be coupled via a coupling member. In addition, a driving force transmitting member having a larger effective diameter is provided with concave coupling portions or convex coupling portions, in the embodiment, concave coupling portions at larger distances from an axial line, whereby at least the concave coupling portions or the convex coupling portions, in the embodiment, the concave coupling portions of the driving force transmitting member having a larger effective diameter, can be protected from a large force. As a result, at least the convex coupling portions of the driving force transmitting member having a larger effective diameter, or the convex coupling portions of the coupling member which are fitted into the concave coupling portions of the said driving force transmitting member, can be made to resist damage. Further, according to such a configuration, in a driving force transmitting member having a larger effective diameter, it is possible to decrease a distance between a driving force transmission acting portion, in the embodiment, the teeth portion, and a concave coupling portion or a convex coupling portion, in the embodiment, the concave coupling portion, and to avoid a problem such that: the driving force transmitting member is distorted between the concave coupling portion or the convex coupling portion and the driving force transmission acting portion to affect the driving force transmission acting portion, with the result that a driving force cannot be transmitted appropriately.

Various embodiments of the second group of the invention are illustrated above with reference to FIGS. 42–67, but the second group of the invention is not restricted to the above embodiments. For instance, as shown in an assembly 921 of another embodiment of FIG. 68, gear members 681, 682 which serve as driving force transmitting members may be provided with concave coupling portions 681a, 682a and convex coupling portions 681b, 682b on both sides in the axial line direction, respectively, and a coupling member 653 may be provided with concave coupling portions 653a and convex coupling portions 653b on both sides in the axial line direction, respectively. In such a configuration, the concave coupling portions and the convex coupling portions may be alternately formed with the phases shifted by 90° in the perimeter direction, for example. As well as the above embodiments, this configuration makes it possible to: couple the gear members 681, 682 by the concave coupling portions 681a, 682a; 653a and the convex coupling portions 681b, 682b; 653b, via the coupling member 653 so as to transmit a driving force; and set a space between the gear members 681, 682 by using the above-mentioned space setting member in accordance with the thickness of the coupling member 653.

Figure 69:
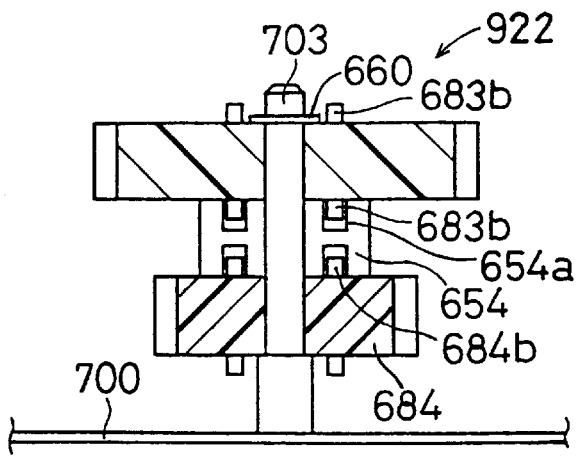
FIG. 69 is a section view showing a coupling structure of driving force transmitting members of still another embodiment of the invention.

Further, as shown in an assembly 922 of another embodiment of FIG. 69, gear members 683, 684 which serve as driving force transmitting members may be provided with convex coupling portions 683b, 684b on both sides in the axial line direction, respectively, and a coupling member 654 may be provided with concave coupling portions 654a on both sides in the axial line direction, respectively. In such a configuration, the concave coupling portions and the convex coupling portions may be alternately formed with the phases shifted by 90°, for example. As well as the above embodiments, this configuration makes it possible to: couple the gear members 683, 684 by the concave coupling portions 683a, 684a; 654a and the convex coupling portions 683b, 684b; 654b, via the coupling member 654 so as to transmit a driving force; and set a space between the gear members 683, 684 by using the above-mentioned space setting member in accordance with the thickness of the coupling member 654.

Furthermore, the second group of the invention includes the following configurations.

(1) A rotation axis serving as a rotation supporting member of a driving force transmitting member may be molded in one piece with a driving frame made of a resin, or a rotation supporting member made of a metal may be fixed to a driving frame made of a plate metal by crimping so as to be one piece.

(2) A driving force transmitting member may be a gear member, a pulley member on which a timing belt is stretched, a friction wheel or the like.

(3) A combination of two driving force transmitting members which are placed adjacent to each other on the same axial line of a rotation supporting member, may be driving force transmitting members which have the same driving force transmission acting portions, e.g., a gear member and a gear member, or may be driving force transmitting members which have different driving force transmission acting portions, e.g., a gear member and a pulley member.

(4) The shape of a section in a direction perpendicular to the axial line of a convex coupling portion is not required to be almost the same as the shape of a section in a direction perpendicular to the axial line of a concave coupling portion.

(5) In a configuration that the shape of a concave coupling portion is different from that of a convex coupling portion, as shown in a front view FIG. 70A, a section view FIG. 70B taken on section line PP—PP of FIG. 70A and a rear view FIG. 70C, and in a front view 71A, a section view taken on section line QQ—QQ of FIG. 71A and a rear view FIG. 71C, for example, gear members 690, 691 serving as driving force transmitting members may use as concave coupling portions 690*a*, 691*a*, concave portions between strengthening ribs 690*e*, 691*e* disposed so as to couple bearing holes 690*c*, 691*c* and teeth portions 690*d*, 691*d*. Also in such a configuration, gear members can be coupled by a coupling member.

(6) Further, although the above embodiments mainly describe a configuration of fitting the convex coupling portions into the concave coupling portions at two positions, the convex coupling portions may be fitted into the concave coupling portions at three or more positions or at one position.

(7) The convex coupling portion and the concave coupling portion may be positioned with the phases shifted in any way in the perimeter direction.

(8) The height of the convex coupling portion may be larger than the depth of the concave coupling portion.

(9) A configuration has been described such that a driving force transmitting member has either a concave coupling portion or a convex coupling portion, and a coupling member has either a convex coupling portion which can be fitted into a concave coupling portion of the driving force transmitting member or a concave coupling portion into which a convex coupling portion can be fitted of the driving force transmitting member, but a driving force transmitting member and a coupling member may have both a concave coupling portion and a convex coupling portion on either side in the axial line direction, respectively.

(10) Design parameters for determining a driving force transmission acting portion of a driving force transmitting member, which are the number of teeth, a module, the width of teeth and a material in the case of a gear member, are not specified, but driving force transmitting members having different design parameters or driving force transmitting members having the same design parameters may be coupled so as to be adjacent to each other on the same axial line.

(11) Both when a driving force transmitting member is fixed so as to rotate about a rotation supporting axis, and when a driving force transmitting member is fixed onto a rotation supporting member by a fixing pin or the like so as to integrally rotate, the invention can be applied.

Although various embodiments of the invention are illustrated above, when the above embodiments are implemented independently or in combination, it is possible to cause a driving force to be transmittable between driving force transmitting members adjacent to each other on the same axial line while further reducing the variety of driving force transmitting members whose molds are costly, and it is possible to use a driving force transmitting member independently.

The space setting members of the first group of the invention shown in FIGS. 27–35 and 37 and the coupling members of the second group of the invention have a common function.

Next, a third group of the invention will be described. In the above description regarding the second group, an embodiment of coupling driving force transmitting members which have largely different effective diameters, by using a coupling member so as to transmit a driving force, is described with reference to FIG. 67, but it is possible to couple driving force transmitting members which have different effective diameters by themselves, without using a coupling member. This will be described with reference to FIGS. 72A–74C.

Figures 74A, 74B, 74C:
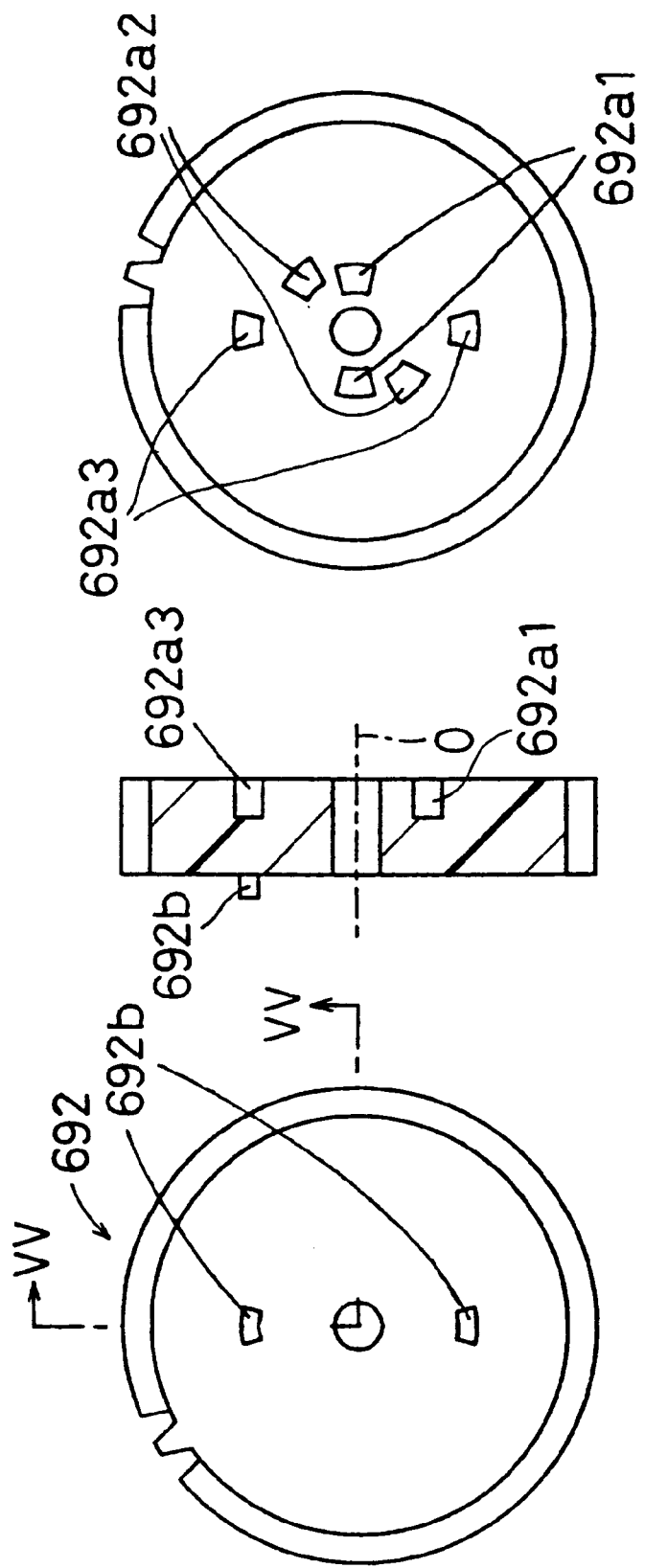
FIGS. 74A–74C are views showing a gear member 692 of still another embodiment, FIG. 74A being a front view, FIG. 74B being a section view, and FIG. 74C being a rear view.

FIG. 72A is a front view showing a gear member 690 which is a driving force transmitting member of an embodiment of the third group of the invention, FIG. 72B is a section view of the gear member 690 taken on section line RR—RR of FIG. 72A, and FIG. 72C is a rear view of the gear member 690. FIG. 73A is a front view showing a gear member 691 which can be coupled with the gear member 690, FIG. 73B is a section view of the gear member 691 taken on section line TT—TT of FIG. 73A, and FIG. 73C is a rear view of the gear member 691. FIG. 74A is a front view showing a gear member 692 which can be coupled with the respective gear members 690, 691, FIG. 74B is a section view of the gear member 692 taken on section line UU—UU of FIG. 74A, and FIG. 74C is a rear view of the gear member 692. In this embodiment, as mentioned above, three kinds of gear members 690–692 which transmit a driving force by meshing a teeth portion on a perimeter with another member, will be taken as examples of driving force transmitting members.

The gear member 690 having the smallest effective diameter is provided with: a concave coupling portion 690*a* which is concave from a portion residue toward the other side in the axial line direction, on one side in the axial line direction; and a convex coupling portion 690*b* which is projected from a portion reside in a direction away from the one side in the axial direction, on the other side in the axial direction which is opposite to the one side in the axial direction where the concave coupling portion 690*a* is formed. The concave coupling portion 690*a* and the convex coupling portion 690*b* are formed into a fittable shape, and positioned at the same distance with respect to the axial line.

The gear member 691 having a medium diameter which is larger than the effective diameter of the gear member 690 having a small diameter, is provided with concave coupling portions 691a1, 691a2 which are concave from a portion residue toward the other side in the axial line direction, on one side in the axial line direction, the concave coupling portions 691a1, 691a2 being formed at different distances from the axial line. The concave coupling portion 691a1 is formed at the same distance from the axial line as the concave coupling portion 690a and the convex coupling portion 690b of the gear member 690 having a small diameter, and the concave coupling portion 691a2 is formed at a larger distance from the axial line than the concave coupling portion 691a1. Further, the gear member 691 is provided with a convex coupling portion 691b which is projected from a portion residue in a direction away from the one side in the axial line direction, on the other side in the axial line direction which is opposite to the one side in the axial line direction where the concave coupling portions 691a1, 692a2 are formed. The concave coupling portion 691a2 and the convex coupling portion 691b are formed into a fittable shape, and positioned at the same distance with respect to the axial line.

The gear member 692 having a large diameter which is larger than the effective diameter of the gear member 691 having a medium diameter, is provided with concave coupling portions 692a1, 692a2, 692a3 which are concave from a portion residue toward the other side in the axial line direction, on one side in the axial line direction, the concave coupling portions 692a1–692a3 being formed at different distances from the axial line. The concave coupling portion 692a1 is formed at the same distance from the axial line as the concave coupling portion 690a and the convex coupling portion 690b of the gear member 690 having a small diameter, the concave coupling portion 692a2 is formed at the same distance from the axial line as the concave coupling portion 691a2 and the convex coupling portion 691b of the gear member 691 having a medium diameter, and the concave coupling portion 692a3 is formed at a larger distance from the axial line than the concave coupling portion 692a2. Further, the gear member 692 is provided with a convex coupling portion 692b which is projected from a portion residue in a direction away from the one side in the axial line direction, on the other side in the axial line direction which is opposite to the one side in the axial line direction where the concave coupling portions 692a1–692a3 are formed. The concave coupling portion 692a3 and the convex coupling portion 692b are formed into a fittable shape, and positioned at the same distance with respect to the axial line.

A height H41 of the respective convex coupling portions 690b–692b is set to be smaller than a depth H42 of the respective concave coupling portions 690a; 691a1, 691a2; 692a1–692a3 (H41<H42). Further, the convex coupling portions 690b are formed so as to be stably fitted into the respective concave coupling portions 690a, 691a1, 692a1 without largely rattling, and so as to smoothly conduct the fitting and detaching operations. The convex coupling portions 691b are formed so as to be stably fitted into the respective concave coupling portions 691a2, 692a2 without largely rattling, and so as to smoothly conduct fitting and detaching operations. The convex coupling portions 692b are formed so as to be stably fitted into the concave coupling portions 692a3 without largely rattling and so as to smoothly conduct the fitting and detaching operations.

The respective concave coupling portions 690a; 691a1, 691a2; 692a1, 692a2 and the respective convex coupling portions 690b–692b are formed at two positions for each 180° in the perimeter direction, between the bearing holes 690c–692c formed so as to pass through the center portions of the gear members 690–692 and the teeth portions 690d–692d serving as driving force transmission acting portions, as mentioned above.

According to such configurations, the gear members 690–692 can be selectively used and coupled by the concave coupling portions 690a; 691a1, 691a2; 692a1, 692a2 and the convex coupling portions 690b–692b, so as to transmit a driving force and so as to be attachable/detachable in the axial line direction. Therefore, in a configuration without using a coupling member, by using a few kinds of driving force transmitting members, it is possible to fabricate a lot of complex-type driving force transmitting parts, reduce the cost for molds, and exert the same effect as the embodiment shown in FIG. 67.

Next, a fourth group of the invention will be described with reference to FIGS. 75–85. In a configuration of setting a space between driving force transmitting members by using the space setting members 106, 130, 131; 750–752 in the configurations of the inventions of the above-mentioned groups, the smallest engaging depth is determined corresponding to the number of coupling members disposed in the perimeter direction of the driving force transmitting members, so that the smallest setting amount of a mutual position between the driving force transmitting members and the number of setting stages are determined. When the smallest amount which can set a mutual position between the driving force transmitting members is decreased and the number of setting stages is increased, there is a fear of bringing a disadvantage for the strength of the driving force transmitting members and bringing a malfunction such as a decrease of the accuracy in size of the driving force transmission acting portions occur, which is likely to occur particularly when a concave coupling portion or a convex coupling portion is formed near a bearing hole.

Figure 75:
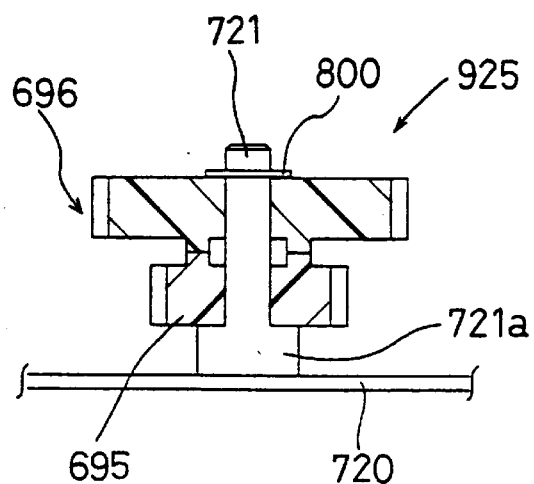
FIG. 75 is a section view showing a coupling member of still another embodiment of the invention.
Figure 76A:
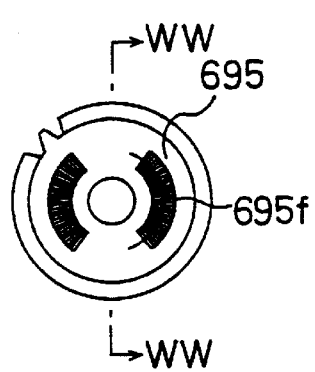
FIGS. 76A–76C are views showing a gear member 695 of still another embodiment, FIG. 76A being a front view, FIG. 76B being a section view, and FIG. 76C being a rear view.
Figure 76B:
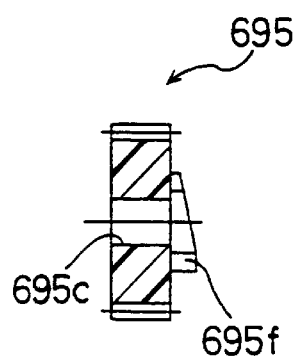
Figure 76C:
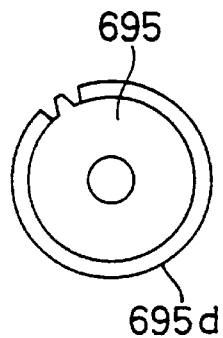
Figure 77A:
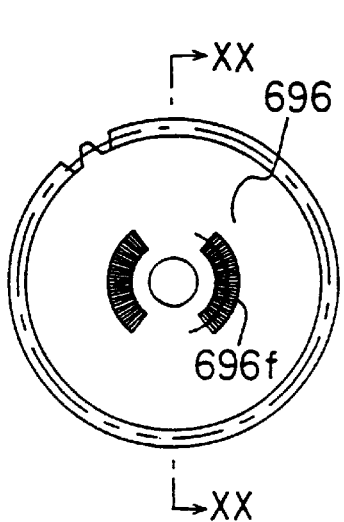
FIGS. 77A–77C are views showing a gear member 696 of still another embodiment, FIG. 77A being a front view, FIG. 77B being a section view, and FIG. 77C being a rear view.
Figure 77B:
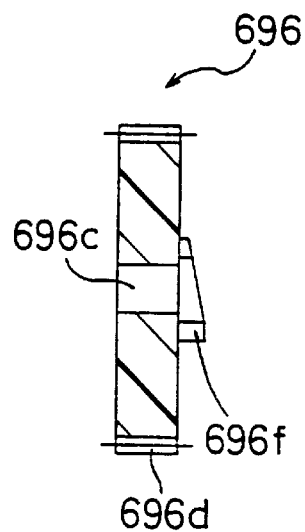
Figure 77C:
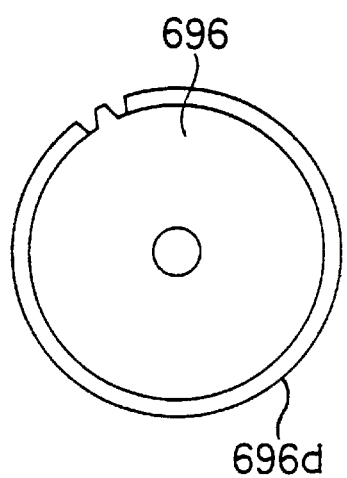
Figure 78:
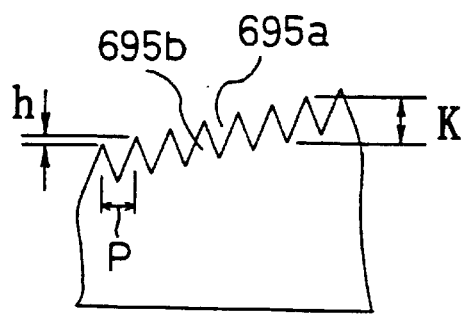
FIG. 78 is an enlarged view showing engaging means 695f.

In order to solve such problems, the fourth group of the invention is preferably implemented. FIG. 75 is a section view showing an assembly 925 in which a coupling structure of driving force transmitting members of an embodiment of the fourth group of the invention is implemented. FIG. 76A is a front view showing a gear member 695 serving as a driving force transmitting member which composes the assembly 925, FIG. 76B is a section view of the gear member 695 taken on section line WW—WW of FIG. 76A, and FIG. 76C is a rear view of the gear member 695. FIG. 77A is a front view showing a gear member 696 which composes the assembly 925, FIG. 77B is a section view of the gear member 697 taken on section line XX—XX of FIG. 77A, and FIG. 77C is a rear view of the gear 696. In this embodiment, as mentioned above, two kinds of gear members 695, 696 which transmit a driving force by meshing teeth portions on the perimeters with other members, are taken as examples of driving force transmitting members.

Figure 79:
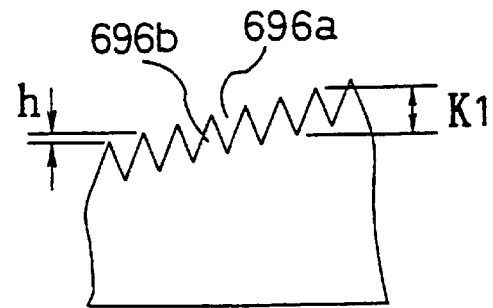
FIG. 79 is an enlarged view showing engaging means 696f.

The gear member 695 is provided with engaging means 695f on one side in the axial line direction. The engaging means 695f are formed at two positions for each 180° in the perimeter direction. On the engaging means 695f, as shown and enlarged in FIG. 78, a plurality of concave portions 695a and a plurality projections 695b are alternately formed to be adjacent to each other and spaced uniformly in the perimeter direction. The respective concave portions 695a are V-shaped concave portions, and the respective projections 695b between the respective concave portions 695a are inverted-V-shaped projections. The respective concave portions 695a and the respective projections 695b are formed so as to have an engaging margin width K1, and have a difference h while deviated from each other at a preset distance in the axial line direction, i.e., for one pitch p, as shifted by a preset distance in the perimeter direction. The gear member 696, as well as the gear member 695, is provided with engaging means 696f on one side in the axial line direction, and the engaging means 696f, as enlarged and shown in FIG. 79, is provided with the same concave portions 696a and convex portions 696b. The respective engaging means 695f, 696f are formed between bearing holes 695c, 696c into which a rotation axis is pierced and teeth portions 695d, 696d which will be mentioned later.

The respective gear members 695, 696 are coupled by engaging the respective engaging means 695f, 696f so that the respective projections 696b are fitted into the respective concave portions 695a and the respective projections 695b are fitted into the respective concave portions 696a, whereby the assembly 925 can be constructed. It is possible to couple the respective driving force transmitting members by forming such engaging means on the respective driving force transmitting members including another driving force transmitting member which is not shown, and it is possible to construct a lot of complex-type driving force transmitting parts by using a few kinds of driving force transmitting members, so that it is possible to exert the same effect as the above groups of the invention. Further, it is possible to arbitrarily select and set a space between the respective gear members 695, 696 by selecting the concave portions 695a, 696b into which the respective projections 695b, 696b are fitted, that is, by selecting mutual positions about the axial line, of the respective gear members 695, 696.

As shown in FIG. 75, a rotation axis 721 serving as a rotation supporting member is fixed and erected on a frame 720 to be one piece. The rotation axis 721 is pierced into the respective gear members 695, 696, whereby the respective gear members 695, 696, i.e., the assembly 925 is rotatably supported. In this status, the assembly 925 is supported and prevented from being displaced by a boss portion 721a of the rotation axis 721, on one side in the axial line direction, and prevented from displaced by a displacement blocking member 800 made of an E ring or the like which is attached to the rotation axis 721, on the other side in the axial line direction. In this case, when providing a play at a space between the displacement preventing member 800 and the boss portion 721a of the rotation axis 721, it is necessary to make the play smaller than a size obtained by subtracting the difference h from the engaging margin width K. The number of the concave portions 695a, 696a and the projections 695b, 696b which are engaged in the engaging margin width K may be determined in accordance with a torque produced at the time of transmitting a driving force.

Figure 80:
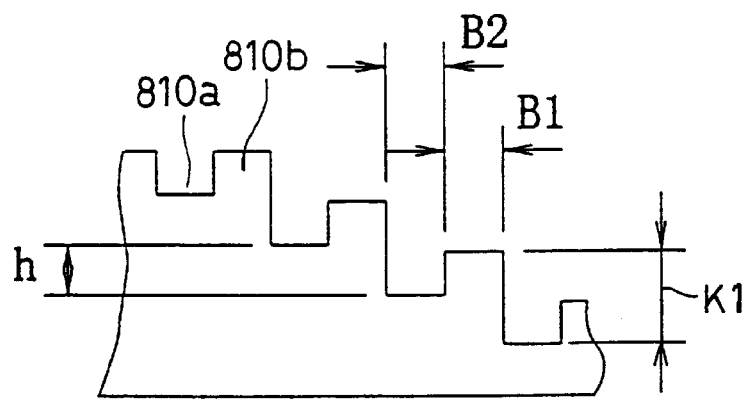
FIG. 80 is an enlarged view showing engaging means of another embodiment.

There is no need that the concave portions and the projections are V-shaped. In another embodiment, as shown in FIG. 80, each concave portion 810a and each projection 810b may be formed into a rectangle so as to have an engaging margin width K1 and a difference h. In this case, a width B2 of the concave portion 810a is selected to be larger than a width B1 of the projection 810b. When it is desired to reduce a play in the rotating direction, the width B2 may be selected to be quite a little larger than the width B1.

Figure 81:
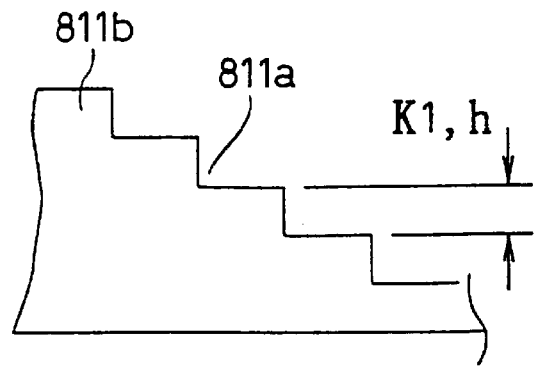
FIG. 81 is an enlarged view showing engaging means of still another embodiment.
Figure 84:
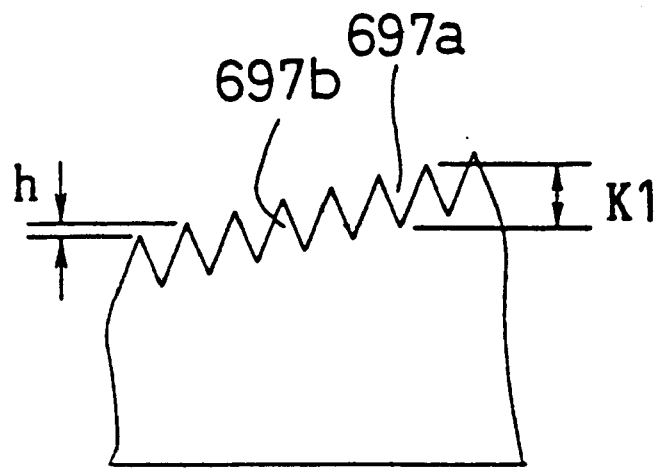
FIG. 84 is an enlarged view showing engaging means 697f and 697g.
Figure 85:
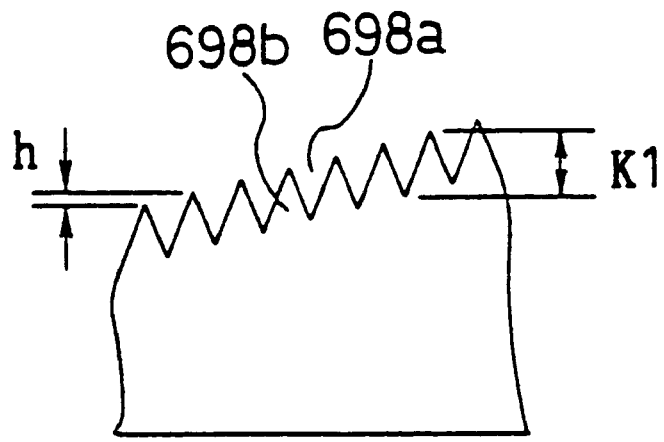
FIG. 85 is an enlarged view showing engaging means 698f and 698g.
Figure 86C:
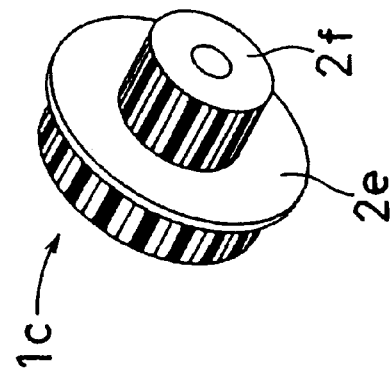
FIGS. 86A–86C are perspective views showing driving force transmitting members of a prior art, FIG. 86A showing a driving force transmitting member 1a, FIG. 86B showing a driving force transmitting member 1b, and FIG. 86C showing a driving force transmitting member 1c.
Figure 86B:
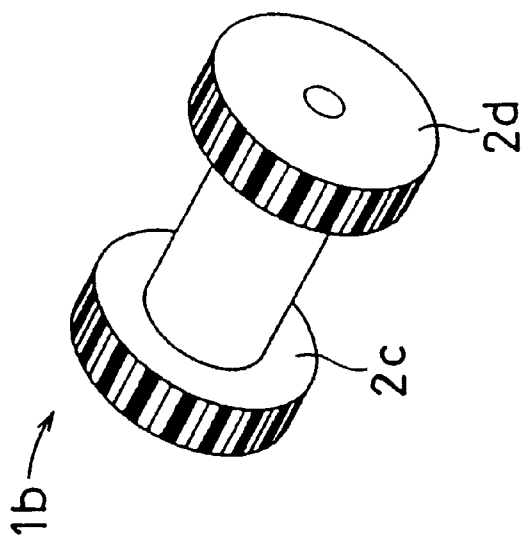
Figure 86A:
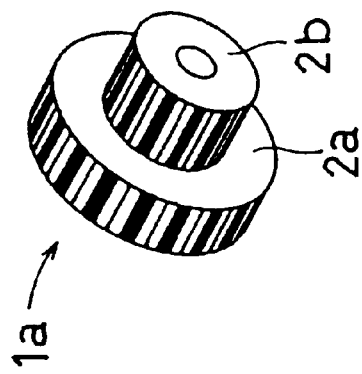

Further, in another embodiment, as shown in FIG. 81, each concave portion 811a and each projection 811b may be formed into a step-wise shape in which an engaging margin width K1 coincides with a difference h. In this case, engagement is removed in a direction opposite to a direction where portions formed into a step-wise shape come into contact with each other, so that an extra member for holding a mutual rotation between driving force transmitting members may be formed.

FIG. 82A is a front view showing a gear member 697 of another embodiment of the fourth group of the invention, FIG. 82B is a side view of the gear member 697, FIG. 82C is a rear view of the gear member 697, and FIG. 82D is a section view of the gear member 697 taken on section line YY—YY of FIG. 82A. FIG. 83A is a front view showing a gear member 698 which can be engaged with the gear member 697, FIG. 83B is a side view of the gear member 698, FIG. 83C is a rear view of the gear member 698, FIG. 83D is a section view of the gear member 698 taken on section line ZZ—ZZ of FIG. 83A.

The gear member 697 is provided with engaging means 697f, 697g on one side in the axial line direction. The engaging means 697f is formed at a collapsed portion located in a collapsed region which is concave from the one side in the axial line direction, and the engaging means 697g is formed at an elevated portion located in an elevated region which is projected from the one side in the axial line direction. The engaging means 697f, 697g are formed at two positions for each 180° in the perimeter direction, respectively. On the engaging means 697f, 697g, as enlarged and shown in FIG. 84, a plurality of concave portions 697a and a plurality of projections 697b are alternately formed and uniformly spaced in the perimeter direction. The respective concave portions 697a are V-shaped concave portions, and the respective projections between the respective concave portions 697a are inverted-V-shaped projections. The respective concave portions 697a and the respective projections 697b are formed so as to have an engaging margin width K1, and so as to have a difference h at a preset distance of deviation in the axial line direction, i.e., for one pitch p as shifted at a preset distance in the perimeter direction. The gear member 698, as well as the gear member 697, is provided with engaging means 698f, 698g, on one side in the axial line direction, and as enlarged and shown in FIG. 85, the same concave portions 698a and projections 698b are formed on the engaging means 698f, 698g. The respective engaging means 697f, 697g; 698f, 698g are formed between bearing holes 697c, 698c into which the same rotation axis as the rotation axis shown in FIG. 75 is pierced, and teeth portions 697d, 698d.

The gear members 697, 698 are coupled by making the elevated portions where the engaging means 697g, 698g are formed, to be fitted into the collapsed portions where the engaging means 697f, 698f are formed, and by engaging the respective engaging means 697f, 697g; 698f, 698g so that the respective projections 698b are fitted into the respective concave portions 697a and the respective projections 697b are fitted into the respective concave portions 698b. It is possible to couple the respective driving force transmitting members by forming such engaging means on the respective driving force transmitting members including another driving force transmitting member which is not shown, and it is possible to construct a lot of complex-type driving force transmitting parts by using a few kinds of driving force transmitting members, so that it is possible to exert the same effect as the above groups of the invention. Further, it is possible to arbitrarily select and set a space between the respective gear members 695, 696 by selecting the concave portions 695a, 696b into which the respective projections 695b, 696b are fitted, that is, by selecting mutual positions about the axial line, of the respective gear members 695, 696.

In addition, by making the height of the most projected portion of the elevated portion smaller than the depth of the deepest portion of the collapsed portion, it is possible to couple driving force transmitting members with the side faces thereof adhered.

Although a configuration of coupling the driving force transmitting members is described in the embodiments shown in FIGS. 75–85, as another embodiment, the respective driving force transmitting members may be coupled by interposing a coupling member between the driving force transmitting members, forming the same engaging means as those of the respective driving force transmitting members as shown above, on both sides in the axial line direction, and interposing the coupling member by using these engaging means. As a result, it is possible to set large spaces between the respective driving force transmitting members so as to be precisely multistage, by using the coupling member, and it is possible to eliminate the decrease of the strength of the driving force transmitting members and the coupling member.

Particularly, in a configuration of thus interposing a coupling member, driving force transmitting members may be coupled by forming engaging means in a collapsed region as mentioned above on a driving force transmitting member and engaging means in an elevated region as mentioned above on a coupling member, and making projections to be fitted into concave portions by using the engaging means. As a result, it is possible to couple driving force transmitting members via a coupling member. Further, it is possible to form a driving force transmitting member so as to have no projection on both sides in the axial line direction and so as to have a smaller thickness, and when using a driving force transmitting member independently and supporting by a rotation axis pierced thereinto, it is possible to use the above-said E ring or the like as a displacement preventing member for preventing the driving force transmitting member from displaced about the rotation axis, so that the operation is facilitated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A coupling structure of driving force transmitting members, comprising;
    a plurality of said driving force transmitting members each having at least one of a concave coupling portion and a convex coupling portion formed on one side in a direction of an axial line thereof,
    wherein at least one of the plurality of driving force transmitting members further has the other of a concave coupling portion and a convex coupling portion on another side in the direction of the axial line thereof,
    the plurality of driving force transmitting members being selectively used with the at least one driving force transmitting member having the concave coupling portions and coupled by the concave and convex coupling portions so as to transmit a driving force by rotating about the axial line and to be detachable in the direction of the axial line, and
    a space setting member having two opposite sides interposed between the respective driving force transmitting members, for setting a space between the respective driving force transmitting members in accordance with a thickness of the space setting member,
    the space setting member being provided selectively with a concave coupling portion or a convex coupling portion, on both sides in a direction of an axial line thereof,
    the respective driving force transmitting members and the space setting member being coupled by the concave coupling portions or the convex coupling portions of the driving force transmitting members and the space setting member, so as to transmit a driving force by rotating about the axial line and to be detachable in the axial line direction;
    the space setting member having concave coupling portions on both sides in a direction of an axial line.

2. The coupling structure of driving force transmitting members of claim 1, wherein
    each of the driving force transmitting members is supported so as to be rotatable by a rotation supporting member which is pierced thereinto,
    the coupling structure comprising:
    a displacement preventing member which is detachably attached to the rotation supporting member, for preventing the driving force transmitting members from being displaced with respect to the rotation supporting member in a direction of an axial line thereof; and
    the spacer member having a thickness more than a projection height of the convex coupling portion, which spacer member is attached to the side of tile at least one of the driving force transmitting members where the convex coupling portion is formed,
    wherein the at least one of the driving force transmitting members is coupled with another driving force transmitting member on the side where the concave coupling portion is formed; and
    the spacer member is placed on the side of at least one driving force transmitting member, where the convex coupling portion is formed, and the displacement preventing member is attached to a portion of the rotation supporting member, which portion is projected from the spacer member.

3. The coupling structure of driving force transmitting members of claim 1, wherein
    each of the driving force transmitting members is supported so as to be rotatable by a rotation supporting member which is pierced thereinto,
    the coupling structure comprising:
    a displacement preventing member which is detachably attached to the rotation supporting member, for preventing the driving force transmitting members from being displaced with respect to the rotation supporting member,
    wherein the driving force transmitting member having the convex coupling portion is provided with an area for attaching/detaching the displacement preventing member onto and from the rotation supporting member, which area is formed more inward in a radial direction than the convex coupling portion,
    the at least one of the driving force transmitting members is coupled with another driving force transmitting member on the side where the concave coupling portion is formed, and
    in the area of the at least one driving force transmitting member, formed more inward in the radial direction than the convex coupling portion, the displacement preventing member is attached to a portion of the rotation supporting member, the portion being projected from the said at least one driving force transmitting member.

4. The coupling structure of driving force transmitting members of claim 1, wherein
the driving force transmitting member having a convex coupling portion further has a concave coupling portion formed on the side where the convex coupling portion is formed.

5. The coupling structure of driving force transmitting members of claim 1, wherein one or more space setting members are selectively used and interposed between the respective driving force transmitting members.

6. The coupling structure of driving force transmitting members of claim 1, wherein
each of the driving force transmitting members has a fitting hole which pierces therethrough in the direction of the axial line thereof, and
a plurality of ring-shaped axial diameter setting members which can be fit to the fitting holes of the driving force transmitting members and provided with piercing holes having different inner diameters, are selectively used and fitted to the respective fitting holes, and the rotation supporting member is pierced into the piecing holes of the axial diameter setting members, whereby the respective driving force transmitting members are rotatably supported.

7. A coupling structure of driving force transmitting members, comprising;
a plurality of driving force transmitting members each having at least either a concave coupling portion or a convex coupling portion formed on one side in a direction of an axial line thereof, and
a plurality of coupling members each having at least either a concave coupling portion or a convex coupling portion on one side in a direction of an axial line thereof and at least either a concave coupling portion or a convex coupling portion on another side in the direction of the axial line,
wherein the plurality of driving force transmitting members are selectively used and coupled by connecting the concave or convex coupling portions of the driving force transmitting members with the convex and concave coupling portions of one or more of the coupling members so as to transmit a driving force by rotating about the axial line and to be detachable in the axial line direction.

8. The coupling structure of driving force transmitting members of claim 7, wherein each of the driving force transmitting members has a concave coupling portion on one side in a direction of an axial line thereof, and the coupling member has convex coupling portions on both sides in the axial line direction thereof.

9. The coupling structure of driving force transmitting members of claim 7, wherein
at least one of the driving force transmitting members to be coupled is a pulley member on which a belt is stretched; and
at least a portion of the coupling member is projected more outward in a radial direction than a portion where the belt of the pulley member is stretched.

10. The coupling structure of driving force transmitting members of claim 7, the coupling structure comprising:
the plurality of coupling members being coupled so as to transmit a driving force by rotating about an axial line and being detachable in a direction of the axial line; and
a plurality of space setting members interposed between the, driving force transmitting members and the coupling members,
wherein spaces between the respective driving force transmitting members are set by selectively using one or more coupling members and one or more space setting members.

11. The coupling structure of driving force transmitting members of claim 7, wherein each of the coupling members has a convex coupling portion at least on one side in a direction of an axial line,
at least one of the driving force transmitting members is provided with a plurality of concave coupling portions which have depths smaller than a projection height of the convex coupling portion of the coupling member and different from each other, and which have bottoms, on one side in the axial line direction, and
the convex coupling portion of the coupling member is selectively fitted into the concave coupling portion of the driving force transmitting member.

12. The coupling structure of driving force transmitting members of claim 7, wherein each of the driving force transmitting members has a concave coupling portion on one side in a direction of an axial line thereof,
the coupling structure comprising:
the plurality of coupling members interposed between the respective driving force transmitting members, the coupling member having said convex coupling portions on both sides in the axial line direction and having a plurality of said concave coupling portions which have depths smaller than a projection height of the convex coupling portions and different from each other, and which have bottoms, at least on one side in the axial line direction,
wherein the coupling members are coupled by selectively fitting the convex coupling portions into selected one of the concave coupling portions.

13. The coupling structure of driving force transmitting members of claim 7, wherein each of the driving force transmitting members has a fitting hole into which a rotation supporting member pierced into the respective driving force transmitting members to rotatably support, is pierced,
the coupling structure comprising a plurality of ring-shaped axial diameter setting members which can be fit into the respective fitting holes- of the respective driving force transmitting members and provided with piercing holes having different inner diameters,
wherein the plurality of ring-shaped axial diameter setting members are selectively used and fitted into the fitting holes, and the rotation supporting member is pierced into the piecing holes of the axial diameter setting members, whereby the respective driving force transmitting members are supported so as to rotate.

14. The coupling structure of driving force transmitting members of claim 7, wherein the concave coupling portions formed on the driving force transmitting members, or the coupling members have concave coupling portions into which the convex coupling portions of the coupling members or the driving force transmitting members are fitted in a status of close fits, and concave coupling portions into which the convex coupling portions of the coupling members or the driving force transmitting members are fitted in a status of clearance fits.

15. The coupling structure of driving force transmitting members of claim 7, wherein the driving force transmitting member has a fitting portion into which a coupling member is fitted.

16. The coupling structure of driving force transmitting members of claim 7, wherein the concave and convex coupling portions formed on the driving force transmitting members and the coupling members, are selectively formed in a plurality of regions which have different distances from the axial line.

17. A coupling structure of driving force transmitting members, comprising:

a plurality of driving force transmitting members;

engaging means formed in a recessed region on one side in a direction of an axial line of the plurality of driving force transmitting members; and a coupling member which has engaging means in raised regions on both sides in the direction of the axial line direction, wherein the engaging means of the driving force transmitting members and the coupling members are provided with a plurality of concave portions and a plurality of projections, alternately, which are uniformly spaced in a direction of a perimeter so as to be adjacent to each other, the concave portions and the projections being formed at positions which are deviated by d preset distance along an axial line, as shifted by a preset distance in one of the perimeter directions; and the plurality of driving force transmitting means are selectively used and coupled by selectively fitting the concave portions into the projections of the coupling member and engaging the engaging means, via the coupling member, so as to mutually transmit a rotation force about the axial line and to be detachable in the axial direction.

* * * * *